US008170162B2

(12) United States Patent
Nakahara et al.

(10) Patent No.: US 8,170,162 B2
(45) Date of Patent: May 1, 2012

(54) INTER-CARRIER INTERFERENCE REMOVAL DEVICE AND RECEPTION DEVICE USING THE SAME

(75) Inventors: Hideki Nakahara, Hyogo (JP); Yoshinobu Matsumura, Osaka (JP); Mikihiro Ouchi, Osaka (JP); Tomohiko Taniguchi, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/086,659

(22) Filed: Apr. 14, 2011

(65) Prior Publication Data

US 2011/0211630 A1 Sep. 1, 2011

Related U.S. Application Data

(62) Division of application No. 12/090,735, filed as application No. PCT/JP2006/320962 on Oct. 20, 2006, now Pat. No. 7,991,089.

(30) Foreign Application Priority Data

Oct. 21, 2005 (JP) ................................. 2005-307820
Dec. 15, 2005 (JP) ................................. 2005-362511

(51) Int. Cl.
*H04B 7/10* (2006.01)
(52) U.S. Cl. ........ 375/347; 375/260; 375/267; 375/299; 375/316; 375/340; 375/346; 375/349; 375/350; 455/101; 455/132; 455/296; 455/500; 455/501; 370/334; 370/335; 370/342
(58) Field of Classification Search .................. 375/260, 375/267, 299, 316, 340, 346, 347, 349, 350; 455/101, 132, 296, 500, 501; 370/334, 335, 370/342
See application file for complete search history.

(56) References Cited

U.S. PATENT DOCUMENTS

| 7,151,808 | B2 | 12/2006 | Fujii et al. |
| 7,298,785 | B2 | 11/2007 | Suzuki |
| 7,313,189 | B2 | 12/2007 | Yoshida et al. |
| 7,362,832 | B2 | 4/2008 | Yoshida |

(Continued)

FOREIGN PATENT DOCUMENTS

JP 2003-524338 8/2003
(Continued)

OTHER PUBLICATIONS

International Search Report issued Jan. 9, 2007 in the International (PCT) Application of which the present application is the U.S. National Stage.

(Continued)

*Primary Examiner* — Leon Flores
(74) *Attorney, Agent, or Firm* — Wenderoth, Lind & Ponack L.L.P.

(57) ABSTRACT

An inter-carrier interface removal device can improve estimation accuracy of inter-carrier interference caused by Doppler shift in a received multi-carrier signal moving at a high speed, and a reception characteristic of the multi-carrier signal after removing the inter-carrier interference. The inter-carrier interference removal device includes a channel estimation unit estimating a channel frequency characteristic according to a carrier signal, an equalization unit equalizing the carrier signal with the channel frequency characteristic and outputs tentative carrier data, a reliability value calculation unit calculating a reliability value according to the channel frequency characteristic, a weighting unit weighting the tentative carrier data with the reliability value, an ICI component estimation unit estimating an ICI component according to the weighted tentative carrier data and the estimated channel frequency characteristic, and an ICI removal calculation unit removing the ICI component from the carrier signal.

8 Claims, 41 Drawing Sheets

U.S. PATENT DOCUMENTS

| 7,526,042 | B2 | 4/2009 | Yoshida |
| 2002/0146063 | A1 | 10/2002 | Gorokhov et al. |
| 2002/0181549 | A1 | 12/2002 | Linnartz et al. |
| 2004/0229581 | A1 | 11/2004 | Mizoguchi et al. |
| 2005/0180517 | A1 | 8/2005 | Abe |
| 2006/0286948 | A1 | 12/2006 | Taniguchi et al. |

FOREIGN PATENT DOCUMENTS

| JP | 2004-172699 | 6/2004 |
| JP | 2004-519900 | 7/2004 |
| JP | 2005-229466 | 8/2005 |
| JP | 2006-41980 | 2/2006 |

OTHER PUBLICATIONS

Schmidt et al., "Low Complexity Inter-Carrier Interference Compensation for Mobile Reception of DVB-T", *International OFDM-Workshop*, pp. 72-76, 2004.

"Transmission System for Digital Terrestrial Television Broadcasting", Association of Radio Industries and Businesses, ARIB STD-B31, pp. 8-9, 46-49, 52-53 (partial English translation).

"Part 11: Wireless LAN Medium Access Control (MAC) and Physical Layer (PHY) Specifications: High-speed Physical Layer in the 5GHZ Band", IEEE, pp. 10-13 and 22-23, 1999.

Tomasin et al., "Achieving Mobility for DVB-T by Signal Processing for Doppler Compensation", *Proc. IBC Conference*, pp. 412-420, 2002.

● : SIGNAL POINT

INTER-CARRIER INTERFERENCE REMOVAL DEVICE AND RECEPTION DEVICE USING THE SAME

This application is a divisional of U.S. Application Ser. No. 12/090,735, filed Apr. 18, 2008 now U.S. Pat. No. 7,991,089, which is a national stage application of International Application No. PCT/JP2006/320962, filed Oct. 26, 2006.

TECHNICAL FIELD

In the mobile communication field, the present invention relates to an inter-carrier interference removal device that reduces inter-carrier interference when a multi-carrier signal is received, and particularly to a technique to improve a transmission characteristic.

BACKGROUND ART

Currently, Orthogonal Frequency Division Multiplexing (OFDM) has been widely used in transmission systems of various digital communications such as digital terrestrial broadcasting and IEEE 802.11a. OFDM, in which a plurality of narrowband digital modulation signals are frequency-multiplexed using multiple orthogonal sub-carriers, is an excellent transmission system that efficiently utilizes frequencies. In addition, in OFDM, each symbol period consists a cycle of a valid symbol period and a guard interval. Accordingly, signals in the valid symbol period are partially copied into the guard interval, which can reduce the impact of the inter-symbol interference caused by multipath interference. Thus, OFDM is robust against multipath interference.

However, in OFDM, since one symbol length in a narrow-band digital modulation signal is longer than that in a broadband digital modulation signal, OFDM is sensitive to a time variance in a channel fading environment that occurred during the mobile reception and the like. Moreover, in the channel fading environment, in addition to a time variance in an amplitude of a reception signal that occurs as a result of delay dispersion due to multipath interference, a frequency variance called Doppler shift occurs. This Doppler shift destroys the orthogonality among sub-carriers, and thereby causing mutual interference among the sub-carriers. Consequently, it is difficult to perform correct demodulation. This interference occurred among the sub-carriers is called inter-carrier interference (ICI). To suppress the degradation of the communication quality caused by the ICI is the key to improve the transmission characteristic.

In recent years, several approaches have been made to improve this deterioration caused by the ICI. One of the approaches is disclosed in Nonpatent Document 3.

FIG. 40 is a block diagram showing the configuration of an ICI removal unit described in Nonpatent Document 3.

A channel characteristic estimation unit 4001 estimates a channel characteristic from a signal obtained by FFT (indicated as Y). A tentative equalization unit 4002 divides the post-FFT signal by the channel characteristic to estimate a transmission signal (indicated as $X^\sim(s)$, where "s" represents the current symbol number.)

Based on the estimated channel characteristic, a channel characteristic linear differential calculation unit 4003 calculates, using Expression 1, a linear differential (indicated as H'(s)) of a channel characteristic H(s) by calculating a difference of the channel characteristics between preceding and subsequent symbols of the current symbol, and outputs the linear differential H'(s) to a multiplication unit 4004.

$$H'(s)=(H(s+1)-H(s-1))/(2 \cdot Ts) \quad \text{(Expression 1)}$$

In Expression 1, the letter "Ts" represents an OFDM symbol length.

Subsequently, the multiplication unit 4004 estimates an ICI component K(s) with use of Expression 2 by calculating the tentatively equalized signal $X^\sim(s)$, the linear differential H'(s), and a constant matrix $\Xi$.

$$K(s)=\Xi \text{diag}(H'(s))X^\sim(s) \quad \text{(Expression 2)}$$

The letter, "$\Xi$" is as expressed in Expressions 3 and 4.

$$\Xi = \begin{pmatrix} 0 & \zeta_1 & \cdots & \zeta_{N-1} \\ \zeta_{-1} & 0 & \cdots & \zeta_{N-2} \\ \vdots & \vdots & \ddots & \vdots \\ \zeta_{1-N} & \zeta_{2-N} & \cdots & 0 \end{pmatrix} \quad \text{(Expression 3)}$$

$$\zeta_n = -\frac{1}{2} - \frac{j}{2\tan(\pi/N)} \quad \text{(Expression 4)}$$

In this description, $\text{diag}(A_n(s))$ is expressed as a square matrix having N lines×N columns as shown below (n=0, ..., N−1). Note that the letter "n" is a carrier number and the letter "N" is the total carrier number.

$$\text{diag}(A_n(s)) = \begin{pmatrix} A_0(s) & 0 & \cdots & 0 \\ 0 & A_1(s) & \cdots & 0 \\ \vdots & \vdots & \ddots & \vdots \\ 0 & 0 & \cdots & A_{N-1}(s) \end{pmatrix}$$

Subsequently, a subtraction unit 1005 performs subtraction to remove, from the post-FFT signal Y, the ICI component estimated from Expression 2.

Nonpatent Document 1: ARIB STD-B31
Nonpatent Document 2: IEEE Std 802.11a-1999
Nonpatent Document 3: Karsten Schmidt et al, "Low Complexity Inter-Carrier Interference Compensation for Mobile Reception of DVB-H," 9th International OFDM-Workshop 2004, Dresden (Page 72-76, FIG. 4)
Patent Document 1: JP Patent Publication No. 2004-519900

DISCLOSURE OF THE INVENTION

Problems the Invention is Attempting to Solve

However, the inter-carrier interference removal device disclosed in Nonpatent Document 3 has the following problem. In a multipath fading environment, a channel characteristic exhibits frequency selectiveness, and dips are caused in a reception band. Levels of some carriers are lower than other carriers and many noise components are contained. In such a case, or when interferences are contained in particular carriers, errors can be occurred in estimating, with use of such carriers, tentative carrier data and a channel variation, which results in erroneous calculation of an interference component that interferes other carriers.

When there is a serious error in the estimation of the tentative carrier data in the carrier, the error causes an increase in inter-carrier interference, far from removing the inter-carrier interference.

In view of the above problems, the object of the present invention is to provide an inter-carrier interference removal device that is able to accurately estimate and remove an ICI component when the channel characteristic shows frequency selectiveness or when interferences are contained in the multipath fading environment.

Means for Solving the Problems

In order to solve the aforementioned problems, the present invention provides an inter-carrier interference removal device that removes an inter-carrier interference component from a multi-carrier signal, the multi-carrier signal including a plurality of carrier signals each indicating a frequency response characteristic that varies with a channel status, the inter-carrier interference removal device including an acquisition unit operable to acquire a multi-carrier signal including a plurality of carrier signals; a reliability value calculation unit operable to calculate a reliability value of each carrier signal based on a frequency response characteristic of the carrier signal; an equalization unit operable to equalize each carrier signal; a weighting unit operable to weight each equalized carrier signal with use of the reliability value of each non-equalized carrier signal; and an inter-carrier interference removal unit operable to (i) calculate, for each carrier signal, an inter-carrier interference component based on a variation of the frequency response characteristic of the non-equalized carrier signal, and the weighted and equalized carrier signal, and (ii) remove the inter-carrier interference component from the non-equalized carrier signal.

Effects of the Invention

With the above configuration, the inter-carrier interference removal device of the present invention weights a carrier signal with the reliability value based on the frequency response characteristic, and subsequently calculates an inter-carrier interference component. Therefore, in a reception environment where an influence of the multipath shows frequency selectivity when a multi-carrier signal is received, and where inter-carrier interference occurs as a result of a high-speed variance of a radio channel, the inter-carrier interference removal device is ensured to estimate and remove an inter-carrier interference component generated in a carrier signal more accurately than conventionally.

Figure 1:
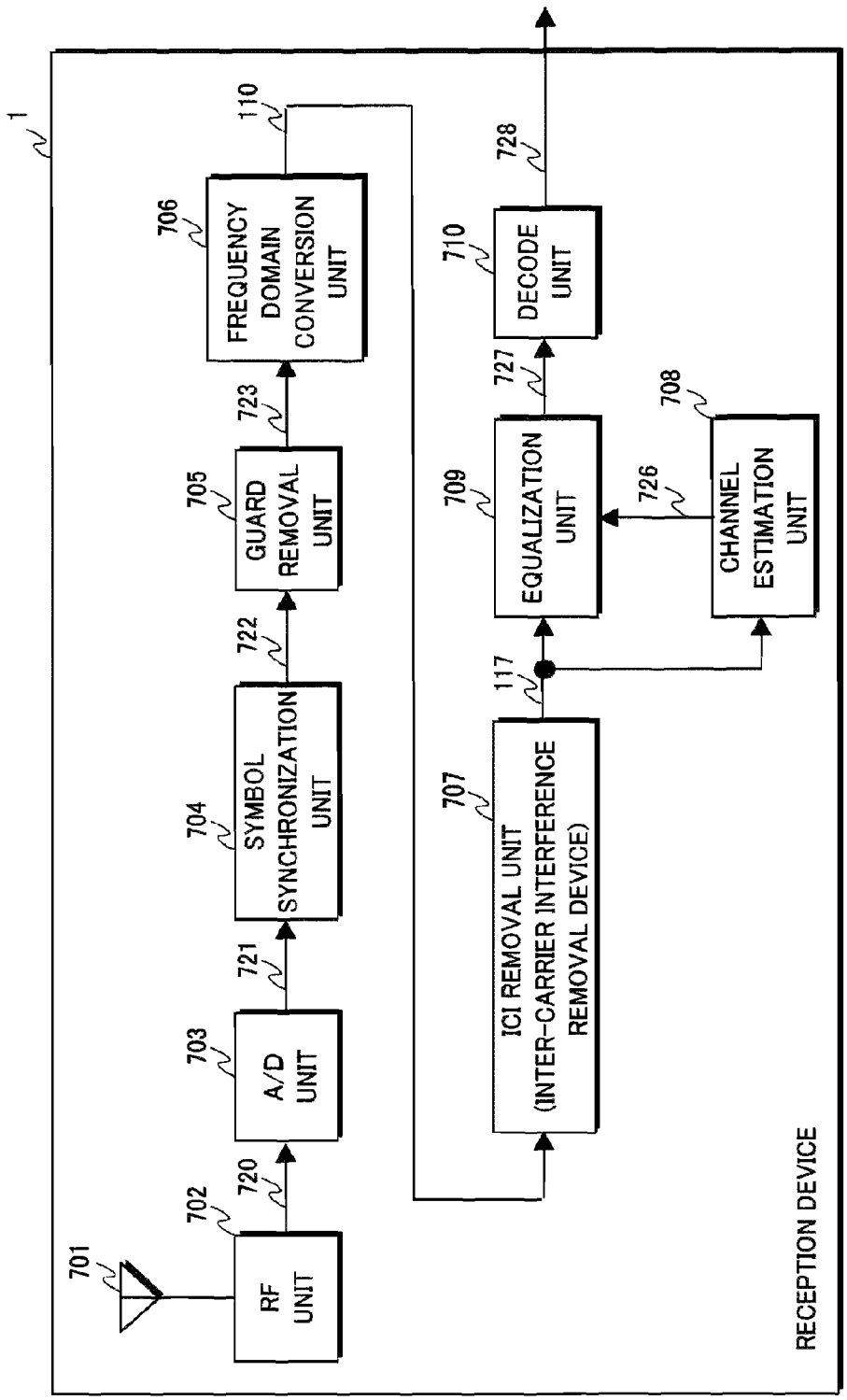
FIG. 1 is a block diagram of the configuration of an OFDM reception device that includes an inter-carrier interference removal device in accordance with Embodiment 1 of the present invention.

REFERENCE NUMERALS 1 inter-carrier interference removal device
101 channel estimation unit
102 equalization unit
103 reliability value calculation unit
104 weighting unit
105 channel variation estimation unit
106 ICI component estimation unit
107 ICI removal operation unit
110 carrier signal
111 channel frequency characteristic
112 tentative carrier data
113 reliability value
114 weighted tentative carrier data
115 channel variation characteristic
116 ICI component
117 carrier signal from which ICI component has been removed
201 transmitter station
202 mobile reception station
501 channel estimation unit
502 equalization unit
503 channel variation estimation unit
504 ICI component estimation unit
505, 506, 507 symbol delay unit
508 subtraction unit
510 carrier signal
   511 channel frequency characteristic
   514 tentative carrier data
   515 channel variation characteristic
   516 ICI component
517 carrier signal from which ICI component has been removed
702 RF unit
703 A/D unit
704 symbol synchronization unit
705 guard removal unit
706 frequency domain conversion unit
707 ICI removal unit
708 channel estimation unit
709 equalization unit
710 decode unit
720 baseband signal
726 channel frequency characteristic
727 carrier data
901 channel variation calculation unit
902, 903 symbol delay unit
1000 subtraction circuit

BEST MODE FOR CARRYING OUT THE INVENTION

The following describes embodiments of the present invention, with reference to the attached drawings. Note that the below descriptions are given by way of example of a device whose multi-carrier modulation system is OFDM system, and whose signal format is ISDB-T system as disclosed in Nonpatent Document 1.

Embodiment 1

A reception device in accordance with Embodiment 1 of the present invention includes an inter-carrier interference removal device. The inter-carrier interference removal device calculates a reliability value of a carrier signal based on a channel frequency characteristic of a carrier, and estimates an ICI component more accurately with use of the reliability value. Thus, the reception device is able to accurately remove the ICI component from the carrier signal, and therefore the reception performance at a high-speed OFDM mobile communication is improved.

The following describes a reception device 1 in accordance with Embodiment 1 of the present invention, with reference to the attached drawings.

<Configuration>

As shown in FIG. 1, the reception device 1 includes: an RF unit 702 that receives a wave of a desired channel via an antenna 701 and converts an RF (Radio Frequency) signal to a baseband signal 720; an A/D unit 703 that converts an analogue signal to a digital signal; a symbol synchronization unit that performs synchronization processing on an OFDM symbol; a guard removal unit 705 that remove a guard interval contained in the OFDM symbol; a frequency domain conversion unit 706 that converts a time domain OFDM signal to a frequency domain carrier signal 110; an ICI removal unit 707 that estimates and removes an ICI component from the carrier signal 110; a channel estimation unit 708 that estimates a frequency response characteristic of a channel from a carrier signal 117 from which the ICI component has been removed, and outputs a channel frequency characteristic 726; an equalization unit 709 that equalizes the carrier signal 110 based on the channel frequency characteristic 726, and outputs carrier data 727; and a decode unit 710 that performs error correction on the carrier data 727 and acquires a reception bit data 728.

The reception device 1, in concrete, is composed of an antenna, a tuner, a decoder LSI, and the like.

In this embodiment, the FFT (Fast The Fourier transform) is employed by way of example of converting a time domain signal to a frequency domain signal in the frequency domain conversion unit 706. Since units other than the ICI removal unit 707 are publicly known as units included in a reception device that demodulates an OFDM signal, operations of these units are not described in detail.

Subsequently, the inter-carrier interference removal device 707 that is equivalent to the ICI removal unit 707 is described, with reference to FIG. 2.

Figure 2:
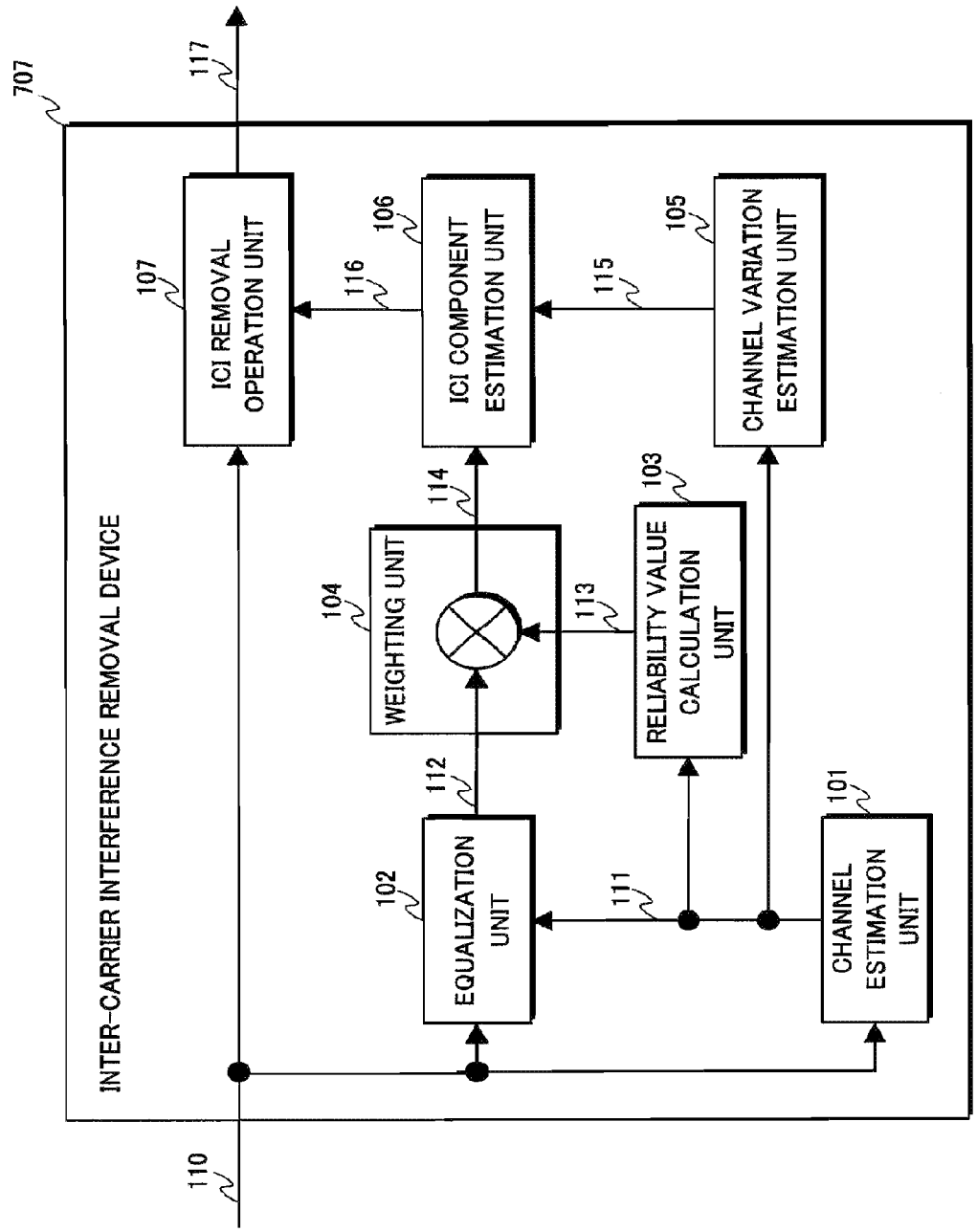
FIG. 2 is a block diagram of the inter-carrier interference removal device of Embodiment 1.

FIG. 2 is a detailed block diagram of the inter-carrier interference removal device 707.

As shown in FIG. 2, the inter-carrier interference removal device 707 includes a channel estimation unit 101, an equalization unit 102, a reliability value calculation unit 103, a weighting unit 104, a channel variation estimation unit 105, an ICI component estimation unit 106, and an ICI removal operation unit 107.

The channel estimation unit 101 estimates a frequency response characteristic of a channel from the carrier signal 110, and outputs a channel frequency characteristic 111. In the ISDB-T system, the channel estimation unit 101 estimates the frequency response characteristic with use of a pilot carrier contained in the carrier signal 110.

The following describes the estimation of the frequency response characteristic, with reference to the drawings.

Figure 41:
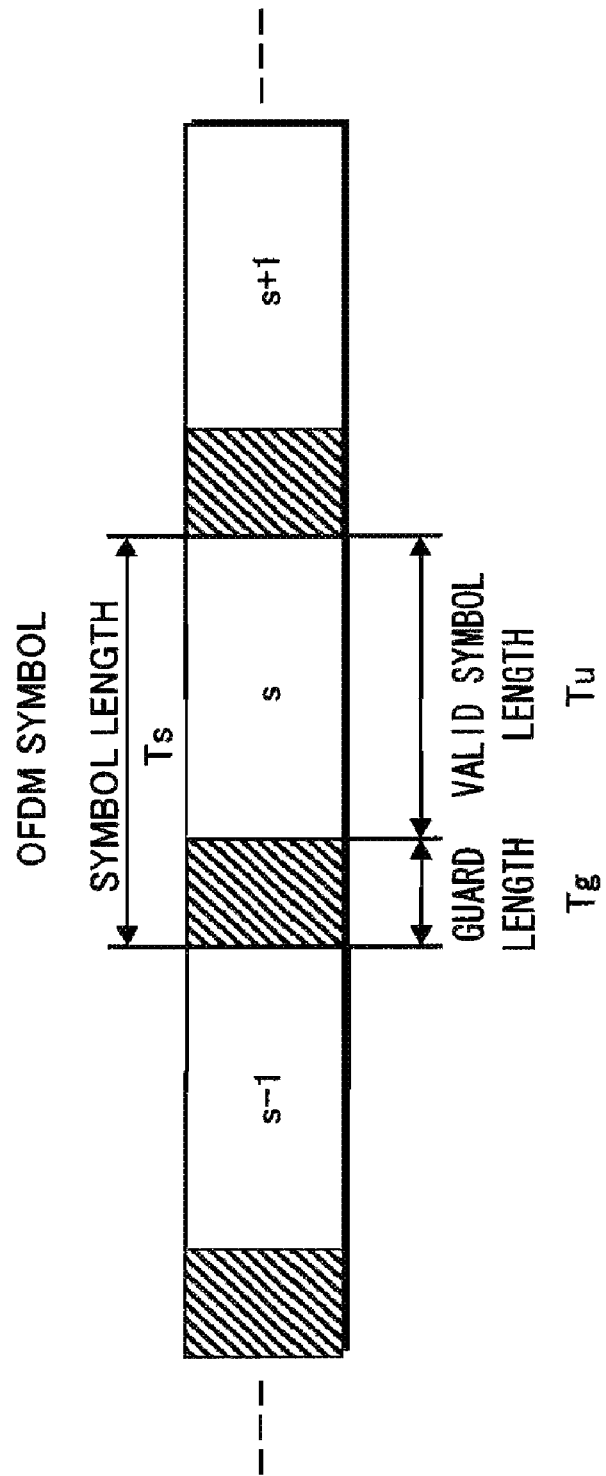
FIG. 41 schematically shows an OFDM symbol.

FIG. 41 is a schematic view of an OFDM symbol. In the following description, each length of the OFDM symbol is expressed as follows. The symbol length is $T_s$, the guard length is $T_g$, and the valid symbol length is $T_u$.

Figure 3:
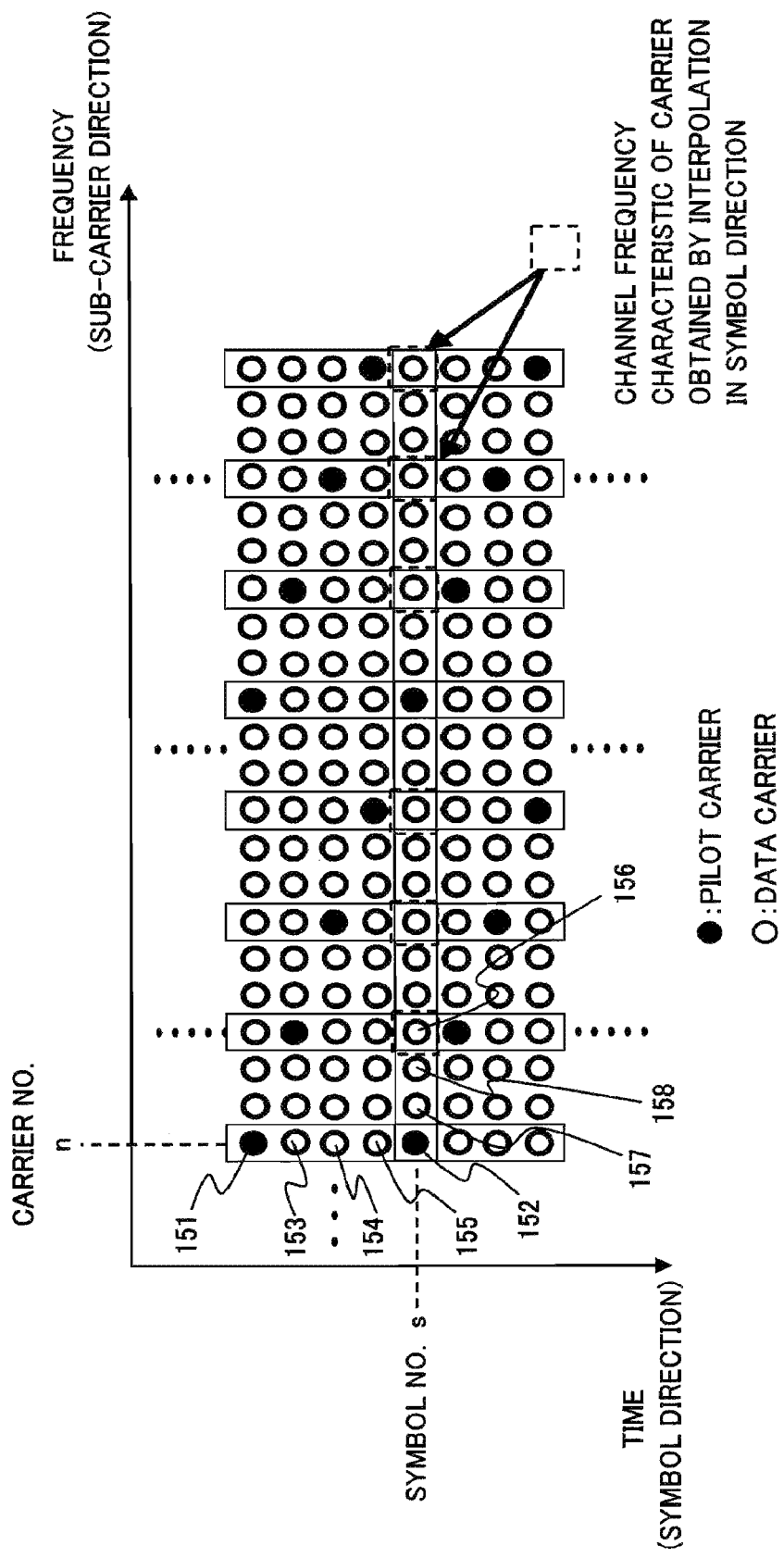
FIG. 3 shows a signal format of an OFDM signal disclosed in Nonpatent Document 1.

FIG. 3 shows a format of an OFDM signal. The outline circles in the figure represent data carriers, and the black circles in the figure represent pilot carriers. The letter "s" in the figure represents a symbol number. Since carrier data $X_p$ (P is a carrier number of a pilot carrier) is known to a receiving side, with use of the carrier data $X_p$, a channel frequency characteristic $H_p$ of a pilot carrier is obtained by equalizing, by a division expressed in Expression 5, carrier data $Y_p$ that is actually received.

$$H_p = Y_p / X_p \quad \text{(Expression 5)}$$

The channel frequency characteristics of the data carriers between pilot carriers are calculated by interpolating the neighboring OFDM symbols $H_p$ (in the symbol direction). For example, the channel frequency characteristic of a pilot carrier 151 is supposed to be $H_n(s-4)$, the channel frequency characteristic of a pilot carrier 152 is supposed to be $H_n(s)$. The channel frequency characteristics of the data carriers 153, 154 and 155 are supposed to be $H_n(s-1)$, $H_n(s-2)$ and $H_n(s-3)$, respectively. In this case, $H_n(s-1)$, $H_n(s-2)$ and $H_n(s-3)$ can be obtained by interpolating between $H_n(s-4)$ and $H_n(s)$.

In addition, the channel frequency characteristics of the total carriers including the data carriers are estimated, for every symbol, by interpolating the frequency response characteristics of every four carrier in the carrier direction.

For example, the channel frequency characteristics $H_{n+1}(s)$ of a data carrier 157 and the channel frequency characteristic $H_{n+2}(s)$ of a data carrier 158 are obtained by interpolating, in the carrier direction, between a channel frequency characteristic $H_{n+3}(s)$ of a data carrier 156 and the channel frequency characteristic $H_n(s)$ of the pilot carrier 152. The channel frequency characteristic $H_{n+3}(s)$ is obtained by interpolation in the symbol direction.

The equalization unit 102 equalizes, by a division expressed in Expression 6, the carrier signal $Y(s)$ based on the channel frequency characteristic $H(s)$, and estimates tentative carrier data $X\tilde{}(s)$.

$$X\tilde{}(s) = Y(s)/H(s) \quad \text{(Expression 6)}$$

Based on the channel frequency characteristic $H(s)$, the channel variation estimation unit 105 calculates a variation $H'(s)$ of the channel frequency characteristic (hereinafter, referred to as a channel variation characteristic) occurred in the preceding and subsequent symbols to the symbol s from which ICI is to be removed.

Figure 4:
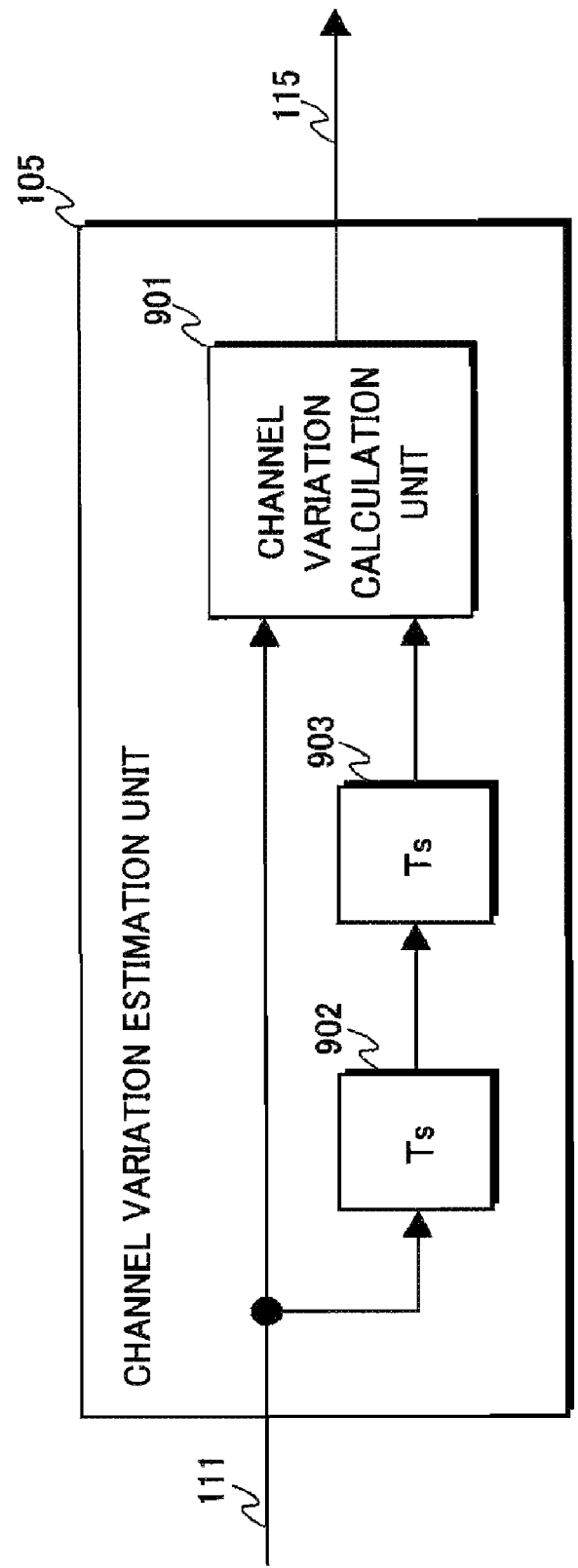
FIG. 4 is a block diagram of a channel variation estimation unit of the inter-carrier interference removal device of Embodiment 1.

As shown in FIG. 4, the channel variation estimation unit 105 includes symbol delay units 902 and 903 that delay for the OFDM symbol length $T_s$, and a channel variation calculation unit 901. The channel variation estimation unit 105 estimates the channel variation characteristic $H'_n(s)$ of the s-th symbol, with use of the channel frequency characteristic $H_n(s+1)$ of an input carrier n and $H_n(s-1)$ that is delayed by those two symbol delay units, by performing operation based on Expression 7 in the channel variation calculation unit 901.

$$H'_n(s) = (H_n(s+1) - H_n(s-1))/(2 \cdot Ts) \quad \text{(Expression 7)}$$

The reliability value calculation unit 103 calculates reliability value $W(s)$ of the tentative carrier data $X\tilde{}(s)$. For each carrier, reliability value $W_n(s)$ of a carrier n is calculated based on the channel frequency characteristic $H_n(s)$, and the relation is associated with a given function $f(\cdot)$ (Expression 8) that is described later. The "abs[z]" indicates an amplitude of a vector z.

$$W_n(s) = f(abs[H_n(s)]) \quad \text{(Expression 8)}$$

(n=0, ..., N-1, Note≠m)

The weighting unit 104 weights the weight $W_n(s)$ calculated by the reliability value calculation unit 103 by multiplying the weight $W_n(s)$ and the tentative data symbol $X\tilde{}_n(s)$ together.

$$X\hat{}_n(s) = X\tilde{}_n(s) \cdot W_n(s) \quad \text{(Expression 9)}$$

(n=0, ..., N-1, Note≠m)

As shown in Expression 10, the ICI component estimation unit 106 estimates the ICI component $K(s)$ by multiplying the leak matrix E, the channel variation characteristic $H'(s)$ and the weighted tentative carrier data $X\hat{}(s)$.

$$K(s) = \Xi \cdot H'(s) \cdot W(s) \cdot X\tilde{}(s) \quad \text{(Expression 10)}$$

$$= \Xi \cdot H'(s) \cdot X\hat{}(s)$$

Herein, the letters, $K(s)$, $\Xi$, $H'(s)$, $W(s)$ and $X\tilde{}(s)$ are respectively expressed in matrices shown in Expressions 11-15. Herein, the letter, "$T$" represents a transposition.

$$K(s) = [K_1(s), K_2(s), K_{N-1}(s)]^T \quad \text{(Expression 11)}$$

$$\Xi = \begin{pmatrix} 0 & \zeta_1 & \cdots & \zeta_{N-1} \\ \zeta_{-1} & 0 & \cdots & \zeta_{N-2} \\ \vdots & \vdots & \ddots & \vdots \\ \zeta_{1-N} & \zeta_{2-N} & \cdots & 0 \end{pmatrix} \quad \text{(Expression 3)}$$

$$\zeta_n = -\frac{1}{2} - \frac{j}{2\tan(\pi/N)} \quad \text{(Expression 4)}$$

$$H'(s) = \text{diag}(H'_n(s)) \quad \text{(Expression 12)}$$

$$W(s) = \text{diag}(W_n(s)) \quad \text{(Expression 13)}$$

$$X^{18}(s) = [X\tilde{}_1(S), X\tilde{}_2(S), \ldots, X\tilde{}_{N-1}(s)]^T \quad \text{(Expression 14)}$$

As shown in Expression 15, the ICI removal operation unit 107 removes the ICI component by subtracting an estimated ICI component $K_n(s)$ from an input carrier signal $Y_n(s)$.

$$Y\tilde{}(s) = Y(s) - K(s) \quad \text{(Expression 15)}$$

Figure 5:
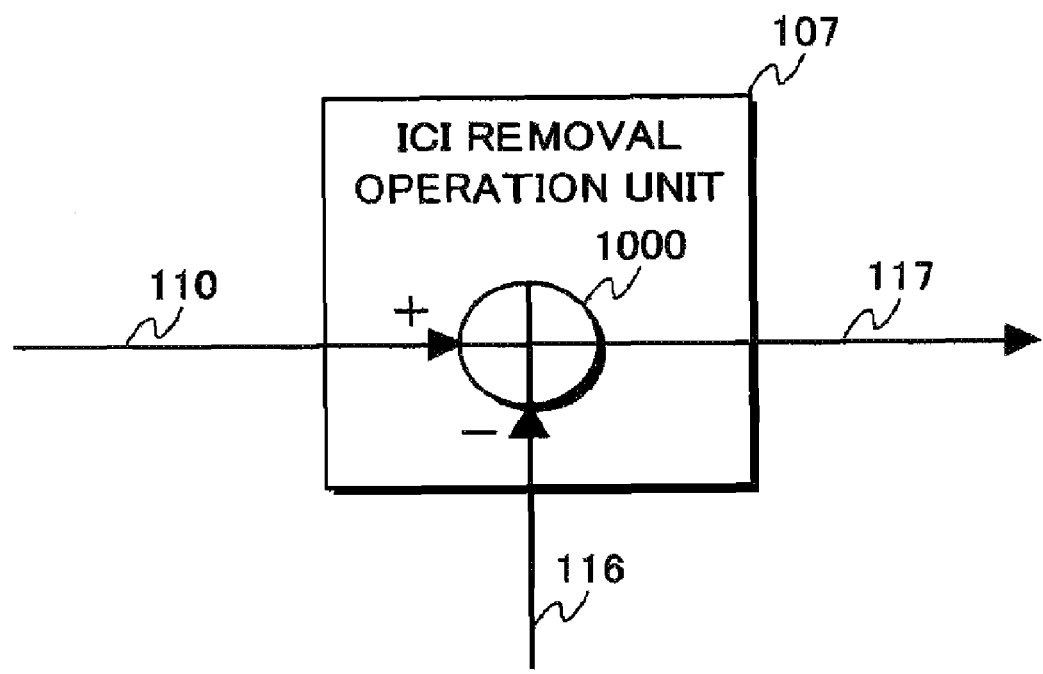
FIG. 5 is a block diagram of an ICI removal operation unit of the inter-carrier interference removal device of Embodiment 1.

As shown in FIG. 5, the ICI removal operation unit 107 is implemented in a subtraction circuit 1000.

Described as above, the inter-carrier interference removal device of Embodiment 1 is characterized by having the reliability value calculation unit that calculates the reliability value based on the channel frequency characteristic and the weighting unit.

<Operation>

The following is a detailed description of an operation of the inter-carrier interference removal device 707.

Figure 6A:
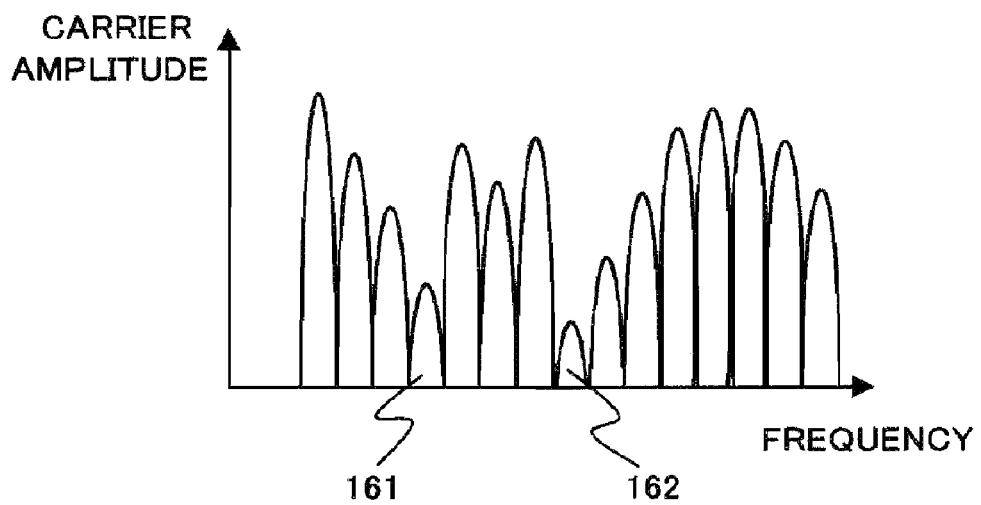
FIG. 6 is a schematic view showing frequency selectiveness of a carrier signal.

Initially, the inter-carrier interference removal device 707 estimates tentative carrier data that is necessary for estimating an ICI component. For that purpose, the channel estimation unit 101 estimates a channel frequency characteristic $H(s)$, and the equalization unit 102 equalizes the carrier signal $Y(s)$ with use of the $H(s)$. Thus, the tentative data symbol $X\tilde{}(s)$ is obtained. For channel estimation, pilot carriers that are known to a receiving side, as shown in FIG. 3, are used. Depending on an amount of delay of multipath and phase relation between paths, as shown in FIG. 6A, levels of carriers are relatively different from one another, and particular carriers (e.g. a carrier 161 and a carrier 162) have low carrier levels.

Figure 6B:
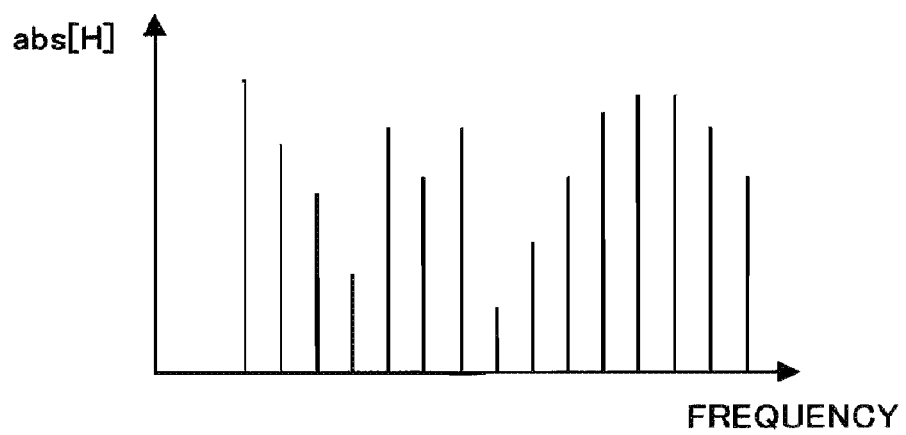

FIG. 6 schematically shows frequency selectiveness of a carrier signal.

As for the channel frequency characteristic $H_n(s)$ of the n-th carrier, the $abs[H_n(s)]$ represents an amplitude of each carrier signal. When the amplitude of $H_n(s)$ is small, the amplitude approximates to a noise level. Therefore, the equalization by Expression 6 results in a higher risk of erroneous estimation of the tentative data symbol $X^\sim_n(s)$. As a result, estimation of interference to other carriers may be erroneous. Furthermore, calculation of an interfering amount (leak amount) with use of the erroneous carrier data adversely generates ICI. Accordingly, when the estimation of carrier data can be wrong, which means the carrier data has a low reliability value, reducing the use of such carrier data to estimate an ICI component improves the accuracy of the estimation.

Accordingly, in the present invention, the tentative carrier data $X^\wedge(s)$ that is necessary for estimating an ICI component is weighted according to a reliability value of a carrier, and thus the reliability value of the estimation of the ICI component is improved.

More specifically, the reliability value calculation unit 103 calculates the reliability value $W_n(s)$ of the tentative data symbol $X^\wedge_n(s)$ based on the channel frequency characteristic $H_n(s)$.

Thus, the reliability value $W_n(s)$ of a carrier n is expressed as a function $f(x)$ whose input x is $abs[H_n(s)]$ as shown in Expression 16.

$$W_n(s) = f(abs[H_n(s)]) \quad \text{(Expression 16)}$$

The detail of the function $f(x)$ is described later.

Subsequently, the weighting unit 104 multiplies the tentative data symbol $X^\sim_n(s)$ by the reliability value $W_n(s)$.

The channel variation estimation unit 105 calculates the channel variation $H'(s)$ with use of channel frequency characteristics $H(s+1)$ and $H(s-1)$ that are in the vicinity of the s-th OFDM symbol from which an ICI component is to be removed. The ICI component estimation unit 106 estimates the ICI component $K(s)$ with use of the operation shown in Expression 10.

Subsequently, the ICI removal operation unit 107 removes the estimated ICI component $K_n(s)$ by subtracting the ICI component $K_n(s)$ from the carrier signal $Y^\sim_n(s)$.

The channel estimation unit 708 and the equalization unit 709 that are subsequent to the ICI removal operation unit 707 respectively perform channel estimation on the carrier signal $Y^\sim_n(s)$ from which the ICI component has been removed, and equalization processing based on the channel estimation. After error correction, the decode unit 710 obtains reception bit data.

The following describes the function $f(x)$ and its input x employed by the reliability value calculation unit 103. The following first description is when the input x is $abs[H_n]$.

The function $f(x)$ can be a function shown in Expression 17, for example. Note that $\alpha > 1$. The $\alpha$ may be set to a value appropriate for a system.

$$f(x) = 0 \quad (0 \le x < (\alpha-1)/\alpha) \quad \text{(Expression 17)}$$
$$= \alpha(x-1) + 1 \quad ((\alpha-1)/\alpha \le x \le 1)$$
$$= 1 \quad (1 < x)$$

Suppose the amplitude of a pilot carrier is 1, and is set to be the reference, according to Expression 5, the $abs[H_n]=1$ can also be the reference. Thus, $x=abs[H_n]$.

Expression 17 shows that when the amplitude $abs[H_n]$ of a carrier signal ranges from $(\alpha-1)/\alpha$ to 1, the reliability value is related by a linear function that is proportional to the amplitude of the carrier signal. When the $abs[H_n]$ is smaller than $(\alpha-1)/\alpha$, the reliability value is zero (See FIG. 7).

The zero reliability value means that the interfering of the carrier n to the carrier m is not counted.

Figure 7:
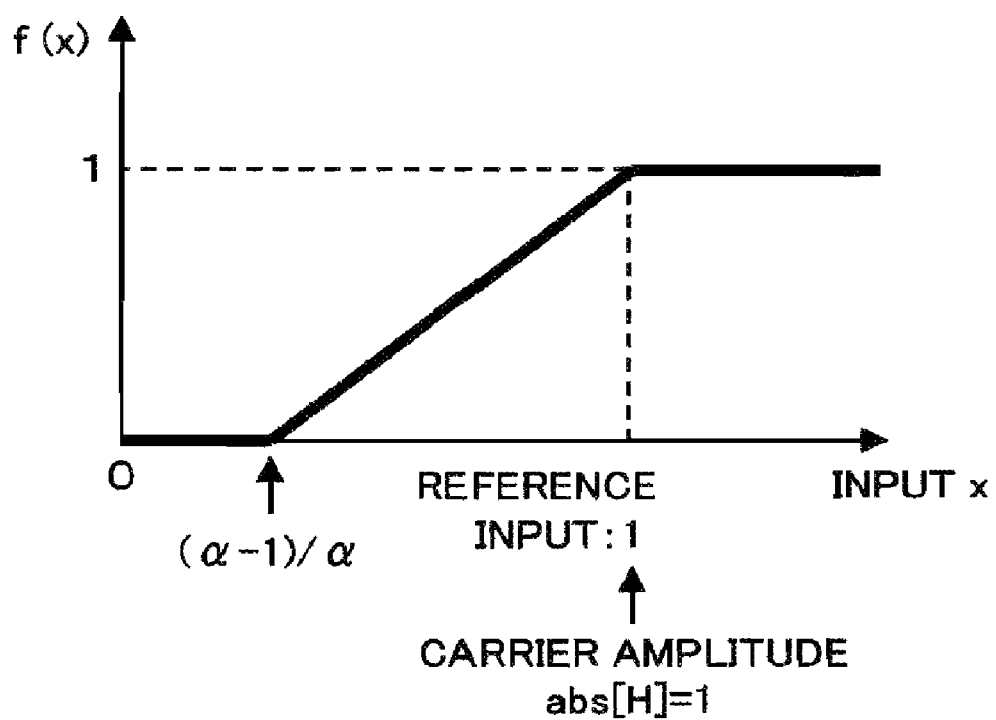
FIG. 7 is a diagram showing a characteristic when a linear function is employed as an example of the function f(x)

FIG. 7 shows the characteristic of a linear function that is employed as an example of the function $f(x)$.

Figure 8:
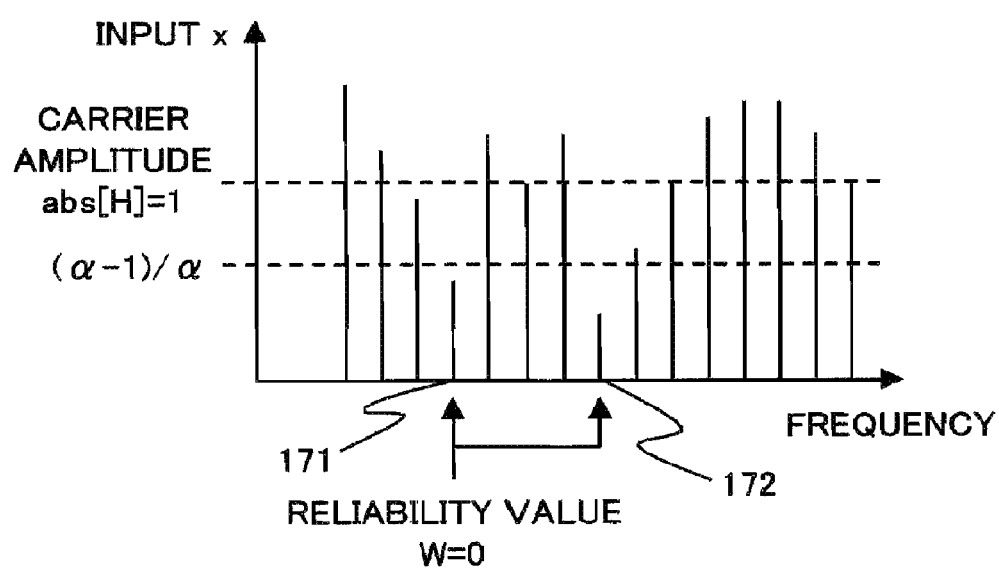
FIG. 8 schematically shows a carrier that is weighted with a reliability value when the linear function is employed as an example of the function f(x)

FIG. 8 schematically shows a carrier that is weighted with the reliability value when the linear function is employed as an example of the function $f(x)$.

As for carriers 171 and 172 whose $f(x)$ value ranges between $0-((\alpha-1)/\alpha)$, the reliability value is zero.

The following description is when the $f(x)$ is a step function as shown in Expression 18.

$$f(x) = 0 \quad (0 \le x < a) \quad \text{(Expression 18)}$$
$$= 1 \quad (a \le x)$$

For example, in a case of a step function that leads the zero reliability value in a range of $x<a$, when the amplitude of the carrier is smaller than the given threshold a, the estimated value of tentative carrier data of the carrier is assumed to have a low reliability value, and no interfering is counted.

Figure 9:
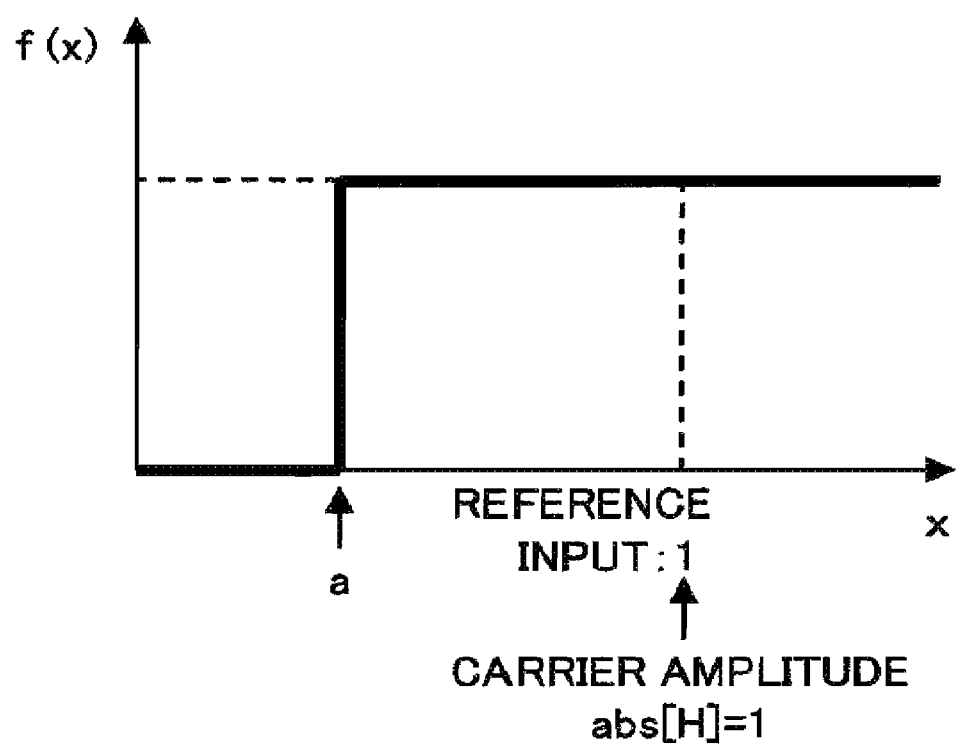
FIG. 9 is a diagram showing a characteristic when a step function is employed as an example of the function f(x)

FIG. 9 shows the characteristic of a carrier when the step function is employed as an example of the function $f(x)$.

Figure 10:
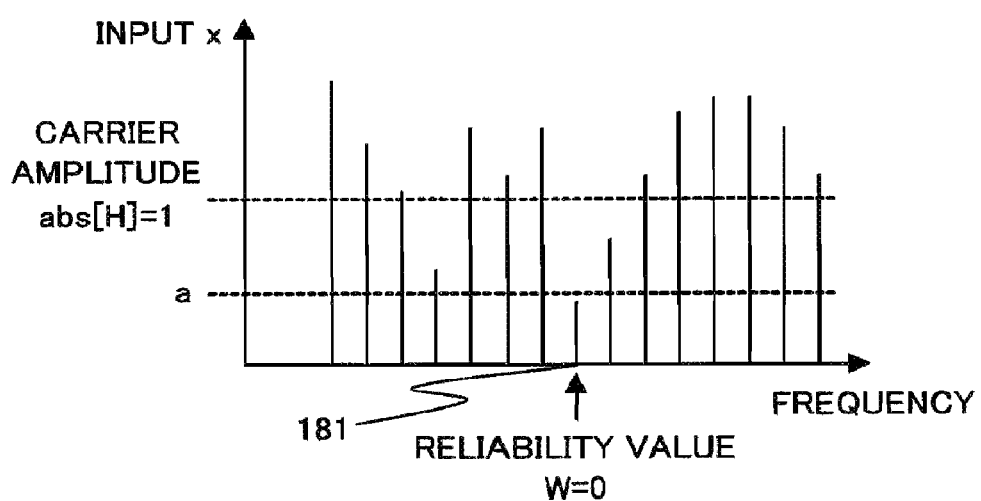
FIG. 10 schematically shows a carrier that is weighted with a reliability value when the step function is employed as the function f(x)

FIG. 10 schematically shows a carrier signal weighed with the reliability value when the step function is employed as the function $f(x)$.

For example, as for a carrier 181, when its value of the $f(x)$ is $0-a$, its reliability value is zero.

In addition, the reference input of the function $f(x)$ may be an average of amplitudes of carriers.

Figure 11:
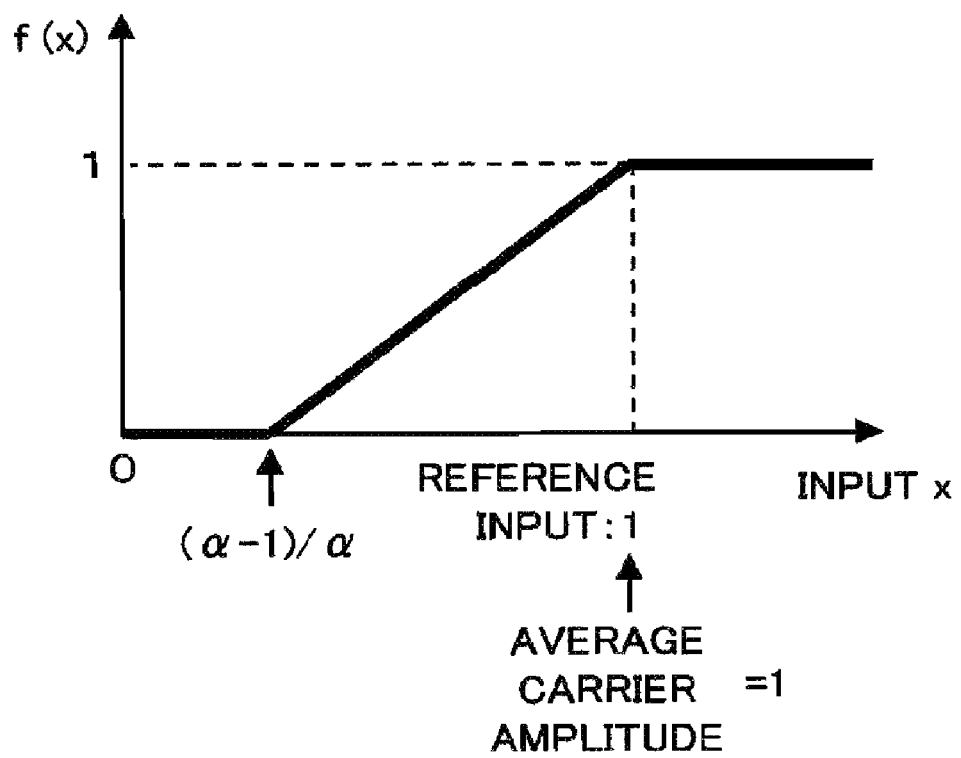
FIG. 11 is a diagram showing a characteristic when the function f(x) is the linear function and an input is normalized by an average amplitude.

FIG. 11 shows the characteristic of a carrier when the function $f(x)$ is the linear function and a input is normalized by an average of amplitudes.

Figure 12:
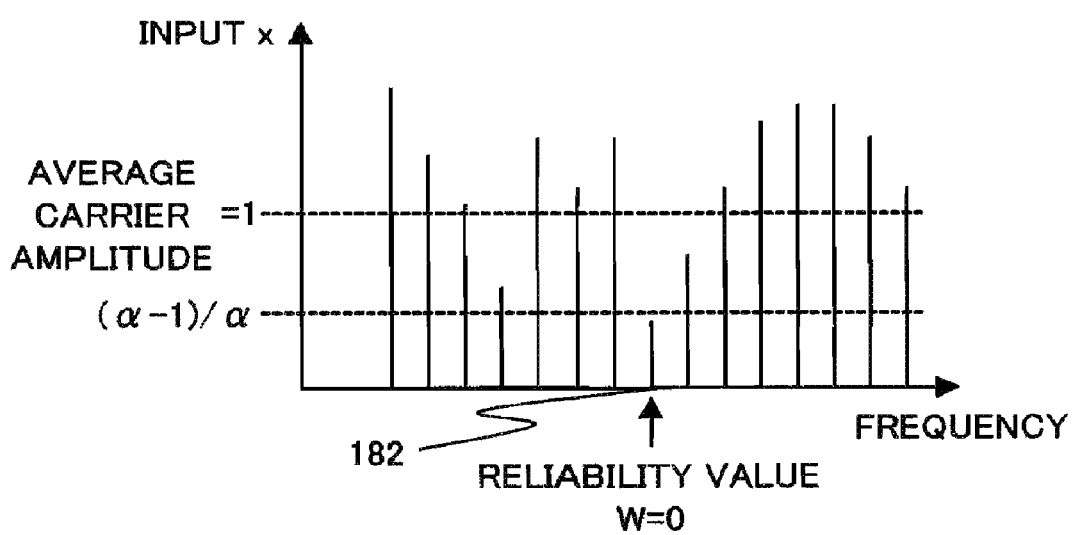
FIG. 12 schematically shows that a carrier signal is weighted by a linear function when the average amplitude of a carrier is used as the reference.

FIG. 12 schematically shows that a carrier signal is weighted by a linear function when the average of amplitudes of carriers is used as the reference. To calculate the average of amplitudes, calculation with use of all carriers (carrier 0 to carrier (N−1)) (Expression 19) and calculation with use of only a plurality of carriers in the vicinity of the carrier n (carrier (n−L) to carrier (n+L)) (Expression 20) can be used.

$$x = \text{abs}(H_n) \bigg/ \sum_{k=0}^{N-1} \text{abs}(H_k) \quad \text{(Expression 19)}$$

$$x = \text{abs}(H_n) \bigg/ \sum_{k=n-L}^{n+L} \text{abs}(H_k) \quad \text{(Expression 20)}$$

Note that, in Expression 20, the average of n=L is substituted for (n=0, 1, ... L−1). Similarly, the average of n=N−L−1 is substituted for (n=N−L, N−L+1, ..., N−1). Note that the $f(x)$ is an integer in a range of $1<L<N-2$.

Also, the input reference of the function $f(x)$ may be average power of carriers.

Figure 13:
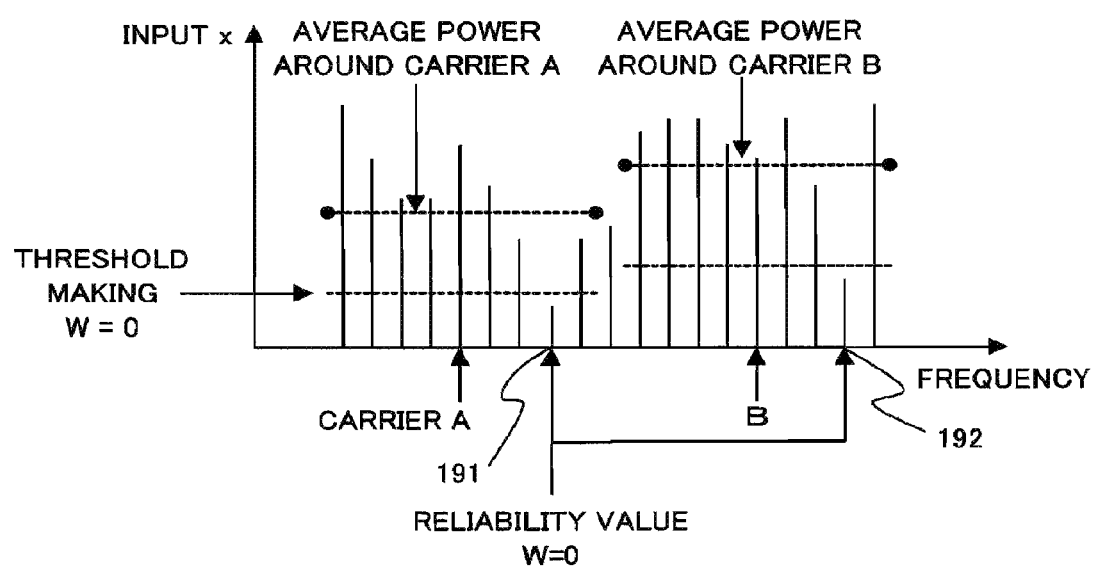
FIG. 13 schematically shows average power that is normalized by an average of a plurality of carriers.

FIG. 13 schematically shows average power when average power is normalized by an average of a plurality of carriers.

In FIG. 13, when the reference input of the function $f(x)$ is determined by the reliability value of a carrier A, the reliability value can be determined with use of a value normalized by average power calculated from a plurality of carriers in the vicinity of the carrier A. Similarly, when the reference input of the function f(x) is determined by the reliability value of a carrier B, the reliability value can be determined with use of a value normalized by average power calculated from a plurality of carriers in the vicinity of the carrier B. Thus, the reliability value can be determined by a value normalized by average power calculated with use of carriers in the vicinity of the carrier n.

In FIG. 13, the reliability value of each carrier 191 and 192 is zero.

Thus, determining the reliability value with use of the value normalized by the average power calculated in the vicinity of the carrier n causes a change in the threshold that makes the reliability value zero. Since the closer carriers suffer more from interference than the distant carriers, using the average power calculated in the vicinity of the carrier as the reference is better for accurately showing the relativity among carrier levels. Thus, the reliability value of each carrier is more accurately determined.

The input x of the function f(x) may be a square (power) of an amplitude of a carrier. In this case, the input x is as expressed in Expression 21.

$$x = abs[H_n] \cdot abs[H_n] \quad \text{(Expression 21)}$$

Also, the input x may be a square (power) of the amplitude of the carrier n normalized by the average of the carriers in the vicinity of the carrier n.

The calculation of the average power may be performed with use of all carriers (carrier 0 to carrier (N−1)) (Expression 22) and with use of only the carrier n and the carriers in its vicinity (carrier (n−L) to carrier (n+L)) (Expression 23).

$$x = (\text{abs}(H_n) \cdot \text{abs}(H_n)) \Big/ \sum_{k=0}^{N-1} (\text{abs}(H_k) \cdot \text{abs}(H_k)) \quad \text{(Expression 22)}$$

$$x = (\text{abs}(H_n) \cdot \text{abs}(H_n)) \Big/ \sum_{k=n-L}^{n+L} (\text{abs}(H_k) \cdot \text{abs}(H_k)) \quad \text{(Expression 23)}$$

Note that in Expression 23, when (n=0, 1, ..., L−1), the average of n=L is substituted. Similarly, when (n=N−L, N−L+1, ..., N−1), the average of n=N−L−1 is substituted. Note that the f(x) is an integer in a range of 2≦L≦N−2.

In addition, as shown in Expression 24, the input x may be a logarithm of the above input x.

$$x = 10 \cdot \log_{10}\left\{ (\text{abs}(H_n) \cdot \text{abs}(H_n)) \Big/ \sum_{k=0}^{N-1} (\text{abs}(H_k) \cdot \text{abs}(H_k)) \right\} \quad \text{(Expression 24)}$$

For example, Expression 24 is a logarithm of Expression 22.

The above is the description of the input x of the function f(x) when the input x is the amplitude of the carrier, the square (power) of the amplitude, and the square of the amplitude normalized by the average of the plurality of carriers.

As an example of the function f(x), the above also describes that the function f(x) that is expressed in the linear function (Expression 17) or is expressed in the step function that becomes 0 or 1 when the amplitude reaches the given threshold (Expression 18). However, the function f(x) is not limited to those as long as the reliability value of a carrier can effectively contribute to the calculation of an ICI component.

Thus, since the inter-carrier interference removal device of Embodiment 1 calculates the reliability value based on the reliability value of the carrier (Expression 8) and calculates the ICI component with use of the reliability value (Expression 10), the reliability in estimating the ICI component can be enhanced.

Accordingly, the present invention is able to remove an ICI component more accurately, and consequently improve the reception performance of the reception device that moves at a high speed in OFDM system.

Note that as for carriers of pilot carriers, since their carrier data is known to a receiving side, an interfering component can be more accurately estimated than data carriers. Accordingly, since the pilot carriers can be assumed to possess high reliability values, it is desirable not to weight the pilot carriers.

Furthermore, in ISDB-T, particular carriers are allocated to control information such as a TMCC (Transmission Multiplexing Configuration Control) signal and an AC (Auxiliary Channel) signal. The TMCC signal mainly transmits transmission parameters such as a modulation scheme and an encoding ratio, and the AC signal transmits additional information.

Figure 14:
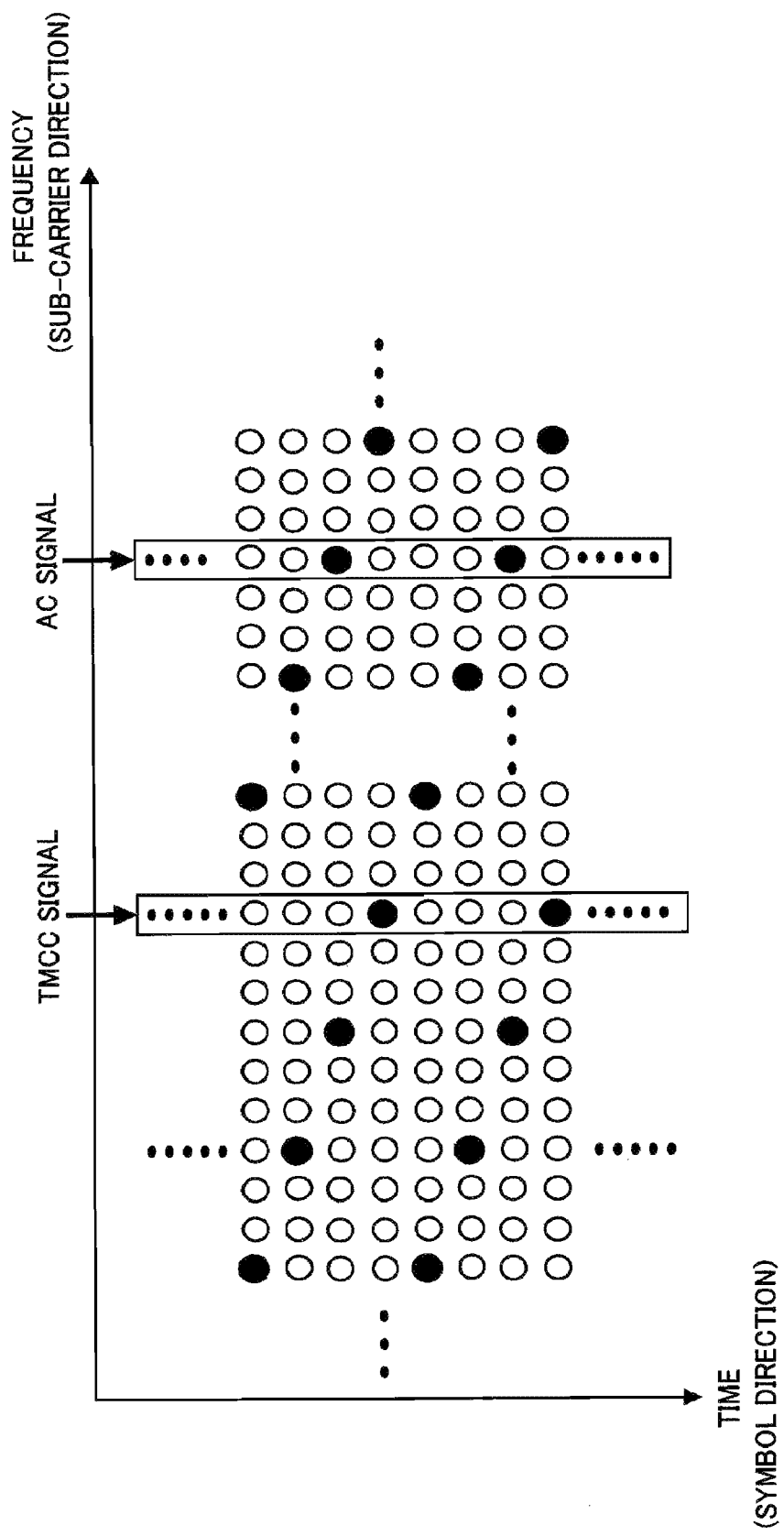
FIG. 14 is a schematic view of carriers of a TMCC signal and an AC signal in ISDB-T.

FIG. 14 schematically shows carriers of the TMCC signal and the AC signal in the ISDB-T system.

In the TMCC signal and the AC signal, since differential BPSK is used as primary modulation, the error rate is remarkably lower than data carriers that use 64QAM as the primary modulation. Therefore, in the carriers of the TMCC signal and the AC signal, an ICI component can be estimated with use of the reliable carrier data. Thus, since the carriers of the TMCC signal and the AC signal can be assumed to be reliable, and it is desirable not to weight the carriers of the TMCC signal and the AC signal.

Accordingly, suppose a carrier number of a pilot carrier is p, and a carrier number of each of the TMCC signal and the AC signal is t, when n=p, t, the reliability value $W_n(s)$ is as expressed in Expression 25.

$$W_n(s) = 1 (n=p, t) \quad \text{(Expression 25)}$$

Note that in the multiplication of the W (s) in Expression 10, modified Expression 26 shows the same operation result.

$$K(s) = \Xi \cdot W(s) \cdot H'(s) \cdot X^\sim(s) \quad \text{(Expression 26)}$$

Accordingly, in the operational process to estimate an ICI component, a multiplication process, where the W(s) is multiplied by a circuit block that estimates the ICI component, is not essential, and other process that has the same estimation result may be used.

In the channel variation estimation unit, to obtain the channel variation characteristic of the symbol s, the channel variation characteristic H'(s) of the symbol s is estimated from a symbol s+1 and a symbol s−1 that are adjacent to the symbol s. A symbol s+2 and a symbol s−2 can be also used to determine the channel variation characteristic of the symbol s. Note that the estimation does not depend on the symbol number.

Figure 15:
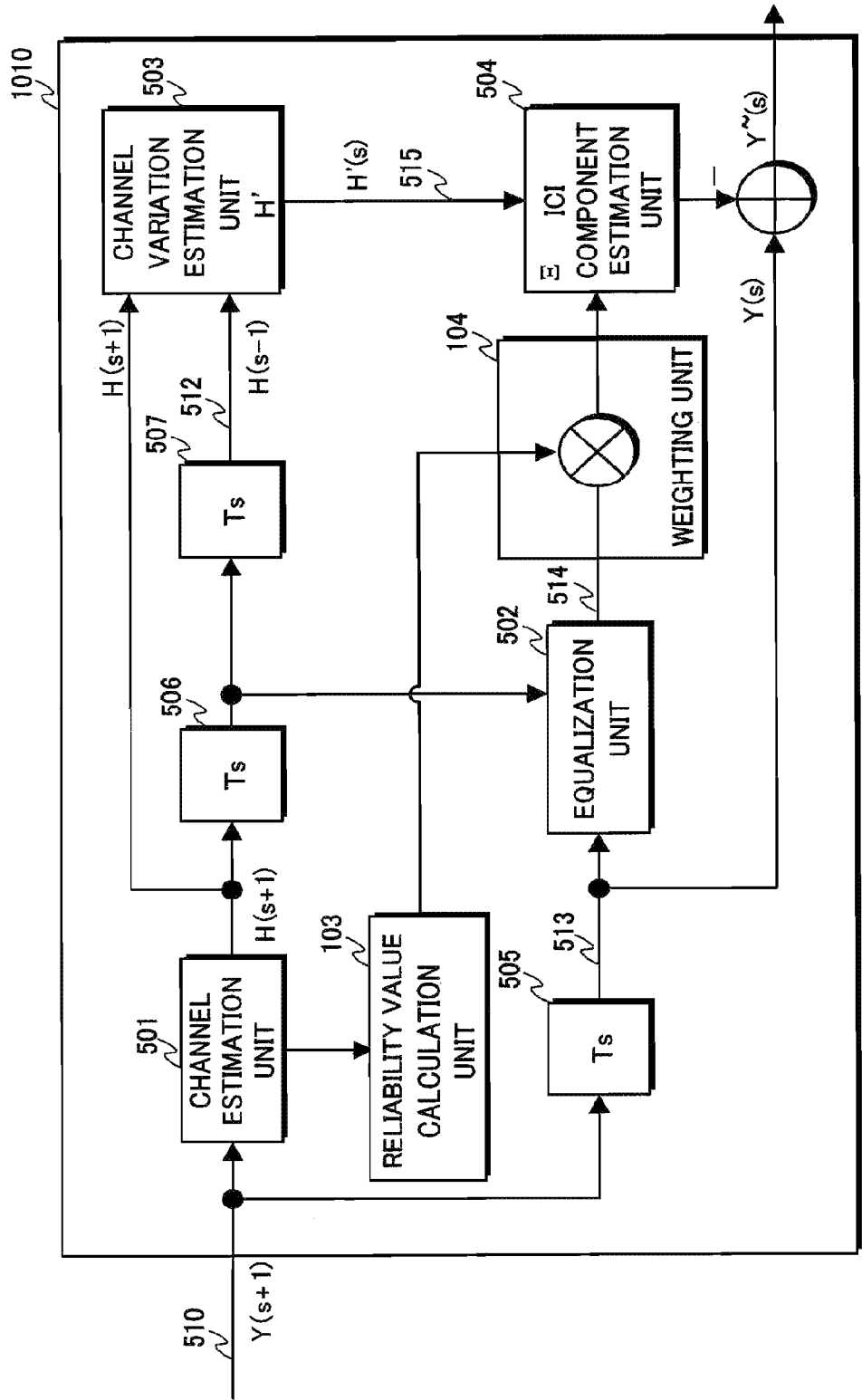
FIG. 15 is a block diagram of an inter-carrier interference removal system disclosed in Nonpatent Document to which a reliability value calculation unit and a weighting unit of the present invention are applied.

Note that when the reliability value calculation unit and the weighting unit of the present invention are applied to the inter-carrier interference removal system disclosed in Nonpatent Document 3, its processing block diagram is as shown in FIG. 15.

FIG. 15 is a block diagram of the inter-carrier interference removal system disclosed in Nonpatent Document 3 to which the reliability value calculation unit and the weighting unit of the present invention are applied.

According to the processing to which the reliability value calculation unit and the weighting unit are added as shown in FIG. 15, an inter-carrier interference component generated in a carrier is more accurately estimated and removed, which can improve the reception characteristic.

Embodiment 2

Embodiment 1 describes a case where the present invention is applied to the ICI removal system that performs feed-forward processing in which tentative symbol data is estimated, and equalization is performed again after removal of the ICI component. On the other hand, Embodiment 2 shows a case where the present invention is applied to the ICI removal system that performs feedback processing.

In specific, an inter-carrier interference removal device in accordance with Embodiment 2 calculates a reliability value based on a channel frequency characteristic estimated by the reliability value calculation unit, and weights the estimated carrier data with the reliability value. Thus, the reliability value of the estimation of the ICI component is enhanced, and carrier data can be reliably estimated by removing an ICI component more accurately. As a result, the reception performance at a high-speed travel in OFDM system can be improved.

The following describes an inter-carrier interference removal device 1200 in accordance with Embodiment 2 with reference to the attached drawings.

Figure 16:
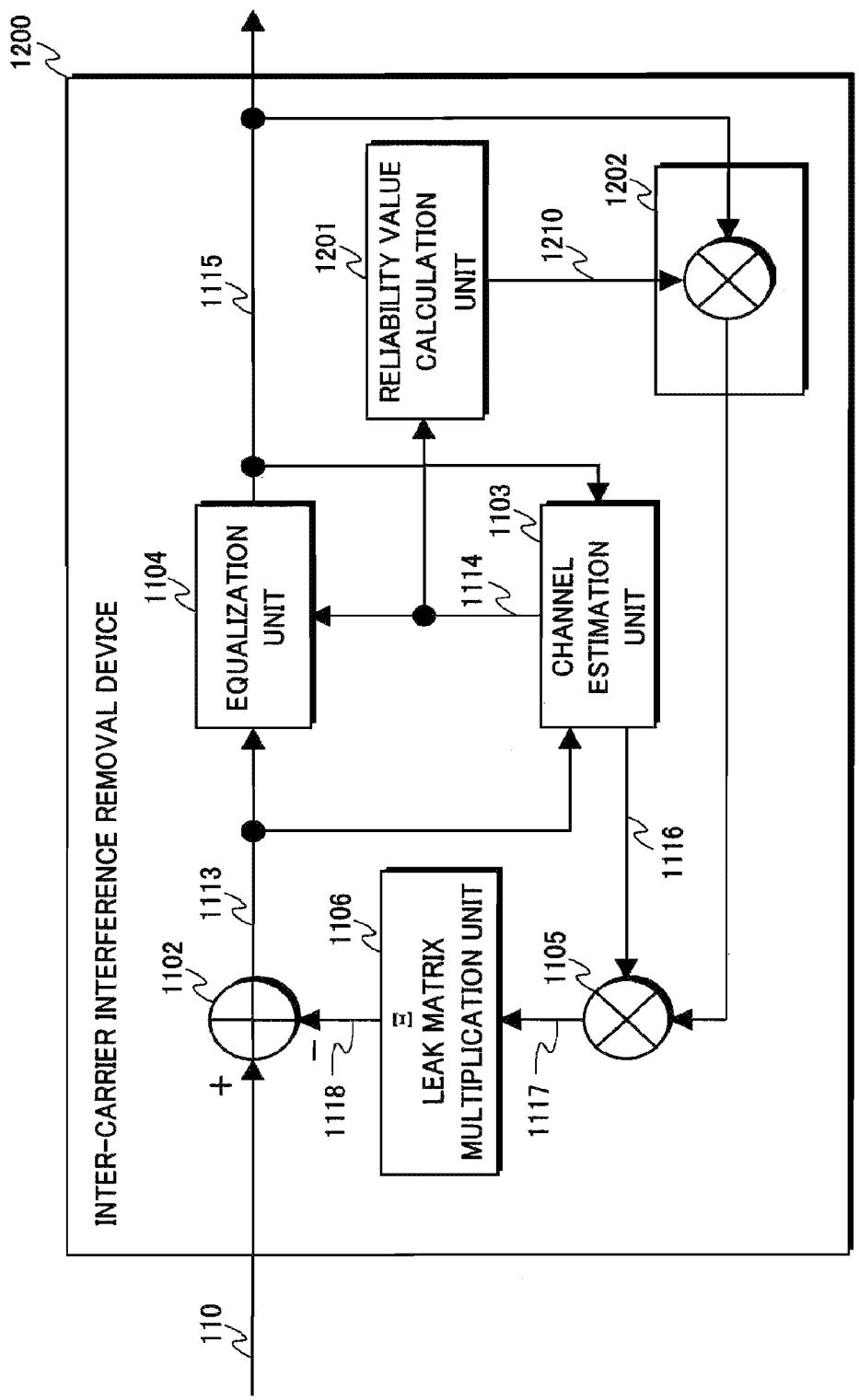
FIG. 16 is a block diagram of an inter-carrier interference removal device disclosed in Patent Document 1 to which the reliability value calculation unit and the weighting unit of the present invention are applied.

As shown in FIG. 16, the inter-carrier interference removal device 1200 is composed of a subtraction unit 1102, a channel estimation unit 1103, an equalization unit 1104, a multiplication unit 1105, a leak matrix multiplication unit 1106, a reliability value calculation unit 1201 and a weighting unit 1202.

Concretely, the inter-carrier interference removal device 1200 is implemented in an LSI.

The subtraction unit 1102 obtains a carrier signal that has been converted from a time domain signal to a frequency domain signal by an FFT unit that is an exterior unit of the inter-carrier interference removal device. The subtraction unit 1102 removes an estimated ICI component from the carrier signal by a subtraction.

The channel estimation unit 1103 estimates a channel frequency characteristic H and a time derivative d^ (namely, a time variation of a channel).

The equalization unit 1104 equalizes a carrier signal 1113 with use of the channel frequency characteristic H and outputs carrier data s^ 1115.

Based on a channel frequency characteristic 1114 estimated by the channel estimation unit 1103, the reliability value calculation unit 1201 calculates a reliability value 1210 of a carrier according to Expression 27.

$$W_n(s)=f(abs[H_n(s)])$$ (Expression 27)

With use of $W_n$, the weighting unit 1202 weights estimated carrier data $s^\char`^_n$ of each carrier.

The multiplication unit 1105 multiplies the time derivative d^ 1116 and the carrier data weighted by the weighting unit 1202 together. The leak matrix multiplication unit 1106 further multiplies a multiplication result by the leak matrix Ξ, and estimates an ICI component 1118.

The feedback processing repeats the above operational processing for multiple times, which improves the estimation accuracy of an ICI component.

Expression 28 shows the feedback processing mathematically. The operation shown in Expression 28 enables the accurate estimation of the carrier data.

$$Y(i)=Y-\Xi \cdot (d^\char`^(i-1) \cdot s^\char`^(i-1) \cdot \text{diag}(W_n(s)))$$ (Expression 28)

Herein, the "i" shows the number of the operational processing.

Figure 17:
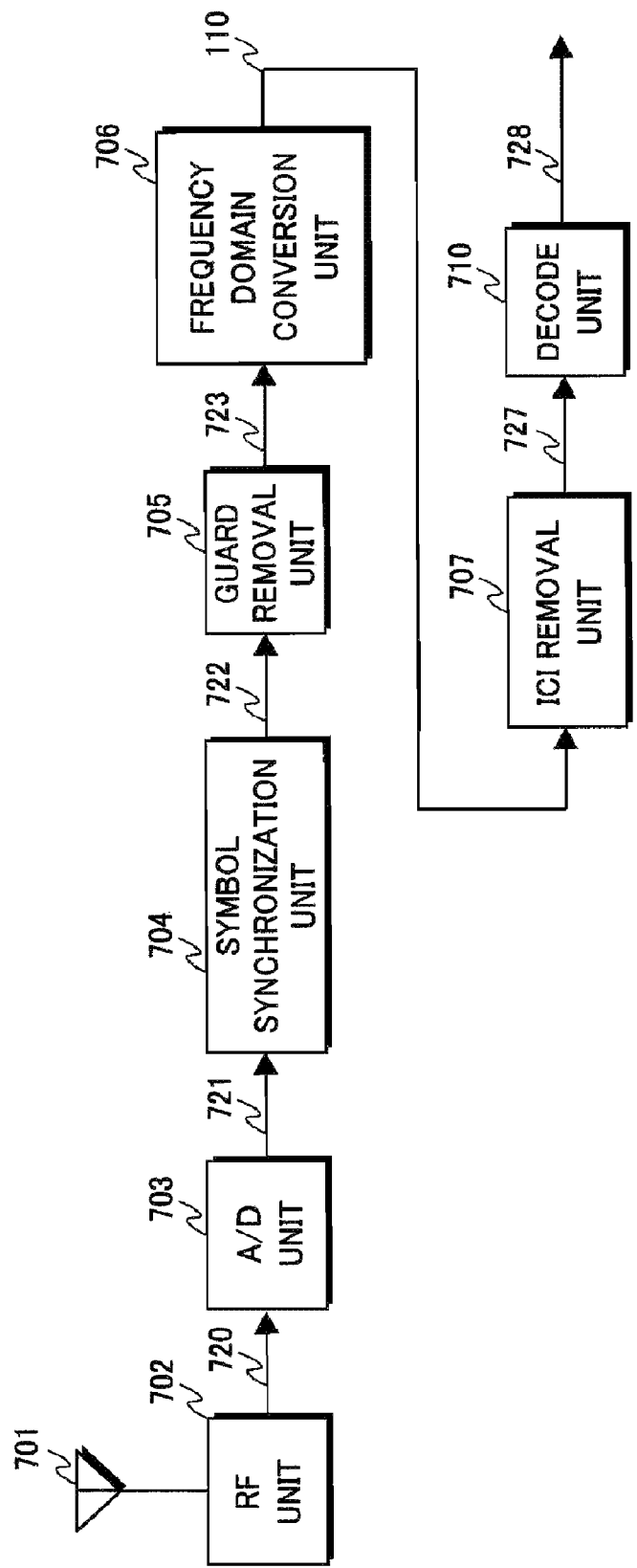
FIG. 17 is a block diagram of an inter-carrier interference removal device in accordance with Embodiment 2 of the present invention.

Note that the output from the inter-carrier interference removal device 1200 is the carrier data, and that the inter-carrier interference removal device 1200 is equivalent to the ICI removal unit 707 in FIG. 17. As shown in FIG. 17, the subsequent stage to the ICI removal unit 707 is not a channel estimation unit or equalization unit but the decode unit 710.

As described above, since the inter-carrier interference removal device 1200 of Embodiment 2 calculates the reliability value 1210 based on the channel frequency characteristic 1114 estimated by the reliability value calculation unit 1201, and weights the estimated value of the carrier data 1115 with the reliability value 1210, the ICI component can be more reliably estimated.

Accordingly, the inter-carrier interference removal device 1200 removes an ICI component and estimates carrier data more accurately, which results in improvement in the reception performance at a high-speed move in OFDM system.

As described in Embodiments 1 and 2, the present invention weights the adjacent carriers based on the reliability value of the carrier, and estimates an ICI component. The present invention focuses attention on dependency of an ICI component on carrier data of neighboring carriers. The present invention can be applied to any system to estimate an ICI component, the leak from the adjacent carriers being considered. A detailed ICI removal method or circuit configuration of the ICI removal is not essential.

Embodiment 3

In Embodiments 1 and 2, a description is made on a case in which an estimated ICI component is removed by being subtracted from a received carrier signal. Embodiment 3 describes a case where the present invention is applied to a calculation, with use of an inverse matrix operation, of carrier data from which an ICI component has been directly removed.

First, the processing performed in Embodiment 3 is described with use of expressions. Subsequently, the configuration and the operation of the Embodiment 3 are described.

As one of the formula to estimate an ICI component (Expression 10), Expression 29 shows a case in which weighting is not performed with use of the reliability value.

$$K(s)=\Xi \cdot H'(s) \cdot X^\sim(s)$$ (Expression 29)

A carrier signal from which an ICI component has been removed can be expressed as $Y(s)=H(s) \cdot X(s)$. Accordingly, in Expression 29, carrier data is supposed to be carrier data $X^\sim$. When $X^\sim(s)=X(s)$, relational expression as shown in Expression 30 can be obtained from Expression 15.

$$H(s) \cdot X(s)=Y^\sim(s)-\Xi \cdot H'(s) \cdot X(s)$$ (Expression 30)

is modified to $$H(s) \cdot X(s)+\Xi \cdot H'(s) \cdot X(s)=Y^\sim(s)$$ (Expression 31)

is further modified to obtain $$X(s)=(H(s)+\Xi \cdot H'(s))^{-1} \cdot Y^\sim(s)$$ (Expression 32)

Herein, $(\cdot)^{-1}$ shows the inverse matrix operation.

Accordingly, multiplying the inverse matrix of $(H(s)+\Xi \cdot H'(s))$ with a received carrier signal $Y^\sim(s)$ directly results carrier data X (s) from which an ICI component has been removed. (H(s)+Ξ·H'(s)) is supposed to be the channel frequency characteristic that includes inter-carrier interference.

In Expression 32, H(s) and H'(s) are variables to be estimated. Since H'(s) is calculated from Expression 7, the estimation value of the reliability value is determined according to a carrier level.

Therefore, similarly to Embodiment 1, the reliability value $W_n(s)$ that is determined based on the $H_n(s)$ is defined as shown in Expression 33. When H'(s) is weighted according to the reliability value of each carrier, the channel frequency characteristic including inter-carrier interference can be calculated accurately.

$$W_n(s)=f(abs[H_n(s)])\quad\text{(Expression 33)}$$

Accordingly, $$X(s)=(H(s)+\Xi\cdot H'(s)\cdot\text{diag}(W_n(s)))^{-1}\cdot Y(s)\quad\text{(Expression 34)}$$

Thus, the operation shown in Expression 34 enables accurate estimation of carrier data.

Below is a description of an inter-carrier interference removal device 1400 in accordance with Embodiment 3 that estimates carrier data based on Expression 34.

Figure 18:
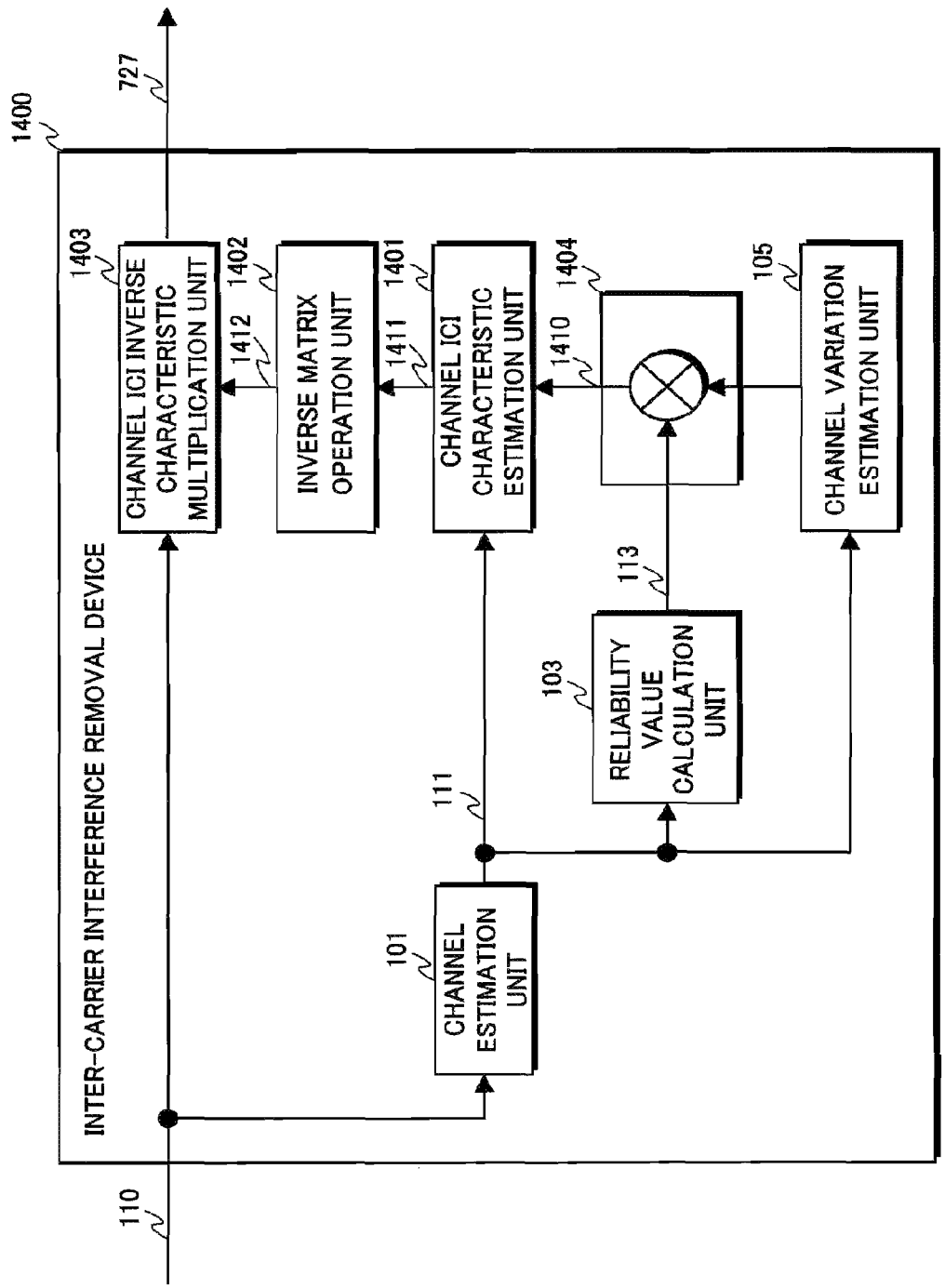
FIG. 18 is a detailed block diagram of an inter-carrier interference removal device in accordance with Embodiment 3 of the present invention.

As shown in FIG. 18, the inter-carrier interference removal device 1400 is composed of a channel estimation unit 101, a reliability value calculation unit 103, a channel variation estimation unit 105, a channel ICI characteristic estimation unit 1401, an inverse matrix operation unit 1402, a channel ICI inverse characteristic multiplication unit 1403 and a weighting unit 1404.

The configuration units that are basically identical with those that have been already described have identical reference numbers. Description of such configuration units is omitted unless necessary.

The weighting unit 1404 weights the $H'_n(s)$ estimated by the channel variation estimation unit 105 by multiplying with the reliability value $W_n(s)$ calculated by the reliability value calculation unit 103. The weighting unit 1404 outputs a multiplication result that is the channel variation characteristic 1410.

As shown in Expression 35, the channel ICI characteristic estimation unit 1401 estimates a channel ICI characteristic K'(s) that includes mutual interference characteristic of ICI with use of the channel characteristic H(s) and the channel variation characteristic H'(s)·diag($W_n(s)$) weighted by the leak matrix Ξ.

$$K'(s)=H(s)+\Xi\cdot H'(s)\cdot\text{diag}(W_n(s))\quad\text{(Expression 35)}$$

The inverse matrix operation unit 1402 calculates an inverse matrix of the channel ICI characteristic K'(s), and calculates the inverse characteristic of the channel ICI characteristic 1411.

The channel ICI inverse characteristic multiplication unit 1403 estimates carrier data by multiplexing a carrier signal 110 with the inverse characteristic 1412 of the channel ICI characteristic.

Note that it is carrier data that the inter-carrier interference removal device 1400 outputs. Therefore, similarly to the reception device shown in FIG. 17, the reception device that includes the inter-carrier interference removal device 1400 does not have a channel estimation unit or an equalization unit but has a decode unit in later stage.

Thus, the inter-carrier interference removal device 1400 of Embodiment 3 calculates a reliability value of a carrier based on the channel frequency characteristic H estimated by the channel estimation unit 101, and weights the channel variation characteristic H' with the reliability value. Consequently, the reliability value of the estimation of the channel frequency characteristic including an ICI component (referred to as a channel ICI characteristic) can be enhanced.

Accordingly, carrier data can be obtained more accurately by removing an ICI component. As a result, the reception performance at a high-speed move in OFDM system is improved.

Embodiment 4

When there is interference in a received channel bandwidth, the interference exerts a negative influence on the estimation of an ICI component, and the effect of ICI removal is suppressed. The interference may be an NTSC (National Television System Committee) signal that is a terrestrial analog broadcasting signal, a CW (Continuous Wave) interference, etc. Especially in the NTSC signal, the interference may be a video sub-carrier and a main audio sub-carrier narrowband interference.

According to Embodiment 4, such interference is detected, and a detected result is reflected to a reliability value of a carrier. Thus, degradation of the influence of the ICI removal can be prevented.

Figure 19:
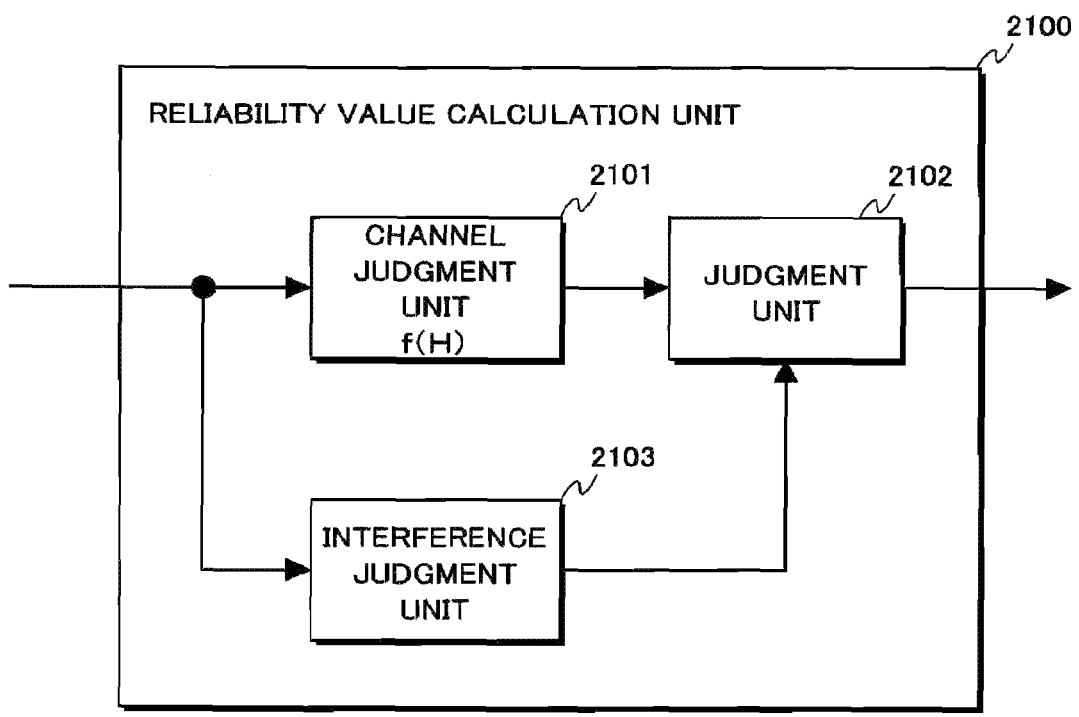
FIG. 19 is a block diagram of a reliability value calculation unit in an inter-carrier interference removal device in accordance with Embodiment 4 of the present invention.

FIG. 19 is a block diagram showing the configuration of a reliability value calculation unit 2100 in an inter-carrier interference removal device in accordance with Embodiment 4.

As shown in FIG. 19, the reliability value calculation unit 2100 is composed of a channel judgment unit 2101, a judgment unit 2102 and an interference judgment unit 2103.

The channel judgment unit 2101 performs the same function as the reliability value calculation unit 103 of Embodiment 1. That is to say, the channel frequency characteristic is inputted in a given function, and a reliability value is outputted as channel information.

The interference judgment unit 2103 detects interference of every carrier.

Figure 20:
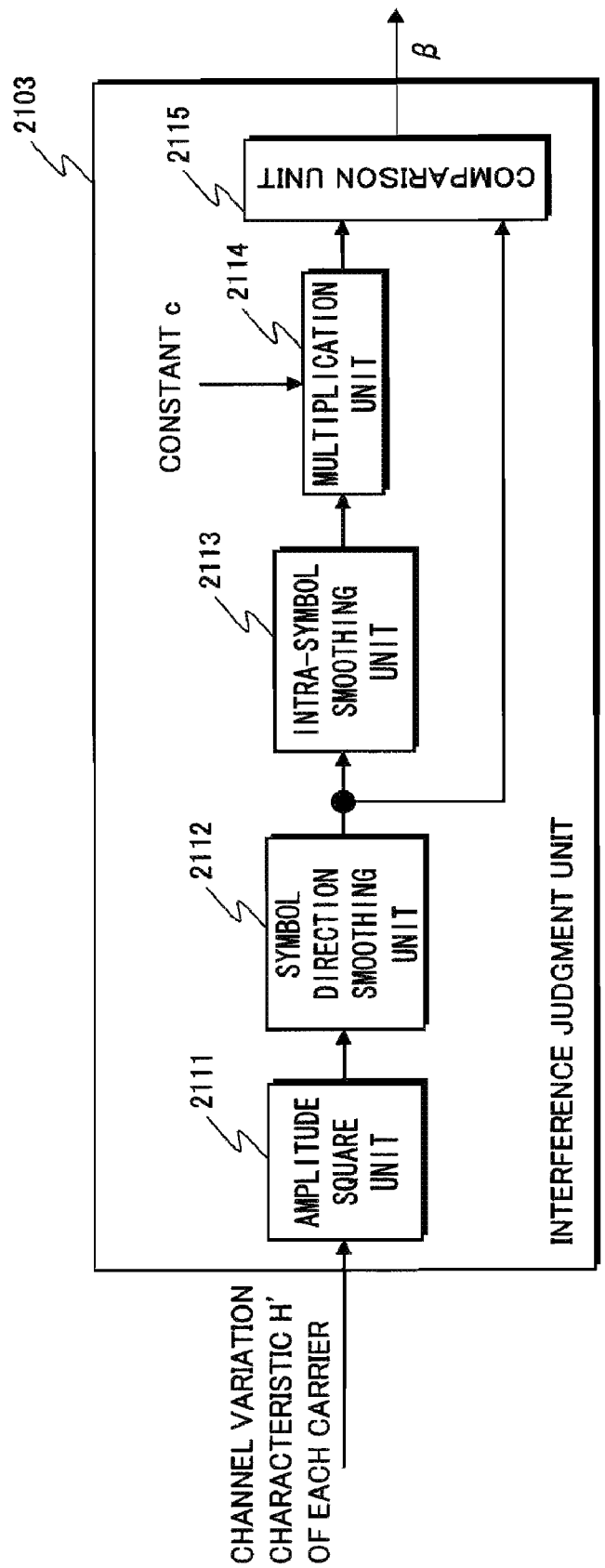
FIG. 20 is a block diagram of an interference judgment unit in the inter-carrier interference removal device of Embodiment 4.

FIG. 20 is a block diagram that shows the configuration of the interference judgment unit 2103 in the inter-carrier interference removal device of Embodiment 4.

The interference judgment unit 2103 is composed of an amplitude square unit 2111, a symbol direction smoothing unit 2112, an intra-symbol smoothing unit 2113, a multiplication unit 2114, and a comparison unit 2115.

The amplitude square unit 2111 squares an amplitude of the channel variation characteristic of each carrier and outputs the square amplitude of the variation characteristic to the symbol direction smoothing unit 2112.

The symbol direction smoothing unit 2112 smoothes the square amplitude of the variation characteristic of each carrier in the symbol direction, and outputs the square amplitude to the intra-symbol smoothing unit 2113 and the comparison unit 2115. In this embodiment, byway of example, the channel variation characteristics of 128 symbols are smoothed, however the number of the symbols is not limited to this.

The intra-symbol smoothing unit 2113 calculates an average of all the carriers in the symbol that correspond to the smoothed square amplitude of the variation characteristic outputted by the symbol direction smoothing unit 2112, and outputs the average to the multiplication unit 2114.

The multiplication unit 2114 multiplies a smoothed signal in the symbol with a given coefficient, and outputs the result to the comparison unit 2115. In this embodiment, the coefficient c is 16, for example, however the coefficient c is not limited to this value.

The comparison unit 2115 compares, for every carrier, the output result of the multiplication unit 2114 and the square amplitude of the variation characteristic smoothed in the symbol direction. The comparison unit 2115 outputs the comparative result $\beta_n$ of an n-th carrier as interference information to the judgment unit 2102.

In this embodiment, the comparative result $\beta_n$ has two values. The square amplitude of the variation characteristic larger than the output of the multiplication unit is represented by $\beta_n=0$, and the square amplitude of the variation characteristic smaller than the output is represented by $\beta_n=1$. However, according to an amplitude of the interference, multiple values are acceptable. The number of the comparative result $\beta_n$ is not limited to the above value.

The following describes an effect that is produced when the interfering judgment unit 2103 is used.

When a carrier has narrowband interference, the reliability value of the present carrier is decreased and the channel characteristic of the carrier has wide variations. The channel variation characteristic of the carrier is relatively larger than an average of the channel variation characteristics of total carriers (output of the intra-symbol smoothing unit). Therefore, it can be judged that the carrier with a relatively large channel variation characteristic H' compared with the average has interference.

In addition, smoothing the square in the symbol direction enables to enhance the detecting accuracy of interference.

The judgment unit 2102 outputs the reliability value based on the channel information outputted by the channel judgment unit 2101 and the interference information outputted by the interference judgment unit. In this embodiment, as shown in Expression 36, multiplication of the channel information and the interference information is outputted as the reliability value $W_n$.

$$Wn=f(H_n)\cdot\beta_n \quad \text{(Expression 36)}$$

The reliability value calculation unit 2100 configured as above is able to specify a carrier in which interference occurs as well as to estimate the reliability value of a carrier influenced by the channel characteristic. A reliability value is further determined with use of the specified carrier whose $\beta=0$ by the judgment unit 2102. An ICI component is generated by weighting the carrier with use of the reliability value. Thus, it can be avoided to estimate an erroneous ICI component from carriers with a low reliability value due to the interference. Accordingly, the ICI component estimation accuracy is improved, which brings about the improvement in the reception performance at a high-speed move.

Embodiment 5

In Embodiment 5, the inter-carrier interference removal device of the present invention is applied to a diversity reception device that uses a plurality of antennas.

First, differences between Embodiments 1 and 5 are described.

Figure 21:
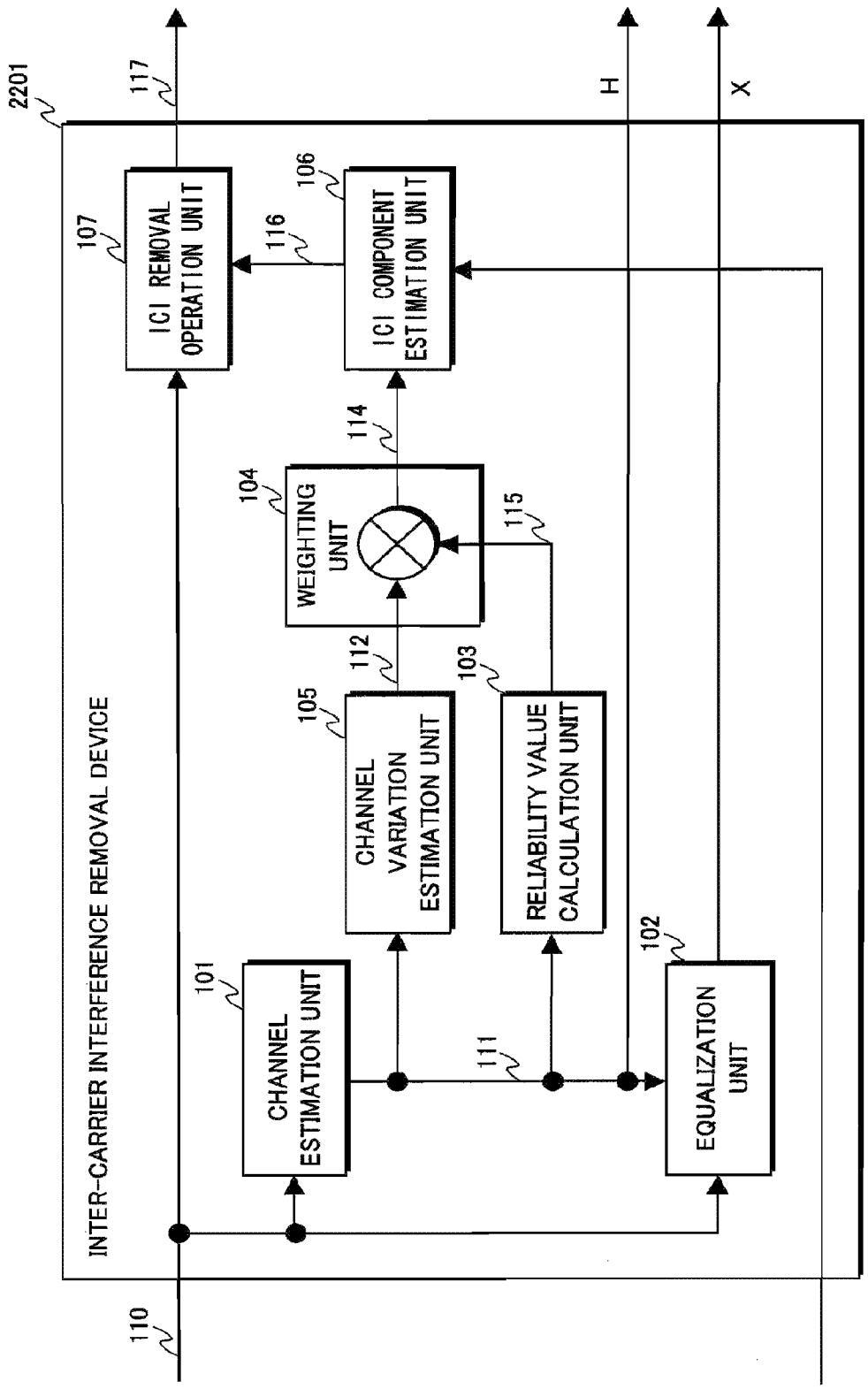
FIG. 21 is a block diagram of a diversity reception device to which the inter-carrier interference removal device of the present invention is applied.

FIG. 21 is a block diagram of an inter-carrier interference removal device in accordance with Embodiment 5 of the present invention.

The channel frequency characteristic outputted by the channel estimation unit 101 and tentative carrier data outputted by the equalization unit 102 are outputted to the outside of the inter-carrier interference removal device. An output by the reliability value calculation unit 103 is weighted by an output by the channel variation estimation unit 105.

An input to the ICI component estimation unit 106 is carrier data that is obtained by branch combination that is described later.

Figure 22:
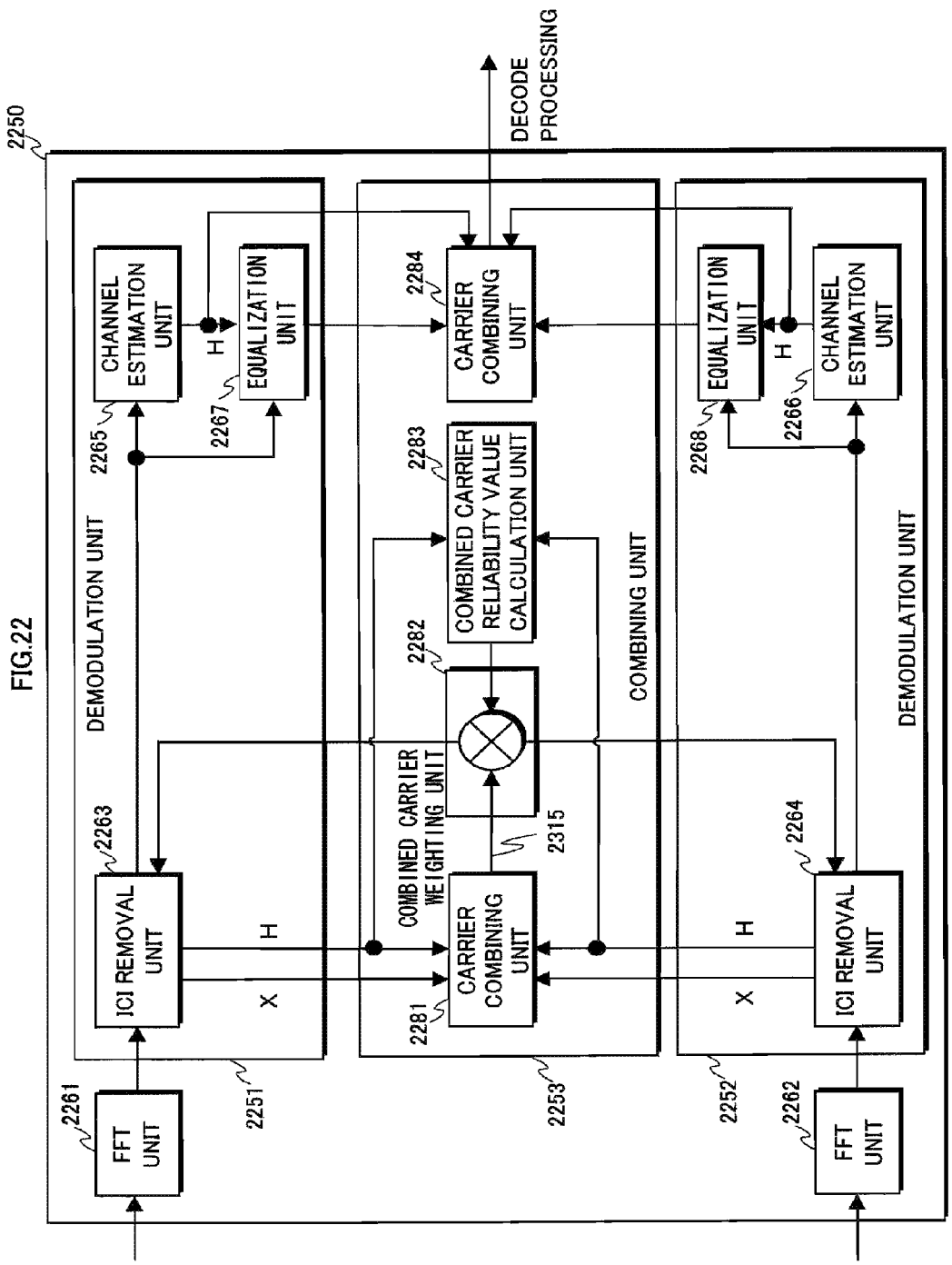
FIG. 22 is a block diagram of a demodulation unit for diversity reception that includes in an inter-carrier interference removal device in accordance with Embodiment 5 of the present invention.

FIG. 22 is a block diagram of a diversity reception device 2250 that includes an inter-carrier interference removal device 2201 of Embodiment 5.

The inter-carrier interference removal device 2201 is equivalent to ICI removal units 2663 and 2664 in the reception device.

The reception device 2250 includes a plurality of demodulation units 2251 and 2252 installed at each branch and a combining unit 2253.

The demodulation unit 2251 is provided with an ICI removal unit 2263, a channel estimation unit 2265 and an equalization unit 2267. Similarly, the demodulation unit 2252 is provided with an ICI removal unit 2264, a channel estimation unit 2266 and an equalization unit 2268.

The combining unit 2253 is provided with carrier combining units 2281 and 2284, a combined carrier weighting unit 2282 and a combined carrier reliability value calculation unit 2283.

In this embodiment, a demodulator that includes demodulation units for diversity reception is called a branch or a system.

The reception device of Embodiment 5 is provided with two branches each including the demodulation unit 2251 or the demodulation unit 2252.

The carrier combining units 2281 and 2284 each combines carrier data of every carrier outputted by the demodulation units (2251, 2252). In this embodiment, Maximum Ratio Combining (MRC) is described as a combining method. In the carrier combining unit 228, operation is processed as shown in the following expression.

$$Xc1^\sim_n(s)=\{|H_n(s,1)|^2\cdot X_n(s,1)+|H_n(s,2)|^2\}\cdot X_n(s,2)\}/(|H_n(s,1)|^2+|H_n(s,2)|^2) \quad \text{(Expression 37)}$$

Herein, $Xc1^\sim(s)$ is supposed to be $$Xc1^\sim(s)=[Xc1^\sim_0(s),Xc1^\sim_1(s),\ldots,Xc1^\sim_{N-1}(s)]^T \quad \text{(Expression 38)}$$

$X_n(s, b)$ and $H_n(s, b)$ respectively show carrier data and channel frequency characteristic of the n-th carrier in the s-th symbol's b-th system.

The combined carrier reliability value calculation unit 2283 calculates a reliability value (combined carrier reliability value) of the combined carrier data 2315 for every carrier. The combined carrier weighting unit 2282 weights the combined carrier data 2315 with the combined carrier reliability value.

Subsequently, the ICI removal units 2263 and 2264 of the demodulation unit are described in detail.

First, with use of the channel estimation results of H(s+1) and H(s−1), the variation component H'(s, b) is determined. In this embodiment, as shown in the following expression byway of example of calculation of the variation component, the variation is determined with use of a symbol adjacent to the (s−1)-th symbol and the (s+1)-th symbol.

$$H'_n(s,b)=\{H_n(s+1,b)-H_n(s-1,b)\}/(2\cdot Ts) \quad \text{(Expression 39)}$$

Herein, H'(s, b) is supposed to be as follows.

$$H'(s,b)=\text{diag}(H'_n(s,b)) \quad \text{(Expression 40)}$$

In Embodiment 5, this H' is weighted according to the reliability value. By way of example of this embodiment, weighting is processed based on H(s, b). In addition, the reliability value of the combined carrier data 2315 is calculated and the combined carrier data 2315 is weighted. Based on the weighted combined carrier data, an ICI component is estimated and removed.

As the combined carrier reliability value calculated by the combined carrier reliability value calculation unit 2283, a total sum power of all branches obtained by each carrier can be used. A reliability value $Pc1_n$ of the n-th carrier is determined by the operation shown in the following expression.

$$Pc1_n(s)=|H_n(s,1)|^2+|H_n(s,2)|^2 \quad \text{(Expression 41)}$$

(n=0, N−1)

Herein, Pc1(s) is supposed to be as follows.

$$Pc1(s)=\text{diag}(Pc1_n(s)) \quad \text{(Expression 42)}$$

Accordingly, the weighted combined carrier data is as follows.

$$Xc1\hat{}(s)=Pc1(s)\cdot Xc1\tilde{}(s) \quad \text{(Expression 43)}$$

Xc1^ (s) which is the combined carrier data Xc1~ that is weighted is used as tentative carrier data to estimate an ICI component. Accordingly, an estimated value $K_n$(s, b) of an ICI component in the n-th carrier of the s-th symbol's b-th system is as follows.

$$\begin{aligned}K_n(s,b) &= \Xi \cdot \{H'(s,b)\cdot W(s,b)\}\cdot Xc1\hat{}(s) \\ &= \Xi \cdot \{\text{diag}(H'_n(s,b))\cdot \text{diag}(w_n(s,b))\} \cdot \\ &\quad \{\text{diag}(Pc1_n(s))\cdot Xc1\tilde{}(s)\}\end{aligned} \quad \text{(Expression 44)}$$

Thus, channel variation characteristic estimated for each branch is weighted with use of the channel characteristic w(s, b) of each branch. A tentative data symbol that is obtained by the diversity combining is weighted with use of the combined power Pc1(s). Thus, an ICI component in the diversity configuration can effectively be removed.

Embodiment 6

In Embodiment 5, the combined carrier reliability value calculation unit 2283 calculates the combined carrier reliability value based on the channel frequency characteristic Hn. In Embodiment 6, a combined carrier reliability value is calculated based on the tentative carrier data and the combined carrier data of each branch. Thus, a carrier that suffers from interferences is effectively judged, which suppresses erroneous estimation of an ICI component in the carrier.

Following is a description of when there are two branches.

Figure 23:
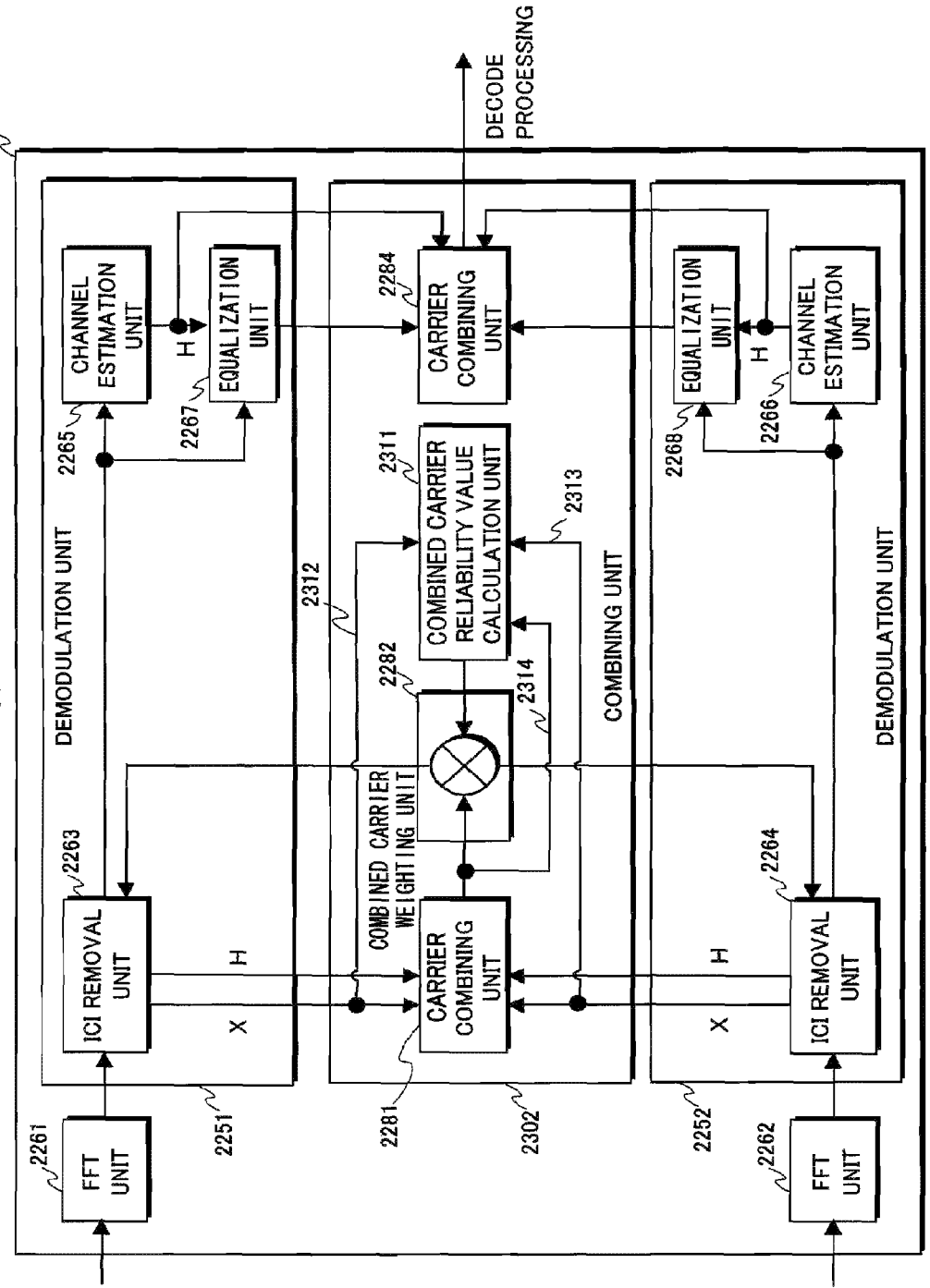
FIG. 23 is a block diagram of an inter-carrier interference removal device in accordance with Embodiment 6 of the present invention.

FIG. 23 is a block diagram of an inter-carrier interference removal device 2301 that includes demodulation units 2251 and 2252 and a combining unit 2302.

A combined carrier reliability value calculation unit 2311 in the combining unit 2302 calculates a combined carrier reliability value based on carrier data 2312 and 2313 and combined carrier data 2314 of each branch.

Following is a detailed description of the concrete calculation method.

Although an interference-free carrier whose channel has noises from a transmitter station to a reception device, a receiver can correctly perform channel estimation. Accordingly, carrier data of each branch is concentrated in the vicinity of a given signal.

On the other hand, in another carrier that is influenced by interference, channel estimation is not correctly performed. Therefore, carrier data $X_n$(s, b) of each branch is dispersed from a given signal point.

Accordingly, when the distance between signal points of carrier data 2312 and 2313 and signal points of combined carrier data 2314 for each branch is judged smaller than a given default threshold value, it can be accurately judged if the carrier data is influenced by interference.

Figure 24:
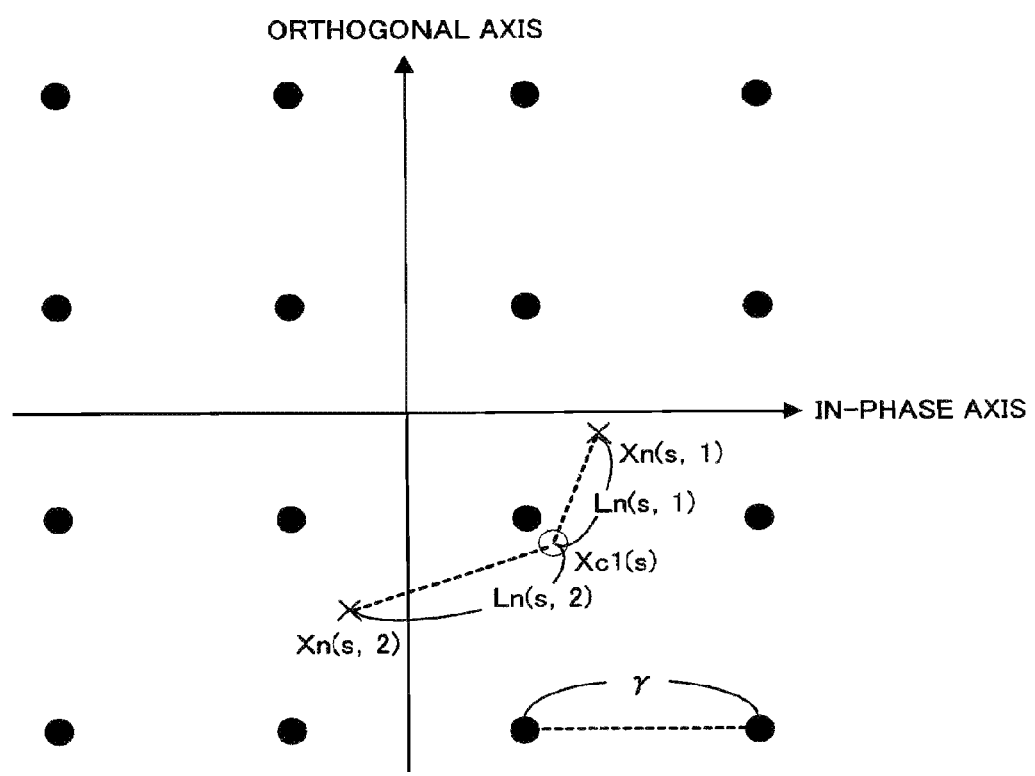
FIG. 24 is a schematic view showing a distance between a signal point of tentative carrier data of each branch and a signal point of combined carrier data.

FIG. 24 schematically shows each distance between a signal point of carrier data of each branch and a signal point of combined carrier data of each branch. In FIG. 24, the distance between the carrier data $X_n$(s, b) and the combined carrier data Xc1(s) is represented by Ln(s, b), a threshold is represented by γ, and the number of branches is represented by b (b∈1, 2).

First, for each branch, $LEN_n$(s, b) which is a difference between the threshold γ and $L_n$(s, b) is evaluated.

$$LEN_n(s,1)=\gamma-L_n(s,1) \quad \text{(Expression 45)}$$

$$LEN_n(s,2)=\gamma-L_n(s,2) \quad \text{(Expression 46)}$$

In this embodiment, the threshold γ is a distance between symbols that is determined by a modulation scheme. The polarity is judged by two values; if a value exceeds the threshold or not. In other words, each polarity of $LEN_n$(s, 1) and $LEN_n$(s, 2) is judged.

When the polarity is negative, the $L_n$(s, b) exceeds the threshold. Thus, the weight $Pc1_n$(s) is decreased. In this embodiment, $Pc1_n$(s)=0, for example.

Accordingly, a carrier that is influenced by interference is effectively judged, and erroneous estimation of an ICI component of the carrier can be suppressed.

Note that when there are four branches, LEN, can be expressed as follows.

$$LEN_n(s,1)=\gamma-L_n(s,1) \quad \text{(Expression 47)}$$

$$LEN_n(s,2)=\gamma-L_n(s,2) \quad \text{(Expression 48)}$$

$$LEN_n(s,3)=\gamma-L_n(s,3) \quad \text{(Expression 49)}$$

$$LEN_n(s,4)=\gamma-L_n(s,4) \quad \text{(Expression 50)}$$

Figure 25:
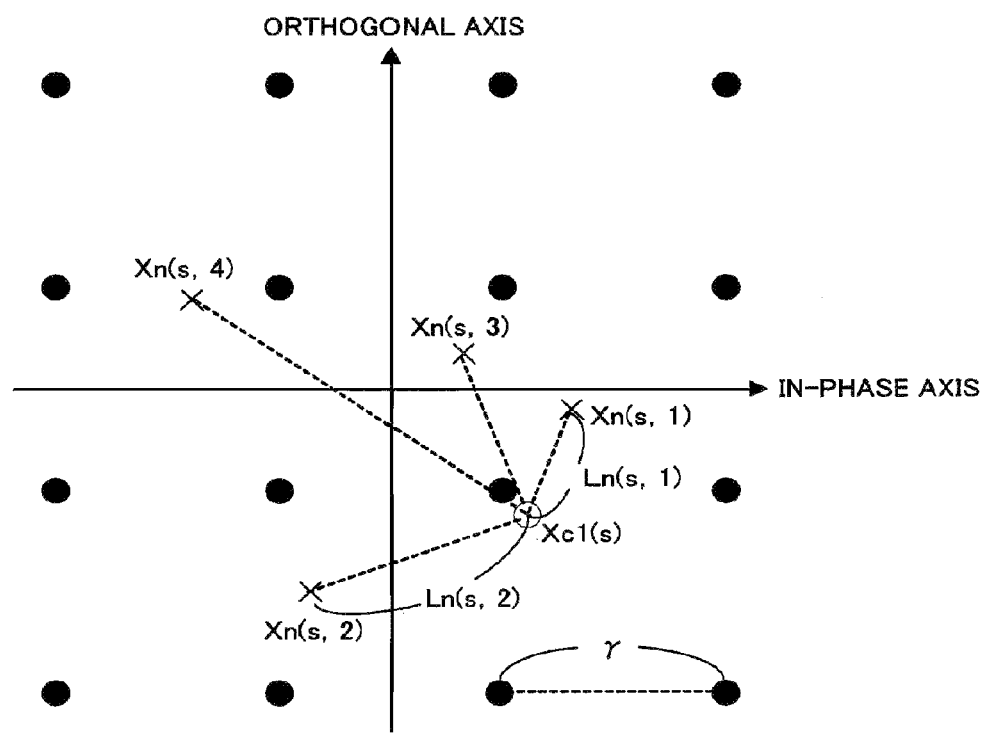
FIG. 25 is a schematic view showing, when there are four branches, a distance between a signal point of tentative carrier data and a signal point of combined carrier data.

Among the four expression (See FIG. 25), when three of the expressions are negative, in other words, the three exceeds the threshold, $Pc1_n$(s)=0 is established.

In this embodiment, the number of LEN, whose polarity is negative is three. However, this number may be any given number. The larger the number is, the harder it is to detect interference.

Also, multiple values may be used for the judgment with use of the sum of the distances ($LEN_n$(s, 1)+$LEN_n$(s, 2)).

In addition, a combined carrier reliability value may be calculated based on results of a hard decision performed on the tentative carrier data and the combination carrier data of each branch with use of the signal points.

Suppose the hard decision results of the tentative carrier data and the combined carrier data for each branch are respectively $X_n$(s, 1)", Xc1(s)", $$X_n(s,1)''=Xc1(s)'' \quad \text{(Expression 51)}$$

$$X_n(s,2)''=Xc1(s)'' \quad \text{(Expression 52)}$$

out of the above two evaluation expressions, the reliability value is judged based on the number of established expressions.

In this embodiment, when the hard decision result for each branch and the hard decision result of combined carrier data match in all branches, the reliability value is deemed to be high, and $Pc1_n$(s)=1. When no branches match each other, the reliability value is deemed to be low, and $Pc1_n$(s)=0.

Note that when there are four branches, $$X_n(s,1)''=Xc1(s)'' \quad \text{(Expression 53)}$$

$$X_n(s,2)''=Xc1(s)'' \quad \text{(Expression 54)}$$

$$X_n(s,3)''=Xc1(s)'' \quad \text{(Expression 55)}$$

$$X_n(s,4)''=Xc1(s)'' \quad \text{(Expression 56)}$$

out of the four evaluation expressions, the reliability value is judged according to the number of established expressions, Thus, the interference can be detected based on a signal point of the tentative carrier data of each branch and a signal point of the combined carrier data of each branch. As a result, erroneous estimation of an ICI component in the carrier is suppressed.

In the above description, the distance $L_n$ between the carrier data $X_n(s, b)$ and the combined carrier data $Xc1(s)$ is what is called the Euclidean distance. However, as shown in the following expression, distances in an in-phase component (real number unit) and an orthogonal component (imaginary number unit) are respectively obtained, and the sum $L_n$ of these distances is obtained. Thus, the evaluation can be similarly performed. Since this operation is simpler than the calculation of the Euclidean distance, a hardware circuit can be omitted. The Re[x] represents an in-phase component (real number unit) of a complex number x, and the Im[x] represents an orthogonal component (imaginary number unit) of the complex number x.

$$L_n(s) = \mathrm{abs}[\mathrm{Re}[X_n(s, b)] - \mathrm{Re}[Xc1(s)]] + \mathrm{abs}[\mathrm{Im}[X_n(s, b)] - \mathrm{Im}[Xc1(s)]]$$

In addition, the evaluation can be made with use of the distance $L_n(s)$ that is smoothed for a given period (referred to as a smoothed distance: Fil $[L_n]$). As the smoothed distance, an average determined by using information ranging from hundreds or thousands symbols in a symbol direction and from several or tens of carriers in a carrier direction, or a smoothed value with use of an IIR filter.

In concrete, in Expressions 45-50, the smoothed distance: Fil[$L_n$] is used instead of the distance $L_n(s)$ to evaluate a difference between the smoothed distance and the threshold is evaluated. Thus, when interference is contained in specific carriers for more than several symbols continuously, even if the threshold γ and the distance $L_n(s)$ accidentally approximate each other in a certain symbol, interference presence can be effectively judged.

In addition, a value based on the smoothed distance Fil [$L_n$] may be used as the threshold γ to evaluate a difference between the smoothed distance and the distance $L_n(s)$ in a certain symbol. The threshold γ is not limited to the average of the distance $L_n$ but may be an integral multiplication or a singular multiplication of the average. Thus, the threshold according to the degree of interference presence can be set. Accordingly, when interference is contained in specific carriers for several symbols continuously, the interference presence can be effectively judged.

As for the smoothing of the smoothed distance Fil[$L_n$], note that although the smoothing in both the symbol and carrier directions produces a greater effect, the smoothing may be performed in either one of the directions.

Embodiment 7

In Embodiment 7, the combined carrier reliability value calculation unit calculates the combined carrier reliability value based exclusively on the tentative carrier data of each branch.

Figure 26:
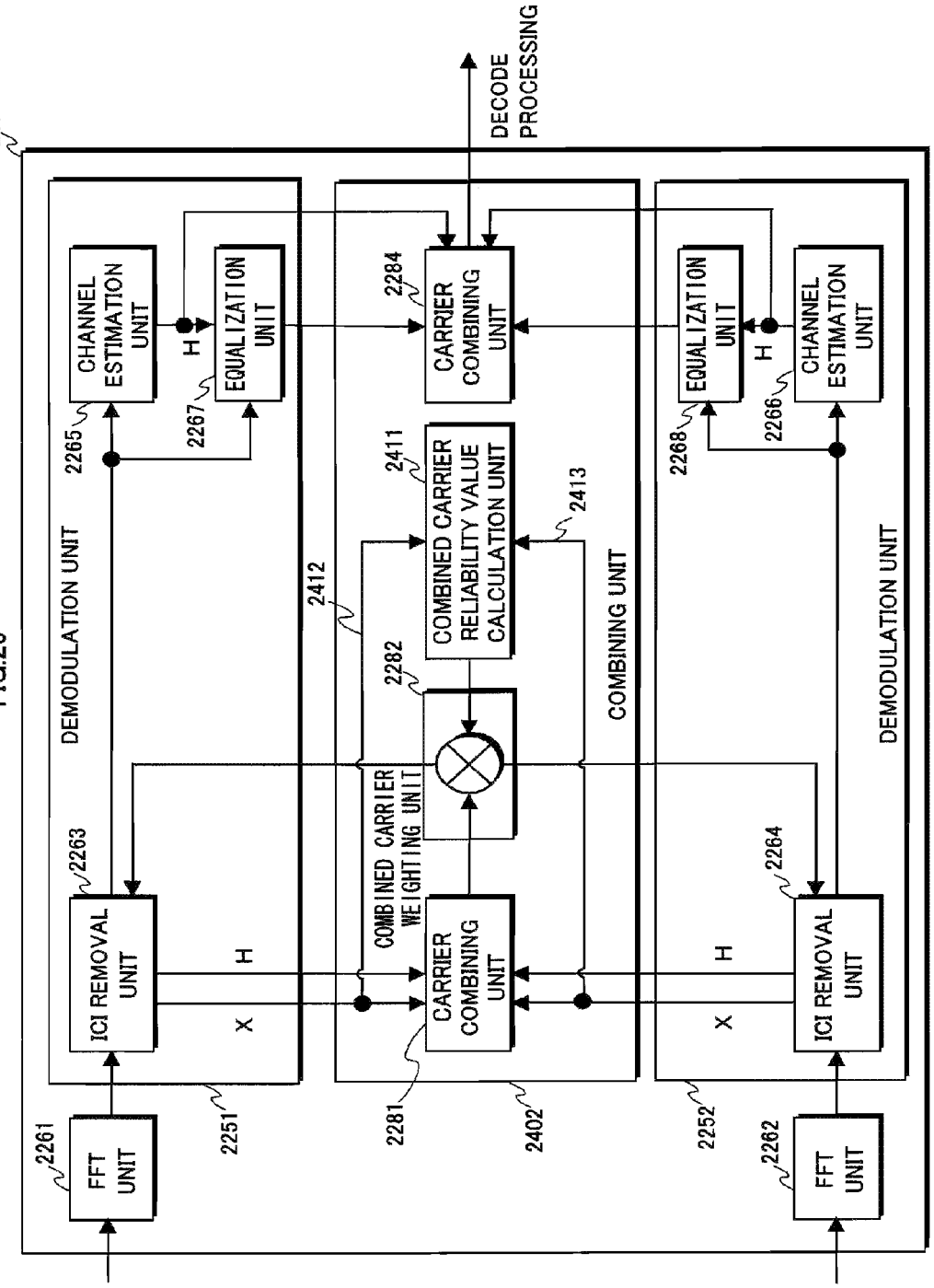
FIG. 26 is a block diagram of an inter-carrier interference removal device in accordance with Embodiment 7 of the present invention.

FIG. 26 is a block diagram showing the configuration of an inter-carrier interference removal device 2401 that includes the demodulation units 2251 and 2252 and the combining unit 2402 installed in a reception device in accordance with Embodiment 7.

A combined carrier reliability value calculation unit 2411 in the combining unit 2402 calculates a combined carrier reliability value based exclusively on tentative carrier data 2412 and 2413 of each branch.

For example, when there are more than two branches, the description of the paragraph 0041 of Patent Document (Laid-Open 2006-41980) and a case based on a hard decision result may be applied. When there are more than four branches, the description of the paragraphs 0079 and 0088 of Patent Document (Laid-Open 2006-41980) may be applied.

Embodiment 8

Equalized tentative carrier data used for ICI removal have errors due to presence of noises or interference. However, the carrier data, originally, has a given signal point arrangement by being demodulated by transmission data.

In Embodiment 8, when the amplitude is extremely large, ICI with given amplitudes is removed by the clip processing.

Figure 27:
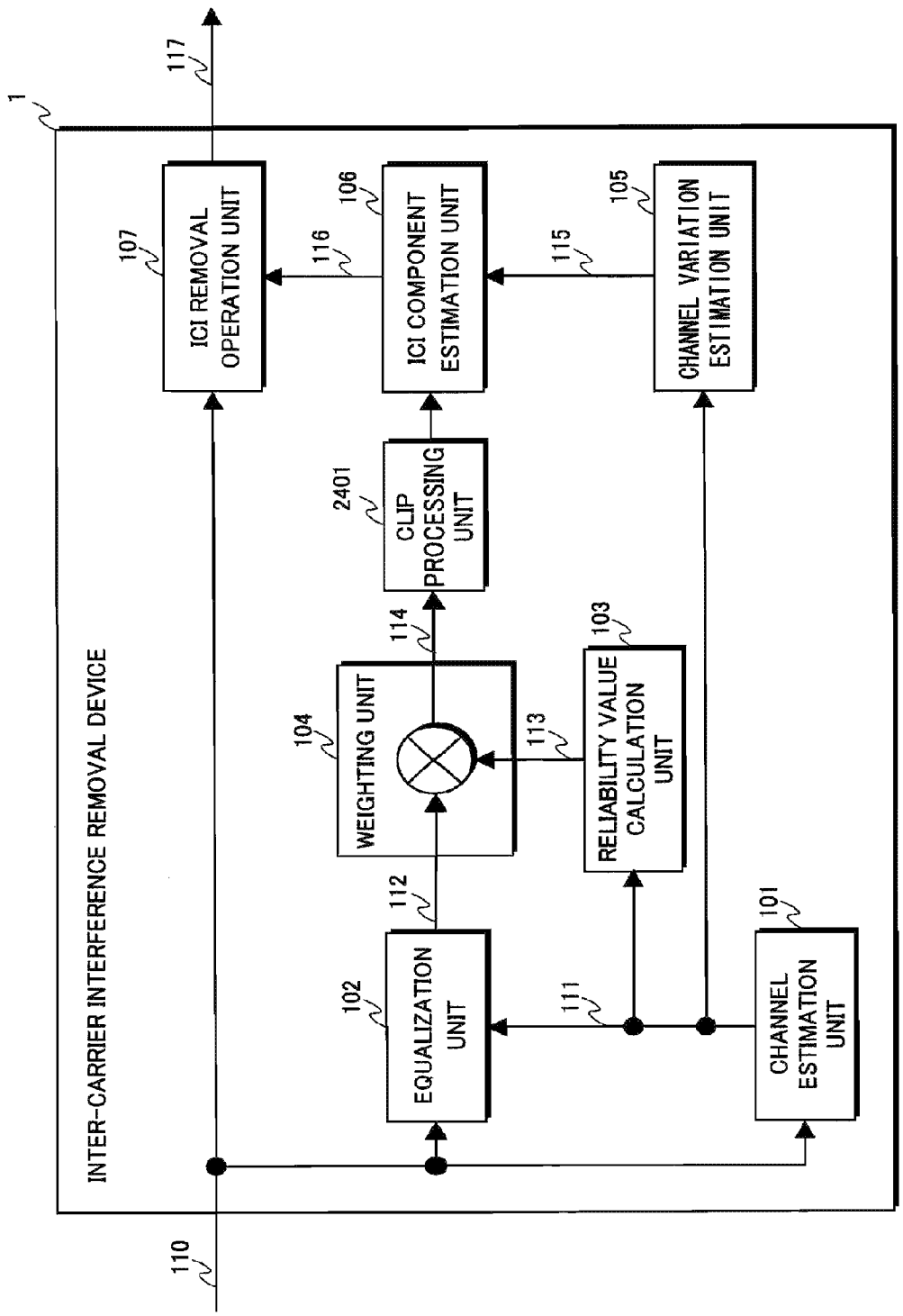
FIG. 27 is a block diagram of an inter-carrier interference removal device that includes a block that performs a clip processing on tentative carrier data.

FIG. 27 is a block diagram of an inter-carrier interference removal device that includes a block that performs a clip processing on tentative carrier data.

A clip processing unit 2401 performs the clip processing on weighted carrier data, and outputs the weighted carrier data to the ICI component estimation unit 106.

Shown as below, The clip processing unit 2401 performs the clip processing on carrier data with given amplitudes. An example is shown where the clip processing is performed on in-phase components and orthogonal components of carrier data with amplitudes of pilot carriers.

Figure 28:
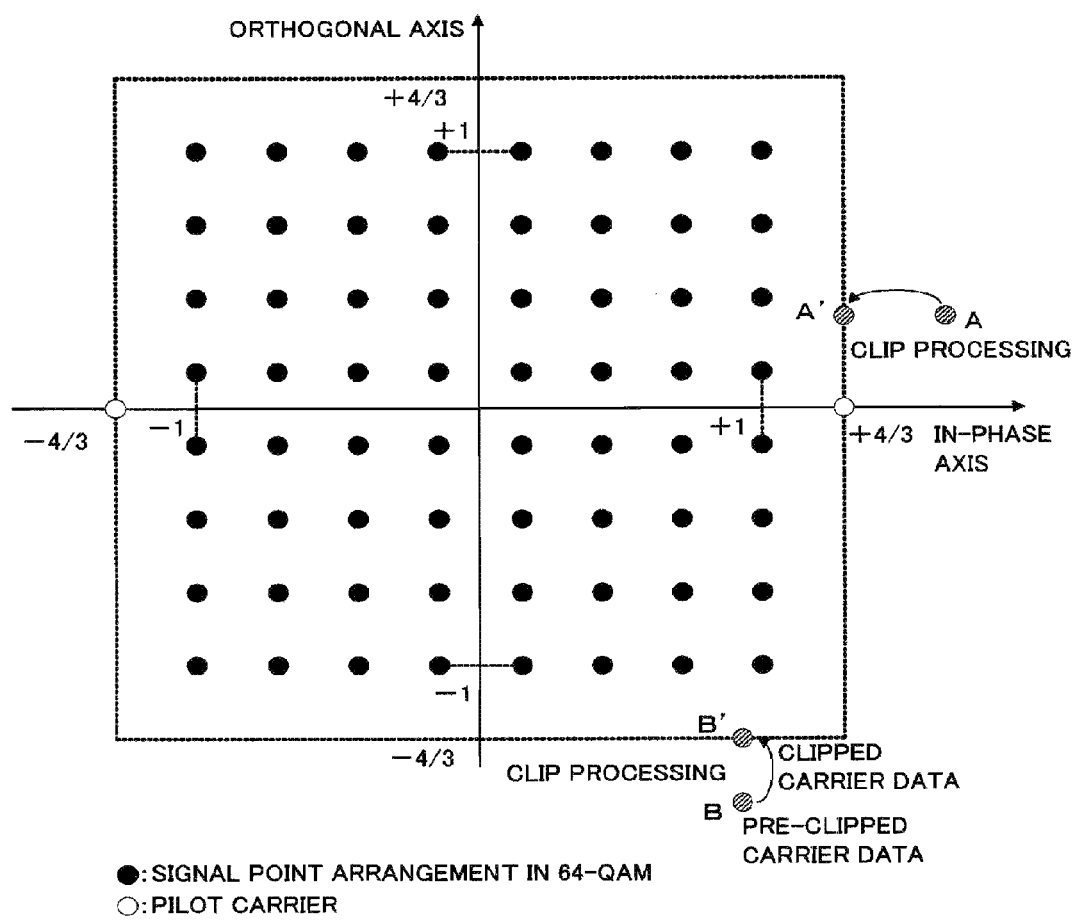
FIG. 28 is a view schematically showing amplitudes that the clip processing unit 2401 clips.

FIG. 28 is a view schematically showing amplitudes the clip processing unit 2401 performs the clip processing. Black circles each indicate a possible position of a signal point when 64-QAM is used. The amplitudes of the in-phase component and the orthogonal component ranges between ±1 at the maximum. White circles each indicate a position of a pilot carrier.

Pilot carriers are positioned at ±4/3 on the in-phase component.

Basically, tentative carrier data is demodulated and positioned at given signal points (positions at the black circles in FIG. 28). However, due to the presence of noises and interference, the tentative carrier data may be positioned far from the given signal points and have larger amplitude.

When the carrier data A and B shown in FIG. 28 each exceed ¾ of the in-phase axis and −¾ of the orthogonal axis, each of the carrier data A and B is clipped at ¾ of the in-phase axis and −¾ of the orthogonal axis.

In Embodiment 8, a clip level of carrier data is determined by an amplitude level of a pilot carrier. However, Embodiment 8 is not limited to this.

Embodiment 9

A reception device in accordance with Embodiment 9 of the present invention is described with reference to FIGS. 29-35.

Figure 29:
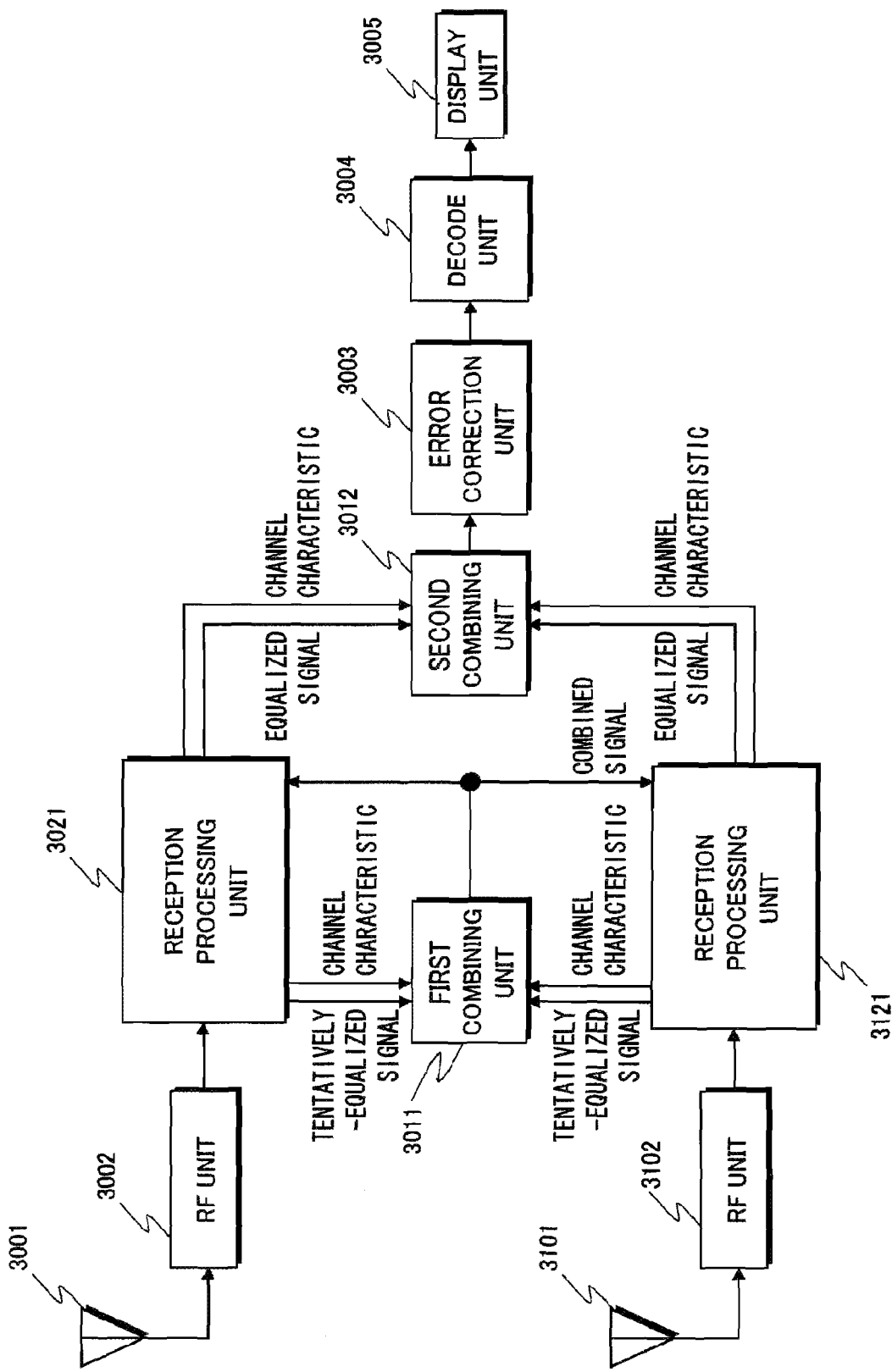
FIG. 29 is a block diagram of a reception device in accordance with Embodiment 9 of the present invention.

FIG. 29 is a block diagram showing the diversity reception device in accordance with Embodiment 9.

The reception device includes: antennas 3001 and 3101; RF units 3002 and 3102 that each select a reception signal of a desired reception channel; reception processing units 3021 and 3121 each of which performs demodulating processing; a first combining unit 3011; a second combining unit 3012; an error correction unit 3003 that performs error correction on a signal outputted from the second combining unit 3012; a decode unit 3004 that decodes a signal that is compressed by MPEG-2 (Moving Picture Experts Group) and the like and is performed error correction by the error correction unit 3003; and a display unit 3005 that outputs images and sounds decoded by the decode unit 3004.

Figure 30:
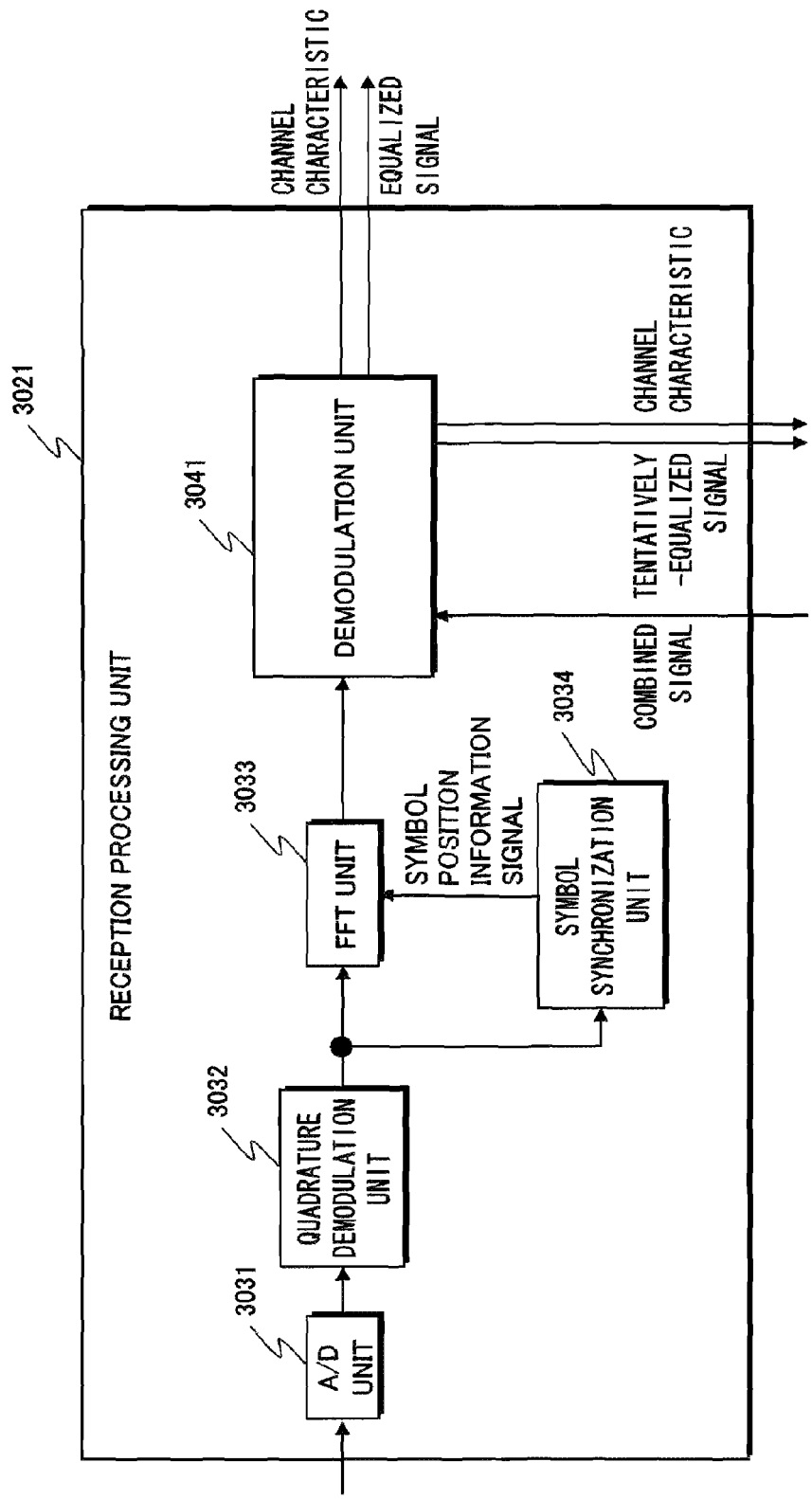
FIG. 30 is a block diagram of a reception processing unit of FIG. 29.

FIG. 30 is a block diagram showing the configuration of the reception processing unit 3021.

Note that the configuration of the reception processing unit 3121 is basically identical with that of the reception processing unit 3021. Only a difference between the reception processing units 3021 and 3121 is that the reception processing unit 3121 receives an input signal outputted from the RF unit 3102. Therefore, only the configuration of the reception processing unit 3021 is described.

The reception processing unit 3021 is composed of an A/D unit 3031, a quadrature demodulation unit 3032, an FFT unit 3033, a symbol synchronization unit 3034, and a demodulation unit 3041.

The A/D unit 3031 converts an output from the RF unit 3002 from an analogue to digital signal. The quadrature demodulation unit 3032 performs quadrature demodulation on the digital signal converted by the A/D unit 3031, and thus converts the digital signal to a complex baseband signal. The quadrature demodulation unit 3032 outputs the complex baseband signal to the FFT unit 3033 and the symbol synchronization unit 3034.

The symbol synchronization unit 3034 synchronizes in an OFDM symbol interval, and outputs a symbol position information signal to the FFT unit 3033.

Based on the symbol position information signal, the FFT unit 3033 performs the Fourier transform on the quadrature demodulated signal, and converts the signal into a signal in a frequency domain, and outputs the signal to the demodulation unit 3041.

Figure 31:
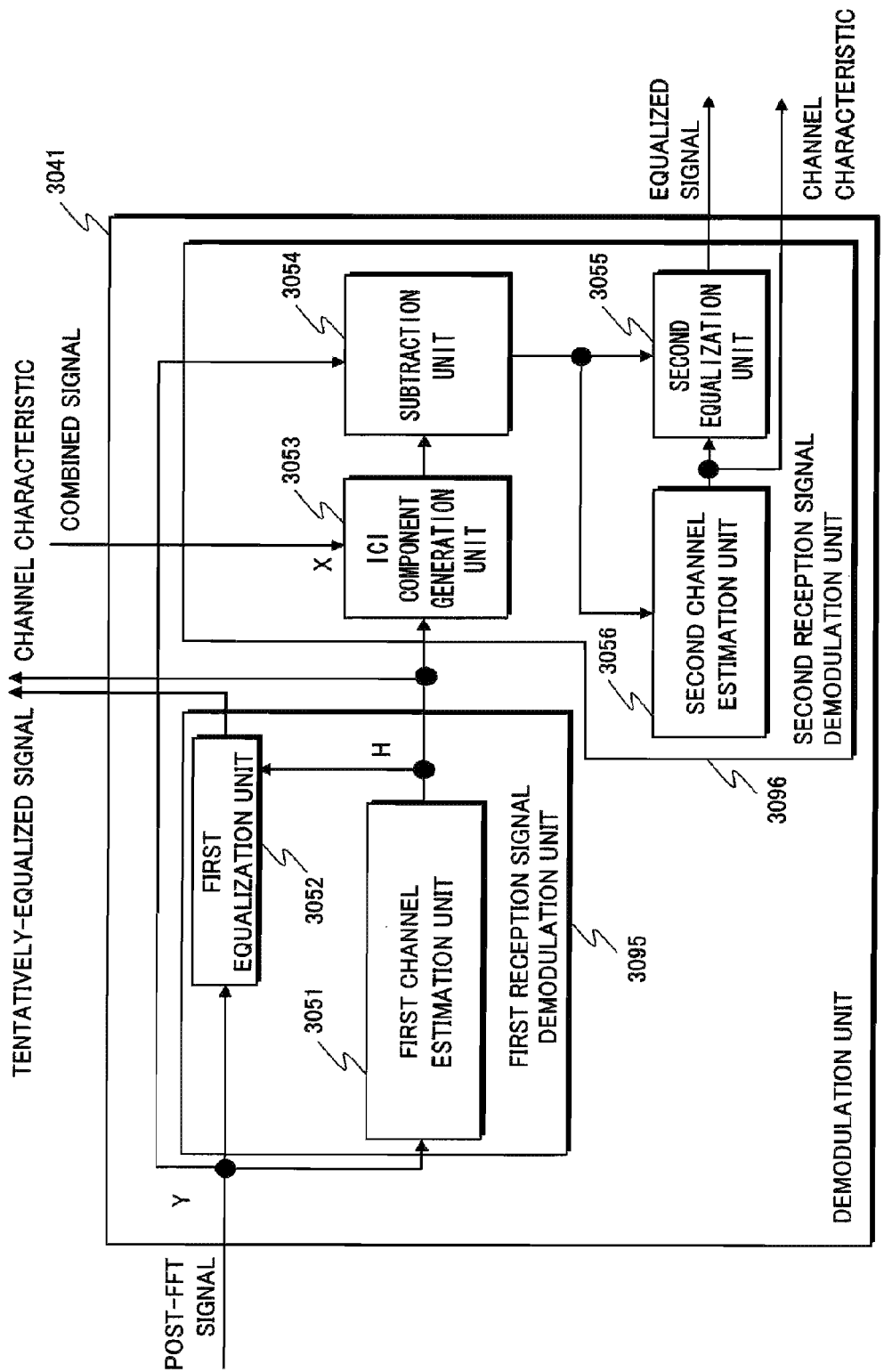
FIG. 31 is a block diagram of a demodulation unit of FIG. 30.

FIG. 31 is a block diagram showing the configuration of the demodulation unit 3041.

The demodulation unit 3041 is composed of a first reception signal demodulation unit 3095 and a second reception signal demodulation unit 3096.

The first reception signal demodulation unit 3095 is composed of a first channel estimation unit 3051 and a first equalization unit 3052. The second reception signal demodulation unit 3096 is composed of an ICI component generation unit 3053, a subtraction unit 3054, a second channel estimation unit 3056 and a second equalization unit 3055.

Figure 32:
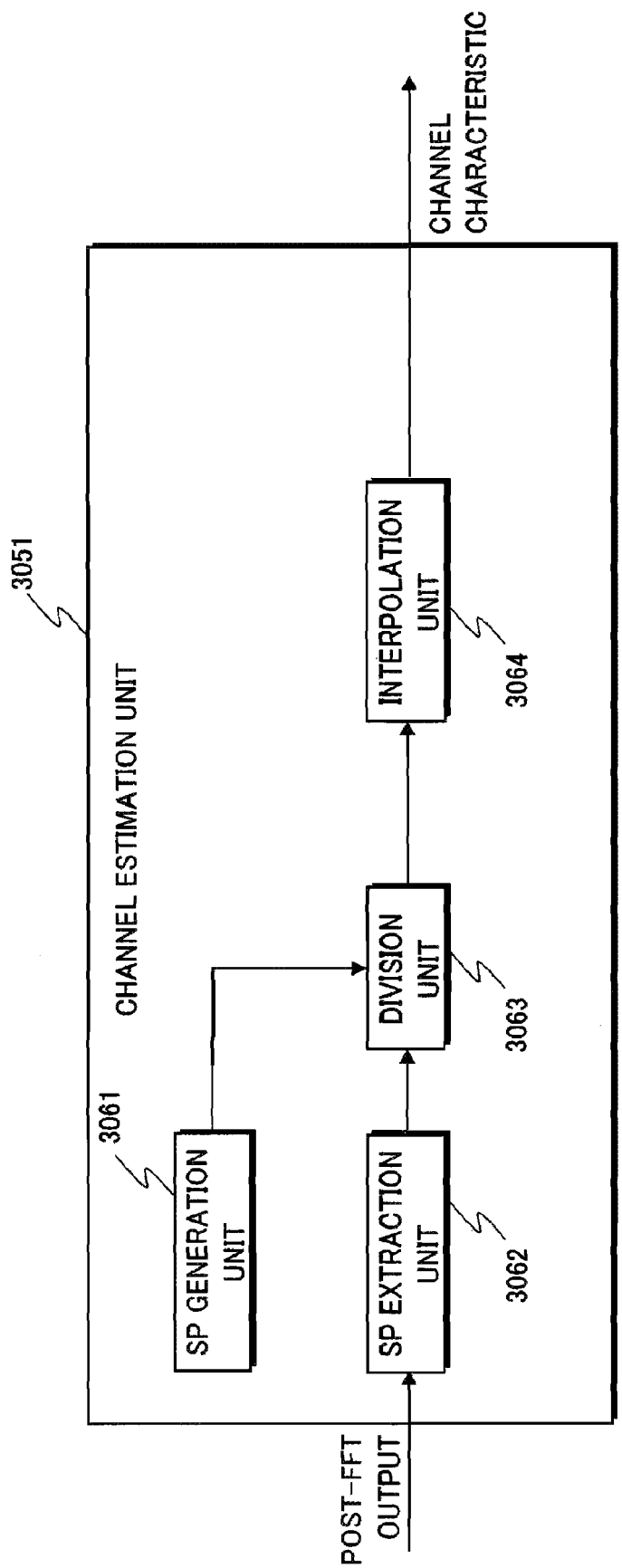
FIG. 32 is a block diagram of a channel characteristic estimation unit of FIG. 31.

As shown in FIG. 32, the first channel estimation unit 3051 is composed of: an SP generation unit 3061 that generates a known signal that is SP (Scattered Pilot); an SP extraction unit 3062 that extracts the SP signal from an input signal; a division unit 3063; and an interpolation unit 3064.

Note that the second channel estimation unit 3056 has basically identical units with the first channel estimation unit 3051. In this embodiment, the SP signal is a reference signal, which is inserted into a transmission signal in a transmission system of terrestrial digital television broadcasting. The SP signal is basically identical with the pilot symbol described in the above embodiments.

The SP extraction unit 3062 extracts the SP signal from the post-FFT signal. The division unit 3063 divides the SP signal by the known signal generated by the SP generation unit 3061. Thus, a channel characteristic of the SP signal is calculated.

Based on the calculated channel characteristic of the SP signal, the interpolation unit 3064 performs interpolation processing, and calculates channel characteristics of other signals than the SP signal.

In the first equalization unit 3052, a transmission signal is estimated by dividing the post-FFT signal by the calculated channel characteristic. A tentatively-equalized signal is outputted to the first combining unit 3011 shown in FIG. 29.

The channel characteristic calculated by the first channel estimation unit 3051 is also outputted to the first combining unit 3011.

The first combining unit 3011 performs diversity combining on each tentatively-equalized signal with use of the channel characteristics outputted by the reception processing units 3021 and 3121.

When the tentatively-equalized signal and the channel characteristic at the reception processing unit 3021 are expressed as $X1_n\tilde{}(s, 1)$ and $H1_n(s, 1)$ respectively, and the tentatively-equalized signal and the channel characteristic at the reception processing unit 3121 are expressed as $X1_n\tilde{}(s, 2)$ and $H1_n(s, 2)$ respectively, the tentatively-equalized signals are combined with use of maximum ratio combining as shown in Expression 57.

$$Xc1_n(s)=(|H1_n(s,1)|^2 \cdot X1_n\tilde{}(s,1)+|H1_n(s,2)|^2 \cdot X1_n\tilde{}(s,2))/ (|H1_n(s,1)|^2+|H1_n(s,2)|^2) \qquad \text{(Expression 57)}$$

The combining method is not limited to Expression 57, and a heretofore-known diversity combining method can be applied.

The signals combined by the first combining unit 3011 are outputted to the reception processing units 3021 and 3121.

Note that the output from the first combining unit 3011 may be outputted to the reception processing units 3021 and 3121 after the hard decision according to a transmission code point.

The output signal of the first combining unit 3011 is inputted into the ICI component generation unit 3053. The channel characteristic estimated by the first channel estimation unit 3051 is also inputted into the ICI component generation unit 3053. Various methods are suggested for estimating an ICI component. This embodiment employs the ICI component estimation method described in Nonpatent Document 3.

Figure 33:
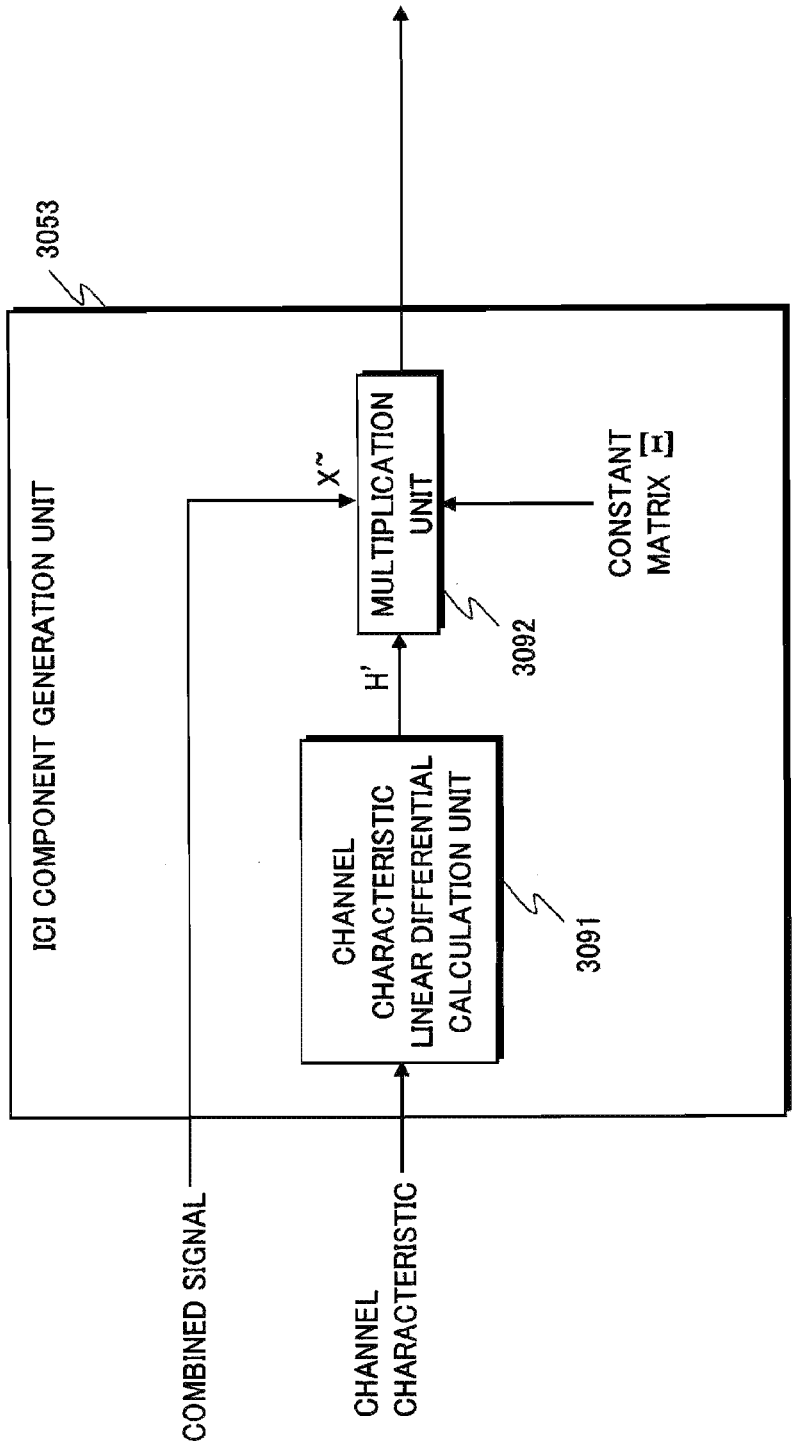
FIG. 33 is a block diagram of an ICI component generation unit of FIG. 31.

As shown in FIG. 33, the ICI component generation unit 3053 is composed of a channel characteristic linear differential calculation unit 3091 and a multiplication unit 3092.

The channel characteristic linear differential calculation unit 3091 inputs a channel characteristic. With use of Expression 57, the characteristic linear differential calculation unit 3091 calculates a linear differential of channel characteristics of symbols in the vicinity of the present symbol (symbol number: p), and outputs the linear differential to the multiplication unit 3092.

The multiplication unit 3092 multiplies together the combined signal X~ that is an output from the first combining unit 3011, and an output signal from the channel characteristic linear differential calculation unit 3091, and the constant matrix Ξ shown in Expressions 3 and 4. This operation is as shown in Expression 2. Thus, the ICI component is estimated and generated.

The method disclosed in Nonpatent Document 3 is employed as the ICI component generation method in the ICI component generation unit 3053. However, the generation method is not limited to this, and heretofore-known methods may be employed.

The subtraction unit 3054 subtracts the estimated ICI component from the post-FFT signal. As a result, the ICI component is removed.

Due to the diversity effect, the output signal of the first combining unit 3011 is a more reliable transmission signal than that of the first equalization unit 3052. As a result, accuracy of the ICI component generation is improved, and ICI can be removed more accurately.

Based on the output signal of the subtraction unit 3054, a channel characteristic of the signal after the ICI component removal is estimated by the second channel estimation unit 3056.

Thus, the channel characteristic of a signal from which ICI has been removed is calculated.

In the second equalization unit 3055, a transmission signal is estimated again by subtraction with use of the channel characteristic estimated from the output signal of the subtraction unit 3054.

Since an equalized signal outputted from the second equalization unit 3055 is less affected by ICI, estimation accuracy of the equalized signal is more improved than the output signal of the first equalization unit 3052.

The output signal of the second equalization unit 3055 and the channel characteristic estimated by the second channel characteristic estimation unit 3056 are outputted to the second combining unit 3012.

The second combining unit 3012 performs diversity combining on each signal that has been secondarily equalized, with use of the channel characteristics of the ICI-removed signals each outputted from the reception processing units 3021 and 3121.

When the secondarily-equalized signal and the channel characteristic of the ICI-removed signal at the reception processing unit 3021 are expressed as $X2_n\tilde{\ }(s, 1)$ and $H2_n(s, 1)$ respectively, and the secondarily-equalized signal and the channel characteristic of the ICI-removed signal at the reception processing unit 3121 are expressed as $X2_n\tilde{\ }(s, 2)$ and $H2_n(s, 2)$ respectively, the secondarily-equalized signals are combined with use of maximum ratio combining as shown in Expression 58 for diversity combining.

$$Xc2_n(s)=(|H2_n(s,1)|^2 \cdot X2_n(s,1)+|H2_n(s,2)|^2 \cdot X2_n(s,2))/ (|H2_n(s,1)|^2+|H2_n(s,2)|^2) \quad \text{(Expression 58)}$$

The combining method is not limited to Expression 58, and a heretofore-known diversity combining method can be used.

In this embodiment, the first combining unit 3011 and the second combining unit 3012 are described with use of the same maximum ratio combining. However, the first combining unit 3011 combines signals influenced by ICI, and the second combining unit 3012 combines ICI-removed signals. Considering both combining units combines the signals with different characteristics, note that a different diversity combining method may be performed by the first combining unit 3011 from by the second combining unit 3012.

Furthermore, the first channel estimation unit 3051 and the second channel estimation unit 3052 are described as if these were identical to each other. However, the first channel estimation unit 3051 estimates the channel characteristic of the signal influenced by ICI, and the second channel estimation unit 3056 estimates the channel characteristic of the ICI-removed signal. Considering both estimation units estimates the signals with the different characteristics, note that a different estimation method can be used between the first channel estimation unit 3051 and the second channel estimation unit 3056.

Note that without the second channel estimation unit 3056, and that the secondary equalization and the secondary diversity combining may be performed with use of the channel characteristic estimated by the first channel estimation unit 3051. However, since the ICI removal changes the channel characteristic of the signal from which ICI has not been removed yet, the equalization and the diversity combining after the ICI removal are more effective.

The second combining unit 3012 performs diversity combining on the ICI-removed signals. The combined signals are outputted to the error correction unit 3003, and afterwards are decoded and displayed.

Due to the diversity effect, the output signal of the second combining unit 3012 is a more reliable transmission signal than each secondarily-equalized signal of the reception processing units 3021 and 3121. Accordingly, the reception performance improves.

With the above configuration, by performing the diversity combining on tentatively-equalized signals so as to generate an ICI component, the reliability value of the tentatively-equalized signals is enhanced, and the ICI component is estimated, in each demodulation unit, with use of the reliability value. Thus, estimation accuracy of the ICI component in each demodulation unit is improved, and as a result, ICI removal is effectively performed.

In addition, a channel characteristic is calculated again after the ICI removal. Optimum equalization and diversity combining with use of the channel characteristic enhance the estimation accuracy of a final transmission signal. Accordingly, the reception device is more robust against ICI or noises, and is able to exhibit stable and high-quality reception performance during moving or in a weak electrical field environment.

Furthermore, in this embodiment, the diversity combining has two steps. However, the number of the steps is not limited to this, and there may be more than three steps so as to remove ICI step-by-step.

Figure 34:
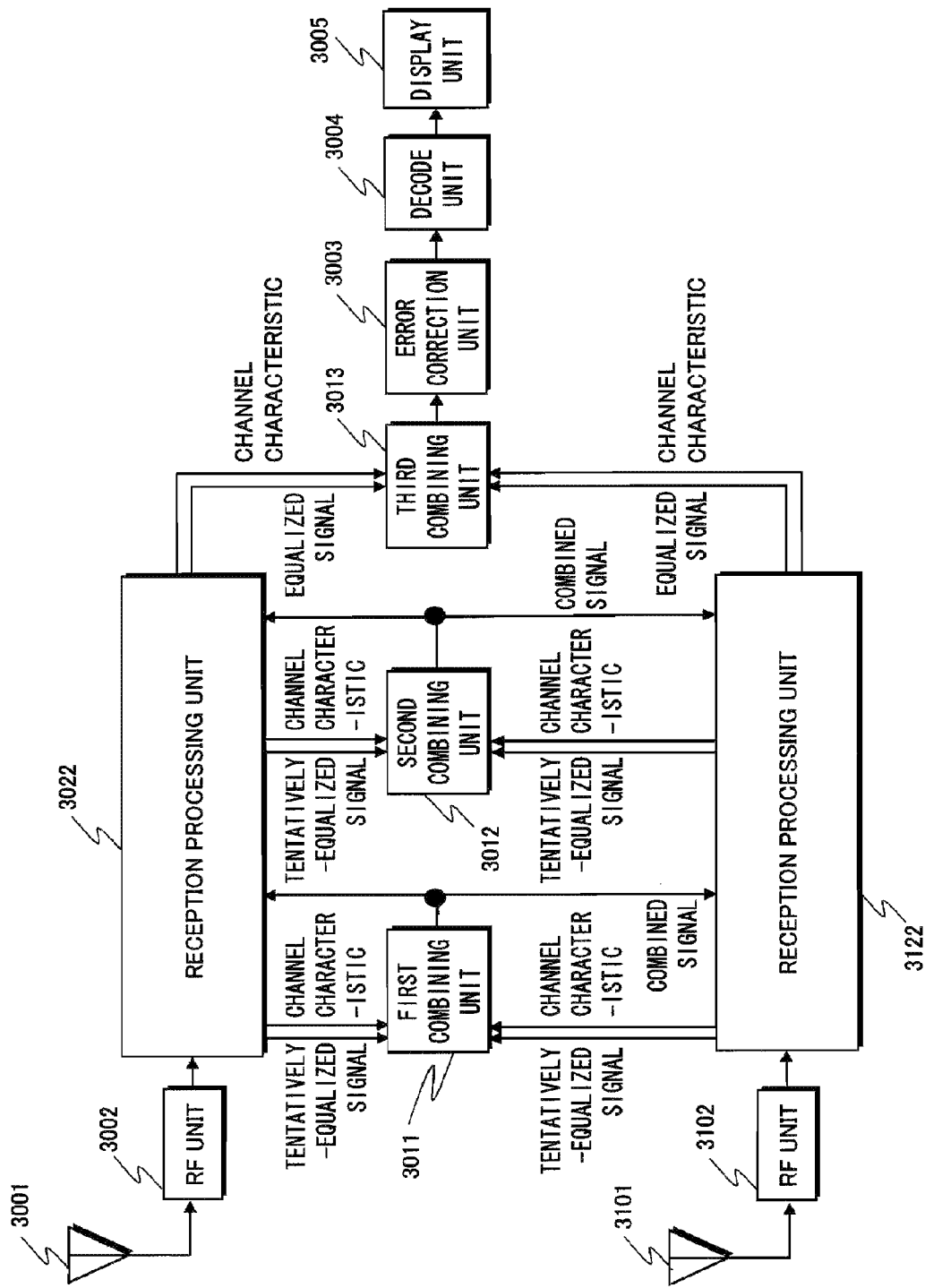
FIG. 34 is a block diagram of the reception device of Embodiment 1 that performs diversity combining in three steps.
Figure 35:
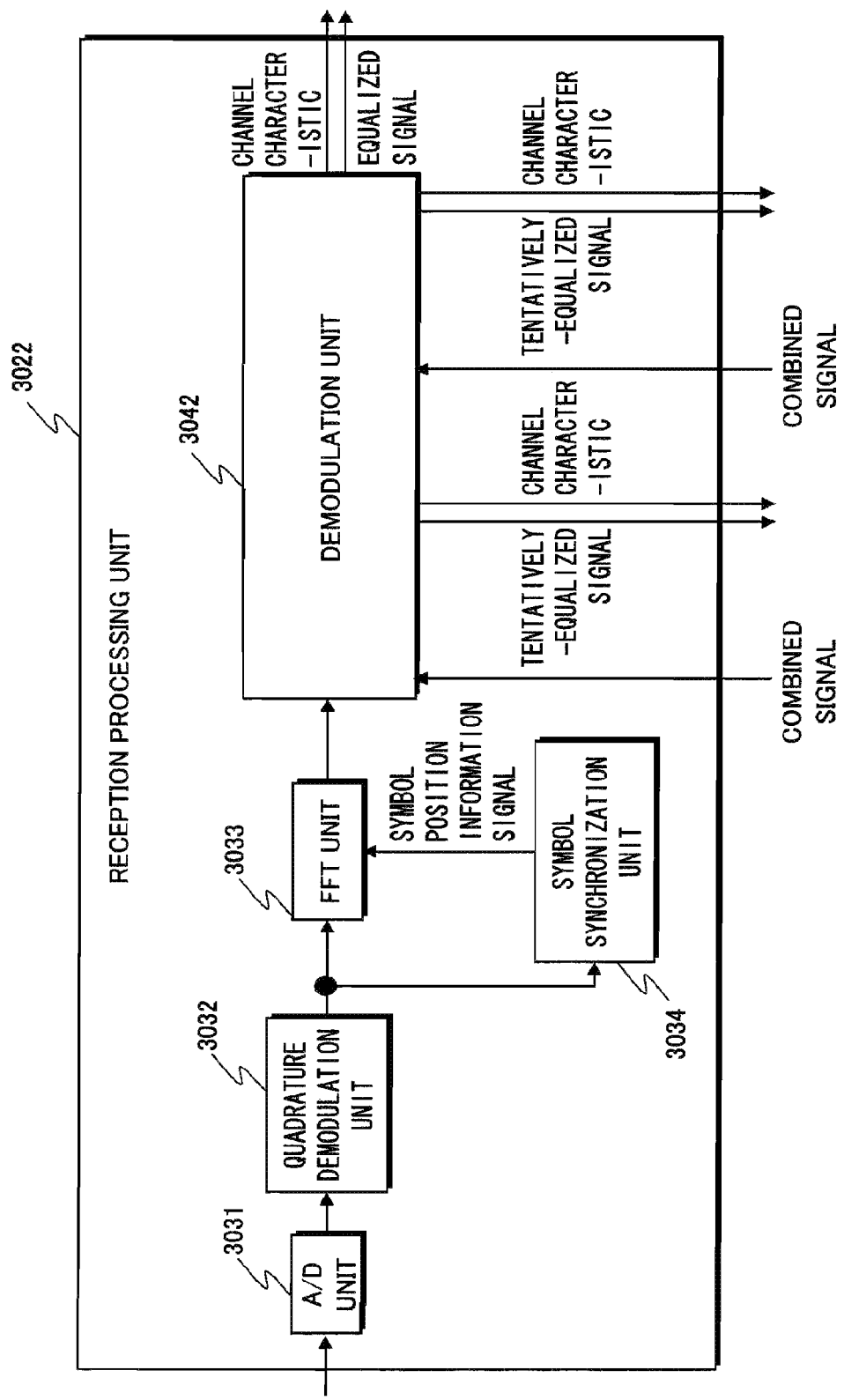
FIG. 35 is a block diagram of a reception processing unit of FIG. 34.
Figure 36:
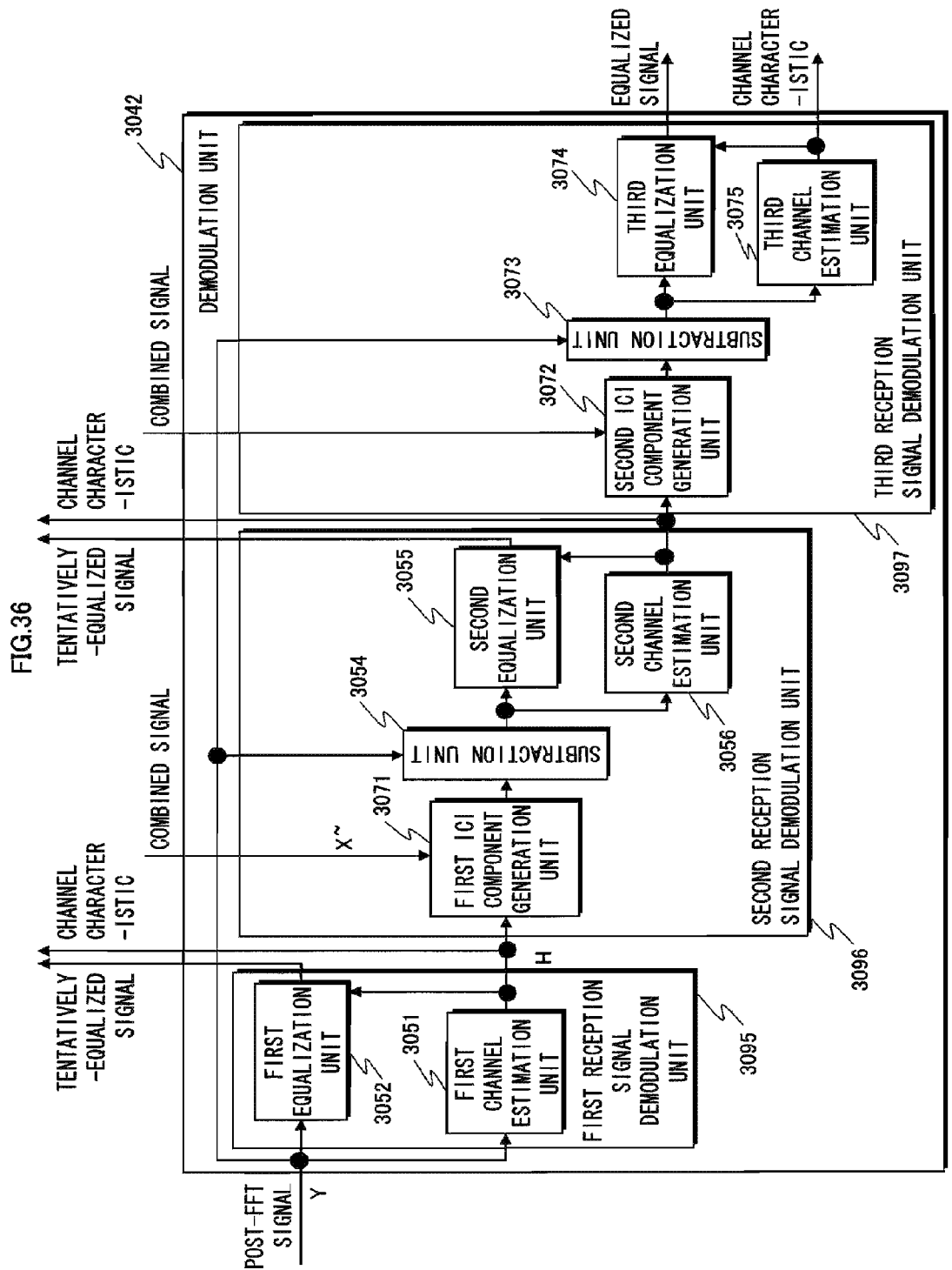
FIG. 36 is a block diagram of a demodulation unit of FIG. 35.

For example, FIGS. 34, 35 and 36 each show a configuration diagram of a diversity reception device whose diversity combining is processed in three steps.

A demodulation unit 3042 in FIG. 36 estimates the channel characteristic of the ICI-removed signal every time the ICI removal is performed, and performs equalization and diversity combining with use of the channel characteristic.

By performing the step-by-step ICI removal, estimation accuracy of the transmission signal is further improved, and high-quality and stable reception performance can be achieved even during moving or in a weak electrical field environment.

To realize the reception device of Embodiment 9, a program that performs at least part of the reception processing may be used. Also, a reception method that performs part of the reception processing in the reception device may be used.

Furthermore, any combination of the reception device, the reception method, a reception circuit or the program that performs part of the reception processing to realize the reception device of Embodiment 9 may be used.

Embodiment 10

A reception device in accordance with Embodiment 10 of the present invention is described with reference to FIGS. 37, 38, and 39. The identical units with the aforementioned units have the identical numerals and a description of the identical units is omitted.

Figure 37:
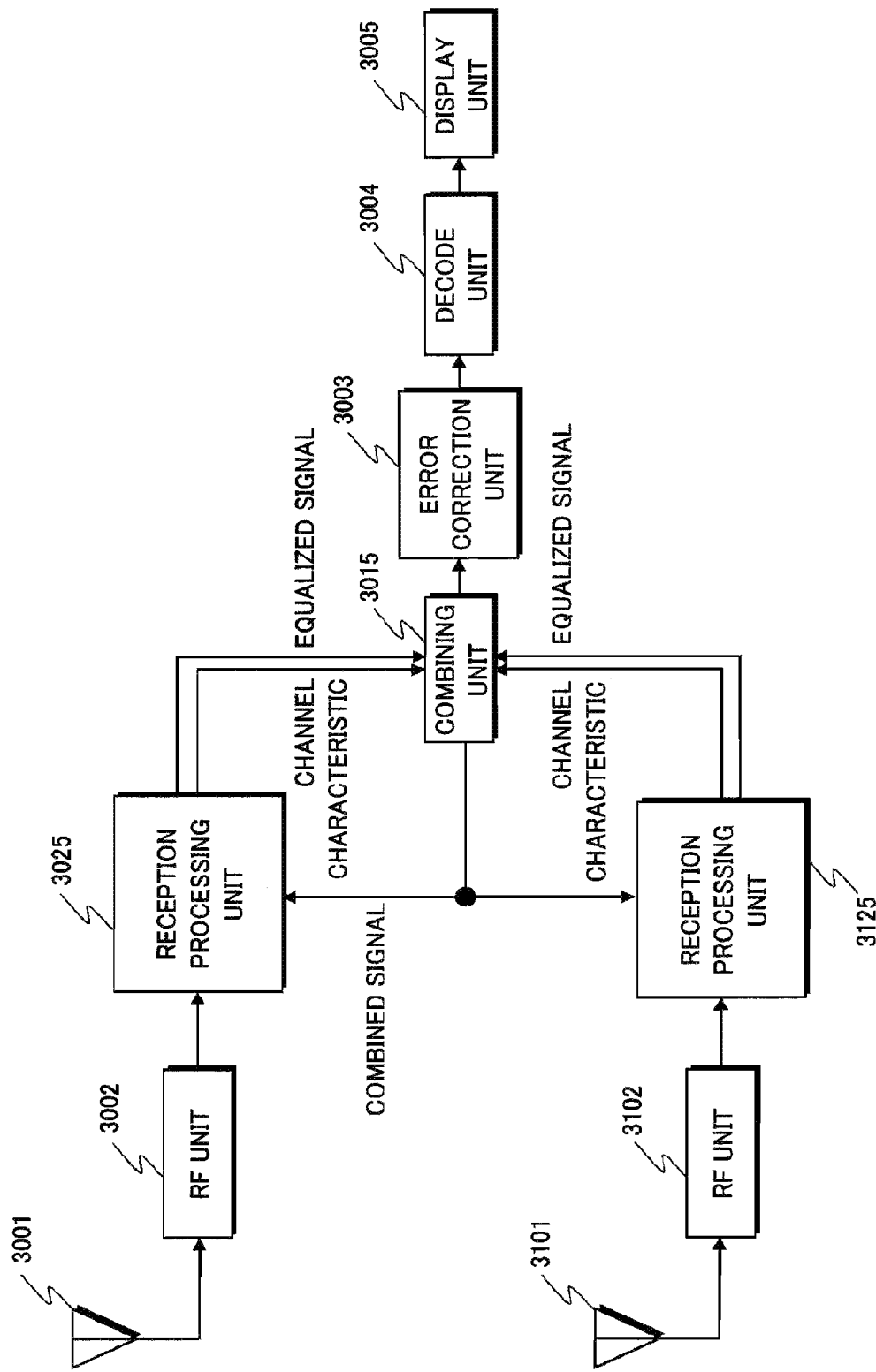
FIG. 37 is a block diagram of a reception device in accordance with Embodiment 10 of the present invention.

FIG. 37 is a block diagram of a diversity reception device in accordance with Embodiment 10 of the present invention.

The diversity reception device of Embodiment 10 performs feedback on a diversity combining signal, which is a different configuration from the diversity reception device of Embodiment 9.

Figure 39:
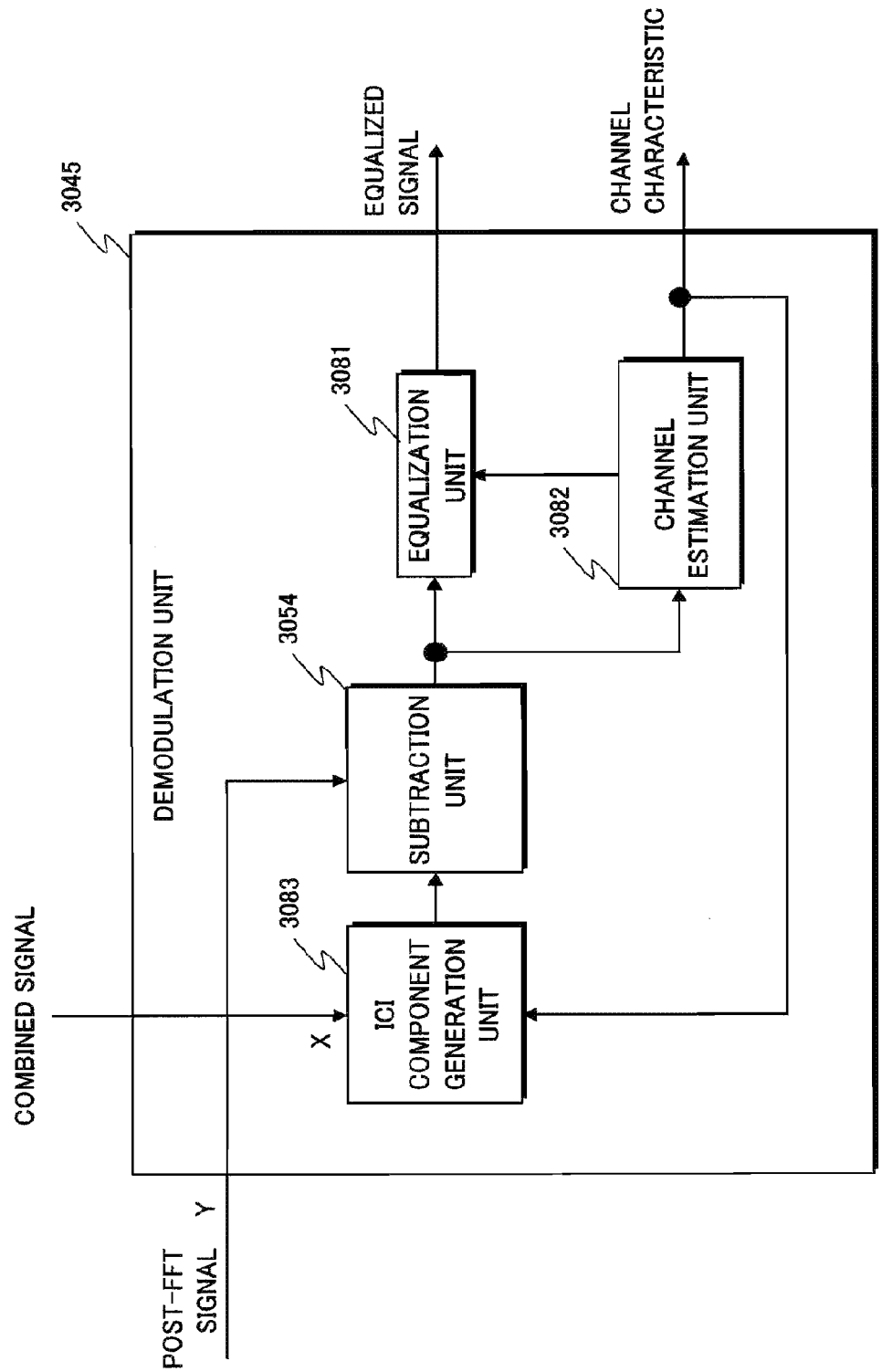
FIG. 39 is a block diagram of a demodulation unit of FIG. 38.
Figure 40:
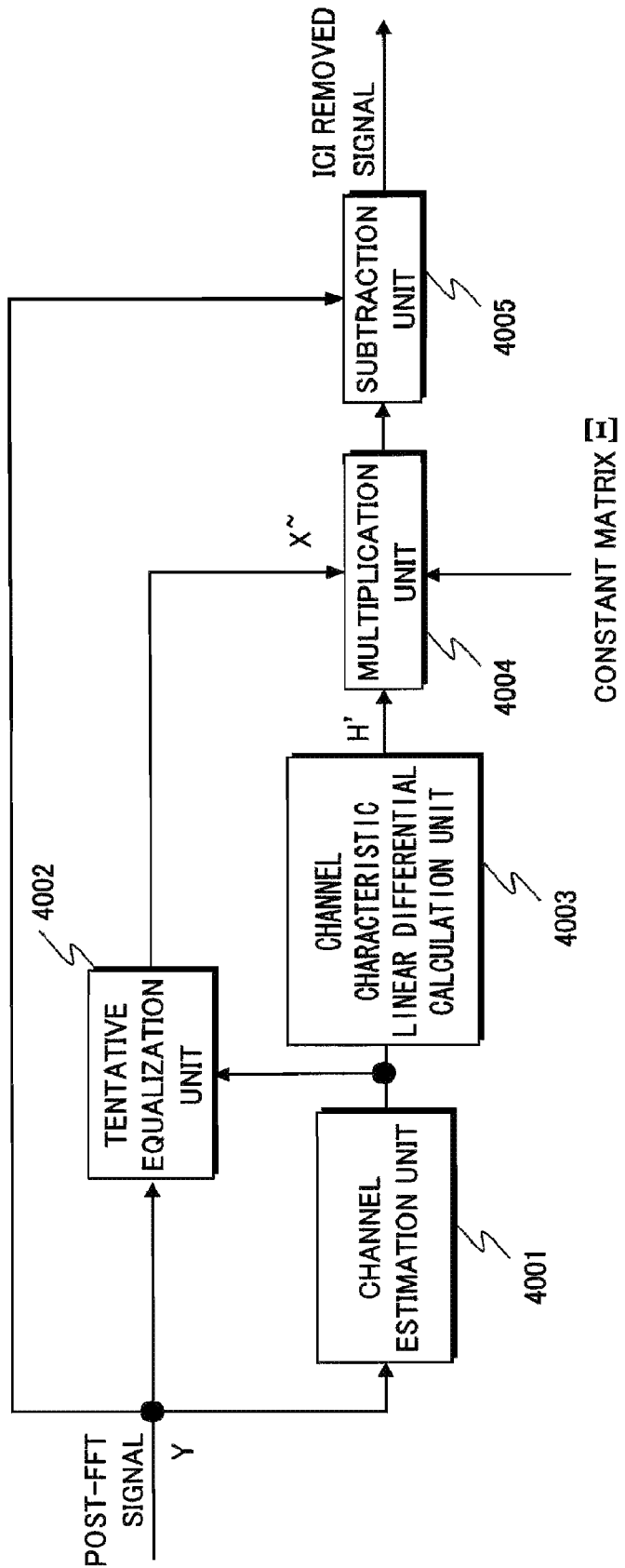
FIG. 40 is a block diagram of the ICI removal unit of Nonpatent Document 3.

FIG. 39 is a block diagram of a demodulation unit 3045.

The demodulation unit 3045 is composed of an ICI component generation unit 3083, a subtraction unit 3054, an equalization unit 3081, and a channel estimation unit 3082.

An output signal from an FFT unit 3033 is inputted into the subtraction unit 3054. The subtraction unit 3054 subtracts output from the ICI component generation unit 3083.

In the first iteration, the output from the ICI component generation unit 3083 is zero.

The output signal from the subtraction unit 3054 is inputted into the equalization unit 3081 and the channel estimation unit 3082. The channel estimation unit 3082 estimates a channel characteristic, and outputs an estimation result to the equalization unit 3081 and the combining unit 3015.

The channel estimation unit 3082 is equivalent to the first channel estimation unit 3051 of Embodiment 9.

The equalization unit 3081 estimates a transmission signal by dividing the ICI-removed signal by the estimated channel characteristic, and outputs an equalized signal to the combining unit 3015.

A reception processing unit 3125 has a basically identical configuration with a reception processing unit 3025. Since only a difference between the demodulation units 3125 and 3025 is that the input signal is not the output signal from the RF unit 3002 but from the RF unit 3102, a description of the reception processing unit 3125 is omitted.

In FIG. 37, the reception processing units 3025 and 3125 outputs channel characteristics and equalized signals, and the combining unit 3015 performs diversity combining on the equalized signals according to the channel characteristics.

Similarly to Embodiment 9, Expression 57 may be used for the diversity combining. However, the diversity combining is not limited to Expression 1, and a heretofore-known expression may be used.

This combined signal is inputted into the ICI component generation unit 3083 in each of the reception processing units 3025 and 3125.

Note that when the combined signal is inputted into the ICI component generation unit 3083, the combined signal may be performed a hard decision according to a code point.

Thus, the ICI component generation unit 3083 estimates and generates an ICI component, based on the channel characteristic and the output from the combining unit 3015, and the ICI component is subtracted from the post-FFT signal by the subtraction unit.

A difference of the ICI component generation unit 3083 from the ICI component generation unit 3053 of FIG. 33 is that the channel characteristic linear differential unit 3091 performs a calculation with use not of Expression 1 but of Expression 59. However, the expression is not limited to this.

$$H'(s)=(H(s)-H(s-1))/Ts \quad \text{(Expression 59)}$$

Repeating this iteration within a symbol interval improves estimation accuracy of an equalized signal.

In the last iteration within the symbol interval, the combined signal is outputted to the error correction unit 3003, and accordingly, error correction is performed on the combined signal.

In the subsequent symbol interval, a new iteration starts for a post-FFT signal corresponding to the symbol. When the first iteration starts, a signal in the ICI component generation unit 308 is reset to zero.

A signal from which ICI has been removed and on which diversity combining has been performed in each reception processing unit is recursively used for ICI component generation, which improves accuracy of ICI component estimation in each reception processing unit. The more iterations are repeated, the less influence from noises or ICI is resulted. Thus, with this configuration, ICI removal is effectively performed.

In addition, when iterations are further repeated, a circuit size can be reduced compared with Embodiment 9. As a result, the reception device is more robust against ICI or noises, and is able to exhibit stable and high-quality reception performance during moving or in a weak electrical field environment.

In the embodiment, the description is made with use of the diversity configuration having two antennas. Note that the diversity configuration may have more than two antennas. The reception performance can be further improved by increasing the number of the antennas and the demodulation units.

Furthermore, each constituent of the reception device of Embodiment 10 may be implemented in an integrated circuit. In such a case, each constituent may be individually integrated on one chip, or part or all of the constituents may be integrated on one chip.

Furthermore, a program that performs at least part of the reception processing of the reception device in accordance with the embodiment may be used. In addition, a reception method that performs at least part of the reception processing of the reception device of Embodiment 10 may be used.

Also, any combination of the reception device, the reception method, the reception circuit, and the program that performs part of the reception processing to realize the reception device of Embodiment 10 may be used.

Furthermore, in Embodiments 9 and 10, the description is made that the A/D unit 3031 is immediately before the quadrature demodulation unit 3032. However, the A/D unit 3031 may be contained in a tuner, immediately after the quadrature demodulation unit 3032, or at other position.

Also, in Embodiments 9 and 10, the diversity configuration using two antennas is described. However, the diversity configuration may use more than two antennas. Increasing the number of antennas and demodulation units further improves the reception performance.

Furthermore, the diversity configuration is not limited to the space or angle diversity having more than two antennas. A frequency diversity or a time diversity may be performed with use of one antenna.

Also, the demodulation unit does not need to be plural. The function of the demodulation unit may be realized by using memory or multiprocessing.

Also, in Embodiments 9 and 10, the description is made that the signals is an OFDM signal used in the terrestrial digital broadcasting wave. However, signals may be in any forms as long as multi-carrier transmission is used. In addition, the description is made on the configuration to remove ICI. However, as long as an interference component contained in a reception signal is generated and removed from an estimated transmission signal, the present invention may be applied to any interference removal techniques. In such a case, instead of the ICI component generation unit 3053, an interference component generation unit that estimates and generates an interference component to be removed may be used.

<Supplementation>

The present invention is described according to the above embodiments. Note that the present invention is never limited to the embodiments, and the present invention includes the following cases.

(1) In the carrier combination (maximum ratio combining) shown in the above embodiments, with use of the channel frequency characteristics, $H_n(s, 1)$ and $H_n(s, 2)$, and the output signals from the equalization unit, $X_n(s, 1)$ and $X_n(s, 2)$ that are obtained in each demodulation unit, the combination is performed as follows:

$$Xc_n(s)=(|H_n(s,1)|^2 \cdot X_n(s,1)+|H_n(s,2)|^2 \cdot X_n(s,2))/(|H_n(s,1)|^2+|H_n(s,2)|^2)$$ (Expression 60)

However, each equalization unit can be omitted, and the following combination can be applied with use of the carrier signals $Y_n(s, 1)$ and $Y_n(s, 2)$ and the channel frequency characteristics, $H_n(s, 1)$ and $H_n(s, 2)$.

$$Xc_n(s)=(H_n(s,1)^* \cdot Y_n(s,1)+H_n(s,2)^* \cdot Y_n(s,2))/(|H_n(s,1)|^2+|H_n(s,2)|^2)$$ (Expression 61)

Note that "*" represents complex conjugate.

This applies to a diversity reception device that includes a plurality of carrier combining units and that performs multiple times of carrier combining. For example, as shown in FIG. 22, suppose the carrier combining unit 2281 is the first carrier combining unit, and that the carrier combining unit 2284 is the second carrier combining unit, in the m-th carrier combining unit, the carrier signal is expressed as $Ym_n(s, b)$, the channel frequency characteristic as $Hm_n(s, b)$, and the combined carrier data as $Xcm_n(s, b)$. Consequently, Expression 61 can be expressed as the following escape sequence.

$$Xcm_n(s)=(Hm_n(s,1)^* \cdot Ym_n(s,1)+Hm_n(s,2)^* \cdot Ym_n(s,2))/(|Hm_n(s,1)|^2+|Hm_n(s,2)|^2)$$ (Expression 62)

The above carrier combination method is applied in the carrier combination of the aforementioned embodiments as follows.

As for Embodiment 5, the equalization unit 102 and the equalization unit (unillustrated) that includes the ICI removal unit 2264 in FIGS. 21 and 22 may be omitted. A combined signal may be calculated, with use of Expression 62, in the carrier combining unit 2281 based on the output from the FFT units 2261 and 2262, and the channel characteristics obtained in the ICI removal units 2263 and 2264.

Furthermore, the equalization units 2267 and 2268 may be omitted. The carrier combining unit 2281 may calculate a combined signal, with use of Expression 62, based on the output from the ICI removal operation unit 107 and outputs from the ICI removal operation unit (unillustrated) included in the ICI removal unit 2264 and the channel estimation units 2265 and 2266.

Furthermore, the above applies to FIG. 23 of Embodiment 6 and FIG. 26 of Embodiment 7. In addition, in Embodiment 9 shown in FIGS. 29, 30 and 31, the first equalization unit 3052 and the first equalization unit (unillustrated) included in the reception processing unit 3121 may be omitted. The first carrier combining unit 3011 may calculate a combined signal with use of Expression 62 based on the output from the FFT unit 3033 and the FFT unit (unillustrated) included in the reception processing unit 3121 and outputs from the first channel estimation unit 3051 and the first channel estimation unit (unillustrated) included in the reception processing unit 312 (unillustrated).

Furthermore, the second equalization unit 3055 and the second equalization unit (unillustrated) included in the reception processing unit 3121 may be omitted. The second carrier combining unit 3012 may calculate a combined signal, with use of Expression 62, based on the output from the subtraction unit 3054 and the subtraction unit (unillustrated) included in the reception processing unit 3121 and outputs from the second channel estimation unit 3056 and the second channel estimation unit (unillustrated) included in the reception processing unit 3121.

In addition, the above applies to Embodiment 9 in which there are more than two combining units, as shown in FIGS. 34, 35 and 36. The third equalization unit 3074 and a third equalization unit (unillustrated) included in the reception processing unit 3122 may be omitted. The third carrier combining unit 3013 may calculate a combined signal, with use of Expression 62, based on the output from the subtraction unit 3073 and a subtraction unit (unillustrated) included in the reception processing unit 3122 and outputs from the third channel estimation unit 3075 and a second channel estimation unit (unillustrated) included in and the reception processing unit 3122.

Figure 38:
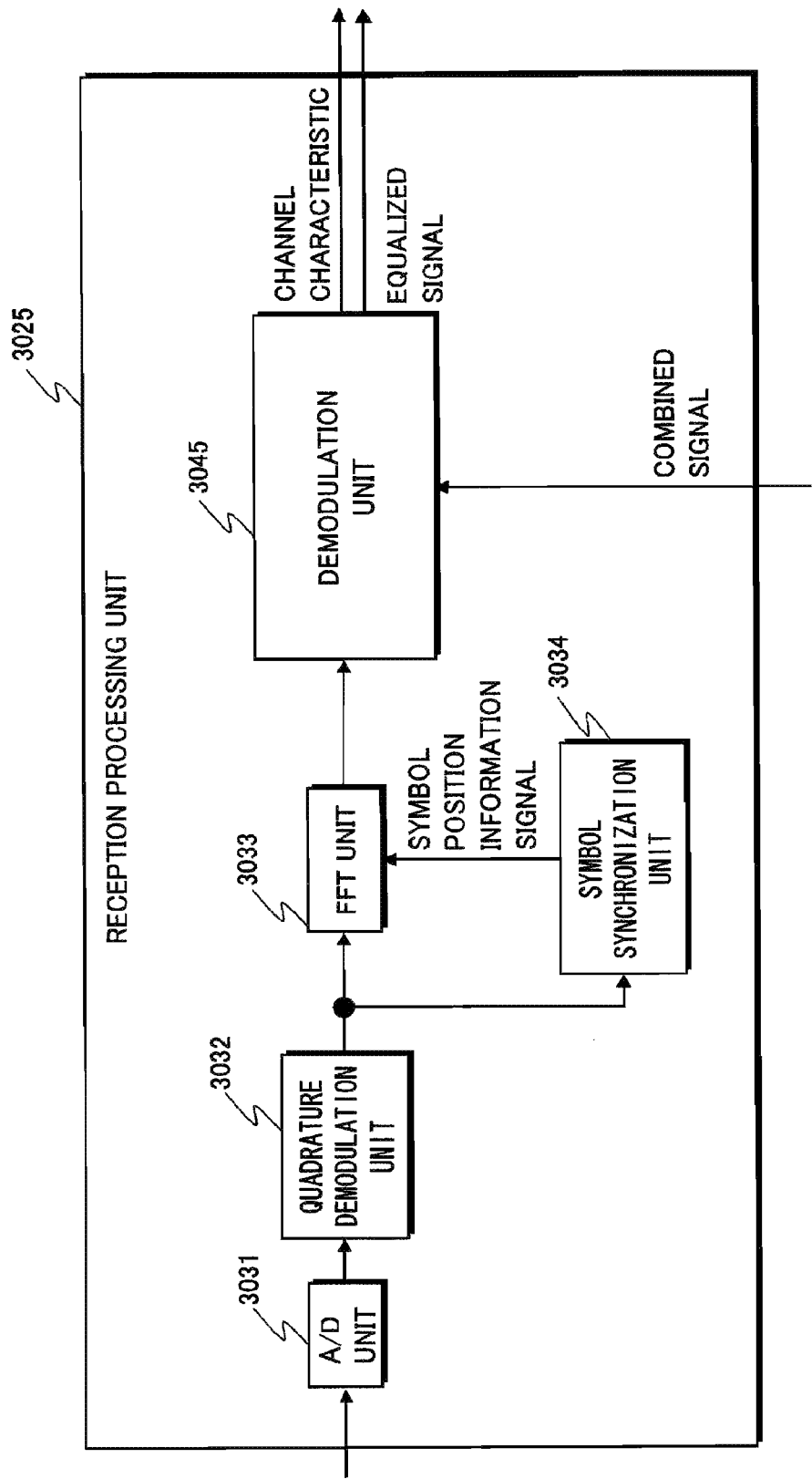
FIG. 38 is a block diagram of a reception processing unit of FIG. 37.

Furthermore, as for Embodiment 10 shown in FIGS. 37, 38 and 39, the equalization unit 3081 and the equalization unit (unillustrated) included in the reception processing unit 3125 may be omitted. The combining unit 3015 may calculate a combined signal with use of Expression 62 based on the output from the subtraction unit 3054 and the subtraction unit (unillustrated) included in the reception processing unit 3125 and outputs from the channel estimation unit 3082 and the channel estimation unit (unillustrated) included in the reception processing unit 3125.

(2) The above embodiments show the OFDM signal whose conversion between the time domain and the frequency domain is based on FFT, and its relating demodulation processing. However, the present invention is applicable to multi-carrier signals that are a plurality of carriers multiplexed on the frequency axis. For example, the multi-carrier signals may be performed wavelet transform, cosine transform, or Hadamard transform.

(3) Part or all of the constituents of the above reception device and the inter-carrier interference removal device may be composed of one system LSI (Large Scale Integration). The system LSI is hyper-multifunctional LSI that integrates a plurality of components on one chip. The plurality of components may be individually on one chip, or part or all of the components may be integrally on one chip. Although LSI is referred here, according to degrees of integration, LSI can be referred to as IC, system. LSI, super LSI, or ultra LSI.

In addition, the LSI is not the only method for making an integrated circuit. An integrated circuit may be realized by a dedicated circuit or a general processor. FPGA (Field Programmable Gate Array) that is programmable after the LSI is produced, or a reconfigurable processor that is reconfigurable of connection and setting of a circuit cell inside LSI may be used.

Furthermore, if the advance of the technology or a derivative of another technology creates a new technology of the integrated circuit that can replace the LSI, as a matter of course, functional blocks can be integrated with use of the new technology. Biotechnology and such may have the potential to be applied for the new technology.

(4) The reception device and the inter-carrier interference removal device may be a computer system composed of, specifically, a micro processor, ROM, RAM, a hard disk unit, a display unit, a keyboard, a mouse and the like. The RAM and the hard disk unit record a computer program. In response to the operation by the micro processor according to the computer program, each device can achieve its function. The computer program is constituted from a plurality of instruction codes that indicate instructions to a computer.

(5) Part or all of the constituents of the above reception device and the inter-carrier interference removal device may be composed of a removable IC card or a stand-alone module. The IC card and the module are each computer system composed of a micro processor, ROM, RAM, and the like. Each of the IC card and the module may include the hyper-multifunctional LSI. In response to the operation by the microprocessor according to the computer program, each of the IC card and the module can achieves its function. The IC card and the module may be tamper-resistant.

(6) The present invention may be the methods shown as above. Alternatively, the present invention may be a computer program that realizes these methods with a computer, or digital signals composed of the computer program.

Furthermore, the present invention may be the computer program or the digital signals that are recorded on a computer readable recording medium such as a flexible disk, a hard disk, CD-ROM, MO, DVD, DVD-ROM, DVD-RAM, BD (Blu-Ray Disc), and semiconductor memory. The present invention may also be the computer program or the digital signals recorded on the above computer readable recording medium.

(7) Some of the embodiments and the modifications may be combined to one another.

INDUSTRIAL APPLICABILITY

Since the inter-carrier interference removal device and the reception device using the same in accordance with the embodiments of the present invention are able to remove inter-carrier interference caused by Doppler shift contained in a carrier signal, the inter-carrier interference removal device can improve the reception characteristic in receiving the multi-carrier signal in a mobile condition. Accordingly, the present invention is useful as the reception device that receives, in the cars or trains moving at a high speed, digital terrestrial broadcasting and wireless LAN signals in OFDM.

The invention claimed is:

1. A reception device that performs diversity reception, the reception device comprising:
  a plurality of reception processing units, each reception processing unit of the plurality of reception processing units being operable to receive a reception signal via an antenna corresponding to one reception processing unit of the plurality of reception processing units, and to demodulate the reception signal;
  a first combining unit operable to (i) receive first output signals from the plurality of reception processing units, (ii) perform diversity combining on all of the received first output signals, so as to obtain a combined signal, (iii) perform hard decision on the combined signal according to a transmission code position, and (iv) output a hard decision result to each reception processing unit of the plurality of reception processing units; and
  a second combining unit operable to (i) receive second output signals from the plurality of reception processing units, and (ii) perform diversity combining on the second output signals,
  wherein each reception processing unit of the plurality of reception processing units includes:
    a first reception signal processing unit that generates one first output signal of the first output signals by demodulating the received reception signal, and outputs the one first output signal to the first combining unit; and
    a second reception signal processing unit that (i) generates one second output signal of the second output signals by demodulating the received reception signal using the combined signal received from the first combining unit, and (ii) outputs the one second output signal to the second combining unit.

2. A reception device that performs diversity reception, the reception device comprising:
  a plurality of reception processing units, each reception processing unit of the plurality of reception processing units being operable to receive a reception signal via an antenna corresponding to one reception processing unit of the plurality of reception processing units, and to output a carrier; and
  a combining unit including:
    a carrier combining unit operable to (i) receive carriers from the plurality of reception processing units and to perform diversity combining on all of the received carriers;
    a combined carrier reliability calculation unit operable to calculate a reliability value of a combined carrier that results from the diversity combining;
    a combined carrier weighting unit operable to weight the combined carrier using the reliability value; and
    a combined carrier output unit operable to output, to the plurality of reception processing units, a tentatively combined carrier having been weighted using the reliability value, so that the tentatively combined carrier is to be processed by the plurality of reception processing units,
  wherein each reception processing unit of the plurality of reception processing units receives the tentatively combined carrier from the combined carrier output unit, and demodulates the reception signal using received tentatively combined carrier.

3. The reception device of claim 2, wherein the combined carrier reliability calculation unit calculates the reliability value based on a sum of a carrier power of each branch.

4. The reception device of claim 2, wherein the combined carrier reliability calculation unit calculates the reliability value based on a difference between (i) a given threshold and (ii) a distance between reception signal points of carrier signals of different branches.

5. The reception device of claim 2, wherein the combined carrier reliability calculation unit calculates the reliability value based on a difference between (i) a given threshold and (ii) a distance from a reception signal point of a carrier signal of each branch to a signal point of a combined signal.

6. A reception device that performs diversity reception, the reception device comprising:
  a plurality of reception processing units, each reception processing unit of the plurality of reception processing units being operable to receive a reception signal via an antenna corresponding to one reception processing unit of the plurality of reception processing units, and to demodulate the reception signal; and
  a combining unit operable to (i) receive output signals from the plurality of reception processing units, (ii) perform diversity combining on the received output signals, so as to obtain a combined signal and (iii) output the combined signal to each reception processing unit of the plurality of reception processing units,
  wherein each reception processing unit of the plurality of reception processing units receives the combined signal from the combining unit, and demodulates the reception signal using the received combined signal,
  wherein each reception processing unit of the plurality of reception processing units includes:
    an orthogonal transform unit that performs an orthogonal transform on the reception signal; and
    an interference component removal equalization unit that removes an interference component from the orthogonally-transformed reception signal, and equalizes the reception signal, the interference component removal equalization unit including:
      an interference component generation unit that generates the interference component in the reception signal using a channel characteristic and the combined signal received from the combining unit;
a subtraction unit that performs a subtraction so as to remove the interference component from the reception signal;
a channel estimation unit that estimates a channel characteristic of an output signal of the subtraction unit; and
an equalization unit that generates an equalized signal by dividing the output signal of the subtraction unit by the channel characteristic, and wherein the combining unit generates, according to the channel characteristic estimated by the channel estimation unit in each reception processing unit of the plurality of reception processing units, the combined signal by performing diversity combining on the equalized signal at each reception processing unit of the plurality of reception processing units, and outputs the combined signal.

7. A reception device that performs diversity reception, the reception device comprising:
a plurality of reception processing units;
a first combining unit; and
a second combining unit,
wherein each reception processing unit of the plurality of reception processing units includes:
an orthogonal transform unit that performs an orthogonal transform on a reception signal; and
an interference component removal equalization unit that removes an interference component from the orthogonally-transformed reception signal, and equalizes the reception signal, the interference component removal equalization unit including:
a first channel estimation unit that estimates a channel characteristic of the orthogonally-transformed reception signal;
a first equalization unit that equalizes the orthogonally-transformed reception signal by performing a division by the channel characteristic;
an interference component generation unit that receives a combined signal from the first combining unit, and generates the interference component in the orthogonally-transformed reception signal using the combined signal and the channel characteristic;
a subtraction unit that performs a subtraction so as to remove the interference component from the orthogonally-transformed reception signal;
a second channel estimation unit that estimates a channel characteristic of an output signal of the subtraction unit; and
a second equalization unit that equalizes the output signal of the subtraction unit by performing a division by the channel characteristic, wherein the first combining unit generates the combined signal by performing diversity combining on signals that are equalized by each respective first equalization unit of the plurality of reception processing units based on the channel characteristic estimated by the respective first channel estimation unit, and outputs a combined signal to each reception processing unit of the plurality of reception processing units, and wherein the second combining unit performs diversity combining on signals that are equalized by each respective second equalization unit of the plurality of reception processing units based on the channel characteristic estimated by the respective second channel estimation unit of the plurality of reception processing units.

8. The reception device of claim 7, wherein the first combining unit further includes a hard-decision unit that performs hard decision on the combined signal according to a transmission code position, and outputs a hard decision result to each reception processing unit of the plurality of reception processing units.

* * * * *